(12) United States Patent
Mishima et al.

(10) Patent No.: US 6,449,056 B1
(45) Date of Patent: Sep. 10, 2002

(54) IMAGE FORMATION APPARATUS DISPLAYING THE CAPACITY OF DATA OF IMAGE TO BE FORMED

(75) Inventors: Nobuhiro Mishima, Okazaki (JP); Yoshikazu Ikenoue, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/133,871

(22) Filed: Aug. 13, 1998

(30) Foreign Application Priority Data

| Aug. 15, 1997 | (JP) | ............................................. | 9-220475 |
| Aug. 15, 1997 | (JP) | ............................................. | 9-220518 |
| Aug. 18, 1997 | (JP) | ............................................. | 9-221438 |
| Aug. 27, 1997 | (JP) | ............................................. | 9-231103 |

(51) Int. Cl.$^7$ .............................................. G06K 15/00
(52) U.S. Cl. ...................................... 358/1.16; 358/1.1
(58) Field of Search ................................ 358/1.1, 1.16, 358/1.17, 1.15, 1.14, 404, 444, 500, 501, 502, 448, 261.4; 399/8, 1, 144; 710/52, 54, 56; 345/543, 544, 545, 551, 546, 538, 555

(56) References Cited

U.S. PATENT DOCUMENTS 4,843,571 A * 6/1989 Notermans et al. ........ 358/1.15
6,067,168 A * 5/2000 Nishiyama et al. ........ 358/1.15

FOREIGN PATENT DOCUMENTS

JP 5-38865 2/1993

* cited by examiner

Primary Examiner—Arthur G. Evans
(74) Attorney, Agent, or Firm—Sidley Austin Brown & Wood LLP

(57) ABSTRACT

A digital copier has a memory for storage of image data, reads image data and stores the image data in the memory, and prints an image depending on the image data stored in the memory. The digital copier can also register a plurality of jobs. Based on a registered job an image is printed. Then, based on the subsequent job an image is printed. When an image data corresponding to a new job cannot be stored in the memory, the digital copier effects the process for calculation of job execution time, a process of calculating a free memory capacity, and a process of calculating the time required for obtaining a timing at which a free memory space is provided, to display the time at which the image data corresponding to the new job can be stored. Thus, a digital copier can be provided allowing the user to form images efficiently.

12 Claims, 47 Drawing Sheets

| SPACE | PAGE NO. PN | FW LINKAGE | BW LINKAGE | ADDITIONAL INFORMATION |
|---|---|---|---|---|
| 00 | 1 | 00 | 01 | |
| 01 | 1 | 01 | FF | |
| 02 | 2 | 00 | 03 | |
| 03 | 2 | 03 | FF | |
| ⋮ | | | | |

MT1

| JOB-No. | COMPLETION TIME | MEMORY AVAILABLE |
|---|---|---|
| 1 | 15 MIN. LATER | 25% |
| 2 | 40 MIN. LATER | 75% |
| 3 | 65 MIN. LATER | 80% |
| 4 | 80 MIN. LATER | 100% |
| 5 | | |
| 6 | | |
| 7 | | |

IMAGE FORMATION APPARATUS DISPLAYING THE CAPACITY OF DATA OF IMAGE TO BE FORMED

This application is based on Application Nos. 9-220518, 9-220475, 9221438 and 9-231103 filed in Japan, the contents of which are herein incorporated by reference.

BACKGROUND OF THE INVENTION

1. Field of the Invention

The present invention relates to image formation apparatuses and in particular to an image formation apparatus which processes information on image formation depending on the image data within the apparatus.

2. Description of the Related Art

Conventionally, digital copiers have been used for printing images. In a digital copier, a read image can be stored in a memory and image printing can be provided independently of and simultaneously with image reading. A digital copier with such multi-job function that allows image printing and image reading to be provided independently of each other has it a function allowing a plurality of users to input images to register jobs and print the images in the order in which the jobs are registered. A digital copier also allows image data to be internally digitalized. Thus it can readily be connected to a network and thus allows a job to be registered from an external equipment via the network.

Japanese Patent Laying-Open No. 5-38865 discloses an image formation apparatus which prints out an image depending on the image data externally transmitted and stored in a memory. An application to facsimile has a hold-for-reception function referred to as a hold-for-reception by memory which allows data to be stored in a memory of the receiving facsimile when the facsimile runs out of sheets.

Japanese Patent Laying-Open No. 5-134511 discloses a technique which allows an interruption to a job currently executed in a copier with multi-job function only when there is small time difference between the execution time of the job and that of a set job.

However, a job which the external equipment requests to be registered may not be accepted depending on the utilization of the memory in the image formation apparatus.

An image formation apparatus such as a digital copier with a conventional memory, a printer device connected to e.g., a computer, a facsimile and the like the memory of which is full or the fun capacity of the memory of which is used when a network requests registration of a job and the data of an image is input or is being input, signals to the external equipment requesting printing the image that the registration of the job cannot be accepted.

If the image formation apparatus is controlled by a computer, the user can respond to such a signal to operate the computer controlling the image formation apparatus so that one of a plurality of image formation apparatuses that is allowed to print an image is selected to change the image formation apparatus requested to print the image and re-registration of a job can be set when a certain period of time elapses. However, the user does not know which one of the plurality of image formation apparatuses is accepting job registration and when it can accept job registration. The user can select an image formation apparatus allowed to print images through repeated trial and error, which is an extremely troublesome procedure and the user cannot print images efficiently.

Furthermore, such a conventional image formation apparatus that is selected for a request to print an image while accepting jobs may require a significantly long time to complete all of the jobs that have been registered in the image formation apparatus. If job is registered in the image formation apparatus, the user may have to wait for a significantly long time. Printing images with such an image formation apparatus is very inefficient if another image formation apparatus which is allowed to execute the job earlier is also connected.

Generally it is often the case for copiers with multi-job function that the original transport unit automatically setting original sheets one by one at the reading station to read an image on an original sheet is installed in the image reader. However, when the image reader is being used, a new job cannot be registered.

Furthermore, if the memory in such copier with multi-job function is full, the copier cannot accept requested job registrations.

In order to cause the copier to print an image as soon as possible when the job for the image cannot be registered, the user has to wait until the use of the image reader completes or a free memory space is available for the original newly read. Thus, image-printing by the user depends on the state of the apparatus, which can be inconvenient for the user.

SUMMARY OF THE INVENTION

Therefore one object of the present invention is to provide an image formation apparatus allowing users to form images efficiently.

Another object of the present invention is to allow users to efficiently form images in an image formation apparatus connected to an external equipment.

Still another object of the present invention is to provide an image formation apparatus that allows users to form images more conveniently.

Still another object of the present invention is to allow users to efficiently form images in an image formation system in which a plurality of image formation apparatuses are connected.

The above objects of the present invention are achieved by an image formation apparatus which includes the following elements. That is, an image formation apparatus according to the present invention includes a display device, an image forming station which receives data for forming an image and forms the image depending on the received data, and a processor which calculates the capacity of data for forming an image and displays the calculated capacity of the data on the display device.

The capacity of read image data that is counted and displayed allows the user to know how much free capacity in the image formation apparatus is required to allow the image to be formed. Knowing the respective free capacities of image formation apparatuses allows the image to be formed by the image formation apparatus that can form the image earliest and the image can thus be formed efficiently.

In another aspect of the present invention, an image formation apparatus connected to an external equipment includes an image forming station which receives data for forming an image and forms the image depending on the received data, an interface for transmitting and receiving data to and from the external device, and a processor calculating the capacity of image data for forming an image, wherein the data indicative of the capacity of the image data calculated by the processor is transmitted to the external device via the interface.

The capacity of read image data that is counted and transmitted to the connected external device allows the user to know how much free capacity in the image formation apparatus is required to allow the image to be formed. Knowing the respective free capacities of image formation apparatuses allows the image to be formed by the image formation apparatus that can form the image earliest and the image is thus formed efficiently.

In still another aspect of the present invention, an image formation apparatus includes a display, a memory for storage of data for forming an image, an image forming station which forms an image depending on the data stored in the memory, and a processor which determines whether data for forming an image can be stored in the memory and displays on the display device an indication for urging a reservation to store the data in the memory when the processor determines that the data cannot be stored in the memory.

When image data cannot be stored in the memory, the order in which the image data is stored in the memory is reserved to secure the memory space for storage of the image data. It is thus unnecessary for the user to conventionally wait for completion of processes of the image formation apparatus until the storage in the memory is allowed, to allow the image formation apparatus to form the image as soon as possible, and the reservation of the order in which the image data is stored in the memory allows the user to form the image more conveniently.

In still another aspect of the present invention, a management system for management of first and second image formation apparatuses, the management system being connected to the first and second image formation apparatuses each forming an image depending on the image-forming data stored in a memory provided therein, includes an interface for data communication between the first and second image formation apparatuses, and a processor which determines which of the first and second image formation apparatuses can form images depending on the data received from said first and second image formation apparatuses via the interface and indicative of the respective states of the memories of the first and second image formation apparatuses.

The processor of the management system receives from each of a plurality of image formation apparatuses the information on the memory depending on which the processor controls image formation in the plurality of image formation apparatuses.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A digital copier 1 as one embodiment of the present invention will now be described with reference to the drawings.

(1) First Embodiment

Figure 1:
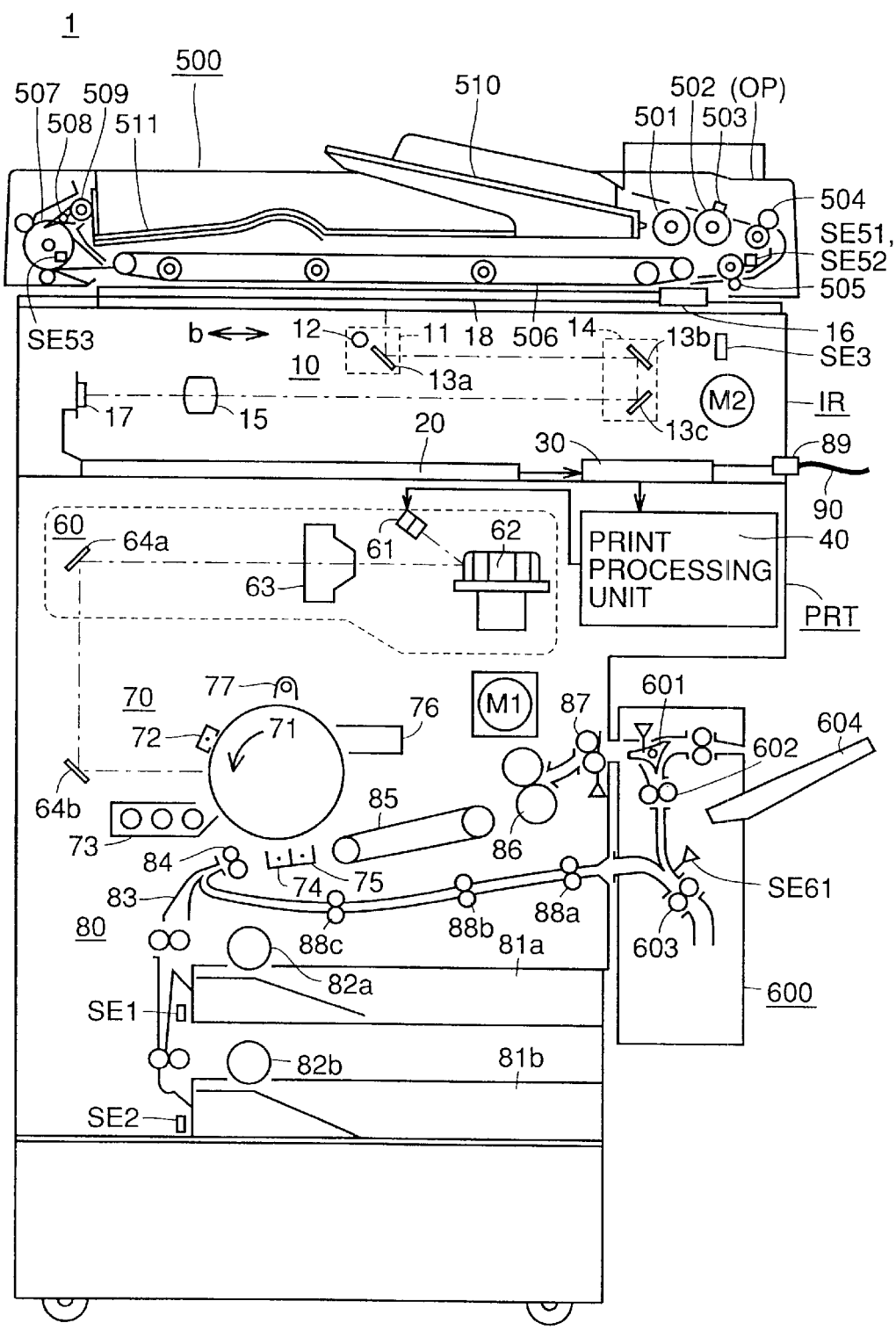
FIG. 1 is a schematic cross section showing the entire configuration of a digital copier as one embodiment of the present invention.

Referring to FIG. 1, digital copier 1 is generally configured of an original transport unit 500, an image reader IR, a page printer PRT, a sheet refeeding unit 600, and an operation panel OP provided on an upper surface of digital copier 1 (in a direction perpendicular to the plane of the figure). They are controlled by a control unit 200 (FIGS. 3 and 4) that controls the entirety or various portions of the copier.

A copy operation thereof will now be schematically described. When a content of operation is input to digital copier 1 via operation panel OP, original transport unit 500 sets originals to be copied one by one at the reading position of image reader JR. Image reader IR reads the image of an original set at the reading position and generates image data, and page printer PRT receives the image data from image reader IR and prints an image on a sheet. The printed sheet is discharged via sheet refeeding unit 600.

Each portion will now be described more specifically. Original transport unit 500 also serves as an original cover and is mounted to an upper portion of digital copier 1 with one end of the cover serving as a supporting point such that the cover can be opened and closed. On a sheet feeding tray 510 a plurality of originals are stacked such that the image bearing sides to be copied face upwards. A sheet feeding roller 501 feeds the stacked originals one by one from the bottom original, and a separation roller 502 and a separation pad 503 separate them. Then an intermediate roller 504 and a register roller 505 reverse an original along a transport path and a transport belt 506 accurately sets the original at the reading position on a platen glass 18 of image reader IR.

Furthermore a register sensor SE51 and a width-size sensor SE52 detect the original and register roller 505 corrects obliqueness of the original, and original transport belt 506 is slightly reversed and then stops immediately after the rear edge of the original passes across the left end of an original scale 16. These operations allows the right edge of the original to contact an end of original scale 16 and the original is thus set at the accurate position on platen glass 18. Meanwhile the front edge of the next original has reached register roller 505 and original transport time is thus reduced.

For an original with an image provided only on one side thereof, image reader IR reads the image and the original then passes over a switching flap 508 and is discharged via a sheet discharging roller 509 onto an original discharging tray 511 such that the image-bearing side faces upwards. For an original with images provided on the both sides, image reader IR similarly reads the front side of the original and a reversing roller 507 changes the transport direction of the original and switching flap 508 allows the original to be returned to the reading position on platen glass 18. Thus the original has its backside read and is then discharged onto original discharging tray 511. Meanwhile a discharge sensor SE53 detects the presence/absence of an original being discharged.

Image reader IR reads the image of an original set on platen glass 18 and generates the image data corresponding to each pixel of the image of the original. Image reader IR is configured of a scan system 10 which resolves an original into pixels and reads the pixels, an image processing unit 20 which quantizes a photoelectric conversion signal output from scan system 10 and effects signal processings according to various image formation modes, and memory unit 30 for storage of the image data transmitted from image processing unit 20.

Scan system 10 has a line-scanning, image reading mechanism. A first scanner 11 having an exposure lamp 12 and a first first 13a, and a second scanner 14 having second and third mirrors 13b and 13c are driven by a scan motor M2 and thus move in the direction of an arrow b or a sub scanning direction.

An original set at the reading position of platen glass 18 is exposed by exposure lamp 12. The reflected light caused by the exposure passes through mirrors 13a, 13b and 13c and a condenser lens 15 and illuminates a line sensor 17 which employs a CCD array. Line sensor 17 is provided by arranging a number of photoelectric conversion elements in a direction perpendicular to the plane of the figure or a main scanning direction and it reads an image at e.g. 400 dpi and generates the image data corresponding to each pixel. A sensor SE3 detects the positions of the scanners. An electrical signal obtained here is transmitted to image processing unit 20. Original scale 16 set adjacent to platen glass 18 indicates a reference to which the user sets an original manually.

In image processing unit 20, the image data converted by scan system 10 into an electrical signal is binarized and experiences image processes, such as image quality correction, magnification, image editing, and is then transmitted to memory unit 30, which compresses the image data received from image processing unit 20. The compressed data is temporarily stored in memory unit 30. Then the image data is decompressed and experiences a rotation editing process and the like as required and is then transmitted to page printer PRT.

Memory unit 30 also has an external equipment interface, as will be described hereinafter, and is connected to an external equipment by an external cable 90 via a connector 89 for connection to the external equipment.

Image processing unit 20 and memory unit 30 will be described hereinafter.

Page printer PRT prints an image to be copied through an electrophotography process depending on the image data transferred from image reader IR. Page printer PRT is configured of a pint processing unit 40 which outputs an exposure control signal, an optical system 60 which radiates a laser beam in response to the exposure control signal from print processing unit 40, an image forming system 70 which provides a process of forming an image on a sheet for the laser beam radiated at optical system 60, and a sheet transport system 80 which transports a sheet to or from image forming system 70.

Depending on the printing data from memory unit 30 of image reader IR, print processing unit 40 controls modulation (ON/OFF) of the laser beam radiated by optical system 60. The laser light emitted at optical system 60 is provided by a semiconductor laser 61 controlled by print processing unit 40. The laser beam is deflected in the main scanning direction by a polygon mirror 62 rotated by a motor and is guided to the exposure position within image forming system 70 via an fθ lens 63 and mirrors 64a and 64b arranged at their respective positions.

In image forming system 70, a photoreceptor drum 71 uniformly charged by a corona charger 72 is initially irradiated with the laser beam from semiconductor laser 61. The laser beam radiation allows a latent image to be formed on photoreceptor drum 71. Then a developer 73 places toner on the latent image to render the latent image a toner image which is then transferred at the transfer position by a transfer charger 74 from photoreceptor drum 71 to a sheet transported by sheet transport system 80. Then a separation charger 75 separates the sheet from photoreceptor drum 71. Then a cleaner 76 removes the unnecessary toner on photoreceptor drum 71 and an eraser lamp 77 removes the electrical charge on photoreceptor drum 71 so that photoreceptor drum 71 is prepared for the next sheet.

Sheet transport system 80 causes the sheets from sheet feeding cassettes 81a and 81b to be fed via sheet feeding rollers 82a and 82b, respectively. The sheets pass through a sheet transport path 83 and are sent to the transfer position in synchronization with photoreceptor drum 71 of image forming system 70. A sheet with a toner image transferred thereon is transported by a transport belt to fixer 86 which applies heat and pressure to fix the toner on the sheet. The various portions of sheet transport system 80, photoreceptor drum 71 and the like are driven by a main motor M1.

Sheet refeeding unit 600 is provided on a side of page printer PRT as an additional device for automating a two-sided copy operation. Sheet refeeding unit 600 temporarily receives a sheet discharged from the main body of page printer PRT via a discharging roller 87 of sheet transport system 80 and then sends the sheet back to the body of page printer PRT through switched-back transportation.

For making a copy on one side of a sheet, the sheet simply passes through sheet refeeding unit 600 and is discharged onto a sheet discharge tray 604. In making a copy on the both sides of a sheet, a solenoid (not shown) moves the left end of switching flap 601 upwards so that the sheet discharged from discharging roller 87 reaches a reversible roller 603 via transport roller 602. When a sheet sensor SEG1 detects the rear end of the sheet, reversible roller 603 is reversed and the sheet is thus returned to the body of page printer PRT. The returned sheet is sent to a timing roller 84 via horizontally transporting rollers 88a, 88b and 88c to be again synchronized with photoreceptor drum 71 of image forming system 70 so that an image is formed on the back side of the sheet, which is then discharged onto sheet discharging tray 604.

If a plurality of sheets are fed successively, they are spaced by a predetermined interval so that they do not overlap and thus sent successively to sheet refeeding unit 600. Since the sheet transport path has a fixed length, the number N of sheets of one cycle provided by sheet on refeeding unit 600 and horizontally transporting rollers 88a, 88b and 88c or the maximum number of sheets cycled N depends on sheet size.

Figure 2:
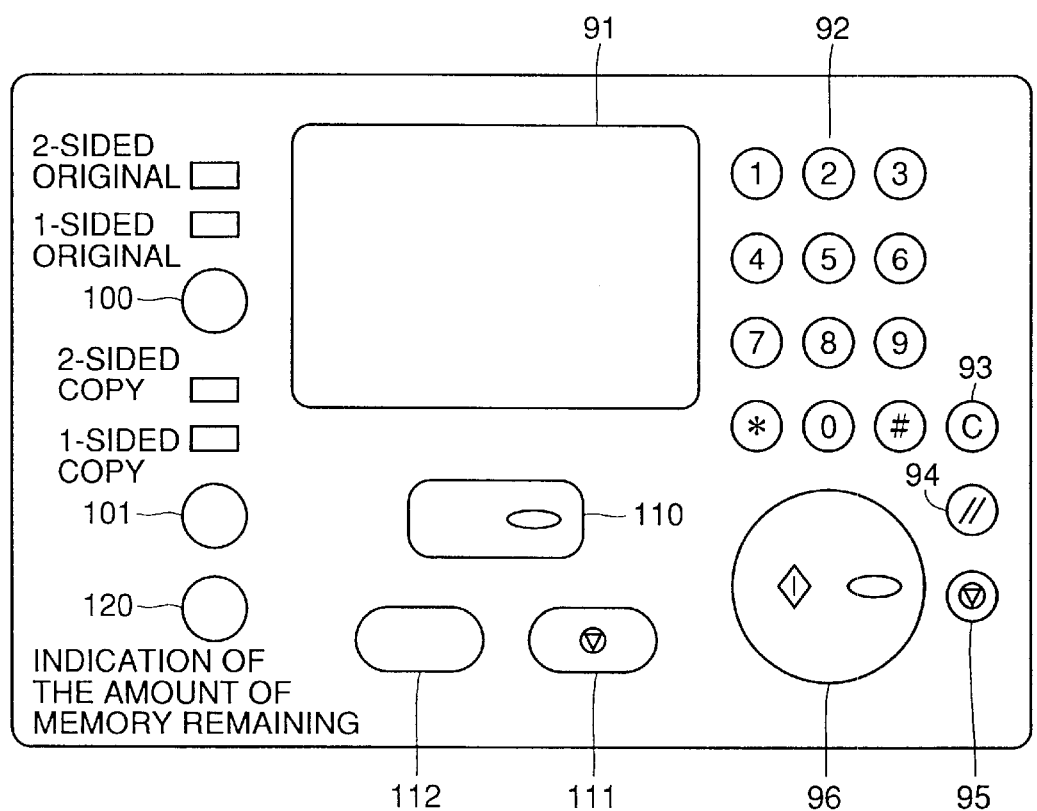
FIG. 2 is a plan view showing a configuration of an operation panel OP of the digital copier.

FIG. 2 is a plan view showing a configuration of operation panel OP of digital copier 1.

Operation panel OP includes a liquid crystal touch panel 91 for displaying the state within the device and setting various modes, numeric keys 92 for inputting a numerical condition for a copy, such as the number of sheets copied, magnification and the like, a clear key 93 for setting a numerical condition back to the default value, a panel reset key 94 for initializing a copy mode, a stop key 95 for providing an indication to stop a copy operation, a start key 96 for providing an indication to start a copy operation, an original designation key 100 for designating either one-sided original or two-sided original, a copy mode key 101 for switching between one-sided copy and two-sided copy, an original-reading start key 110 only for starting reading an original, an original-reading stop key 111 only for stopping reading an original, a registration key 112 for registering a read original in the memory, and a key 120 for providing an indication displaying the amount of remaining memory.

Figure 3:
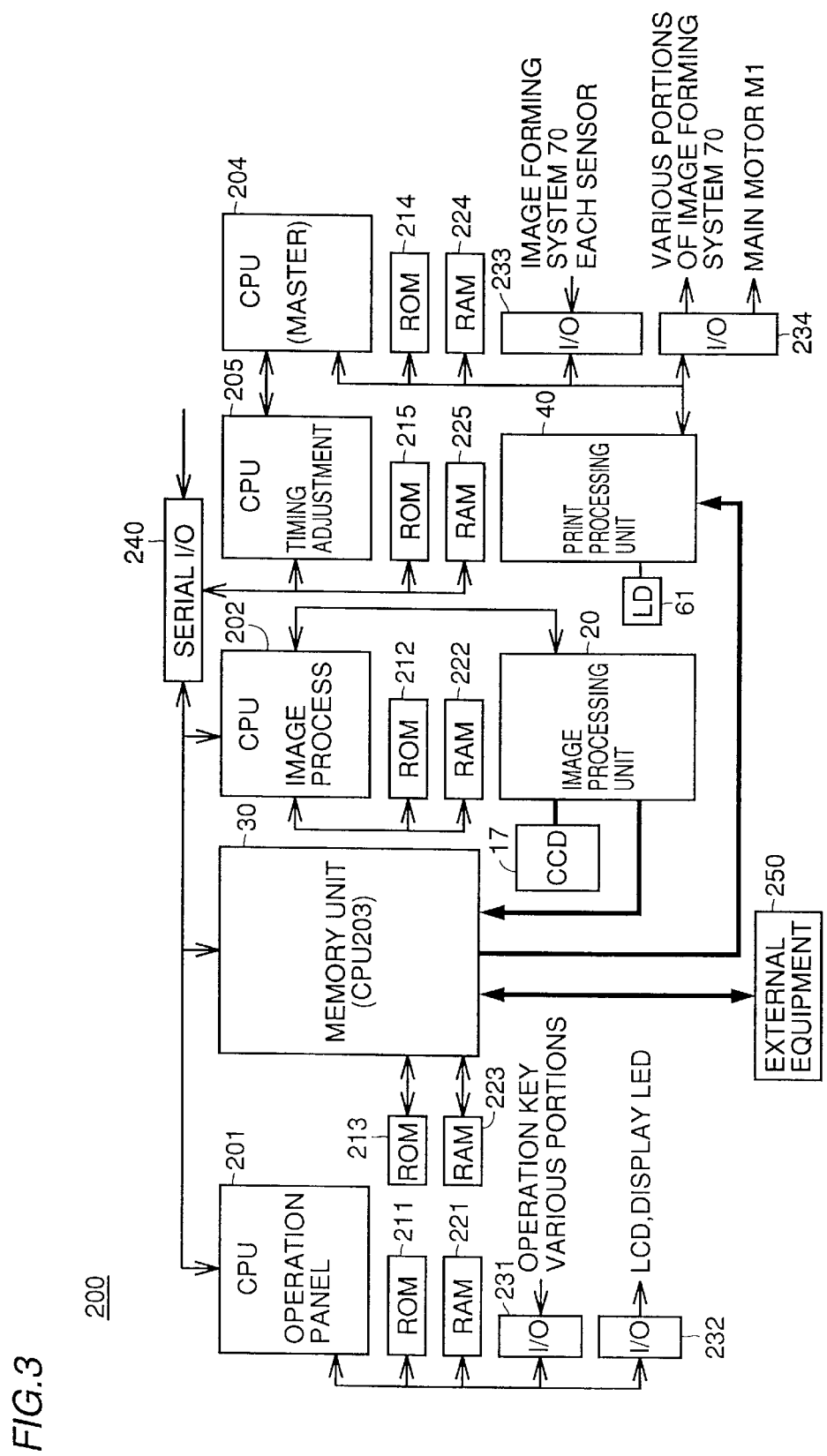
FIG. 3 is a first block diagram shoving a configuration of a control unit of the digital copier.
Figure 4:
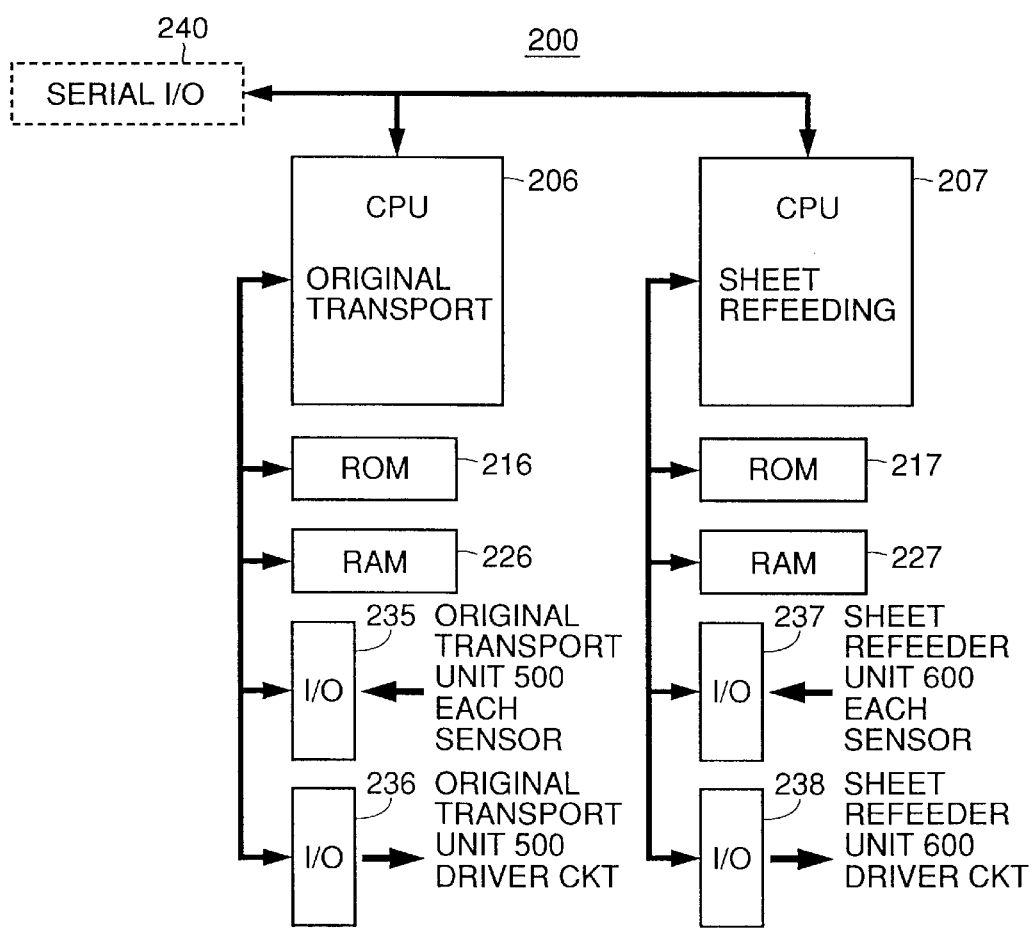
FIG. 4 is a second block diagram showing a configuration of the control unit of the digital copier.

FIGS. 3 and 4 are block diagrams showing a configuration of a control unit 200 of digital copier 1.

Control unit 200 is configured mainly of seven CPUs 201 to 207 respectively connected to ROMs 211 to 217 for storage of program and RAMs 221 to 227 as a working area. CPUs 201 to 204 and CPUs 206 and 207 are connected via a serial I/O 240 with CPU 205 centrally connected therebetween.

The following elements are also connected to and controlled by CPUs 201 to 207. Connected to CPU 201 are various operation keys of operation panel OP via an I/O interface 231, a liquid crystal touch panel (LCD) 91 of operation panel OP via an I/O interface 232, and the like. CPU 201 controls via I/O interface 231 signals input from the various operation keys of operation panel OP and controls via I/O interface 232 indications on liquid crystal touch panel 91 and a display LED.

CPU 202 is connected to image processing unit 20 connected to line sensor (COD) 17. CPU 202 controls various portions of image processing unit 20 and living of scan system 10.

a CPU 203 is provided within memory unit 30 connected to image processing unit 20 and to print processing unit 40. CPU 203 controls the storage and reading of image data. Image processing unit 20 sends image data D1 to memory unit 30 and memory unit 30 sends image data D2 (printing data) to pint processing unit 40. Memory unit 30 also selves as an interface with an external equipment 250 to transmit and receive image data and control data to and from external equipment 250.

CPU 204 is connected to print processing unit 40, which is connected to semiconductor laser(LD)61. CPU 204 is also connected to the sensors of the image forming system, such as sheet size detection sensors SE1, SE2 and the like (FIG. 1), via an I/O interface 233, and to various portions of image forming system 70 and main motor Ml via an I/O interface 234. CPU 204 generally controls page printer PRT, including print processing unit 40, via I/O interfaces 233 and 234. It should be noted that the sheet size obtained from sheet size detection sensors SE1 and SE2 is administered by CPU 204.

CPU 204 is connected to print processing unit 40, which is connected to semiconductor laser (LD)61. CPU 204 is also connect to the sensors of the image forming system, such as sheet size detection sensors SE1, SE2 and the like (FIG. 1), via an I/O interface 233, and to various portions of image forming system 70 and main motor MI via an I/O interface 234. CPU 204 generally controls page printer PRT, including print processing unit 40, via I/I interfaces 233 and 234. It should be noted that the sheet size obtained from sheet size detection sensors SE1 and SE2 is administered by CPU 204.

CPU 205 provides a process for general timing adjustment and a process for operation mode setup. In order to execute these processes, CPU 205 serially communicates with each CPU connected via serial I/O 240 for communication of the commands, reports and the like required for control.

CPU 206 is connected to each sensor of original transport unit 500 via an I/O interface 235 and to a driver circuit for original transport unit 500 via an I/O interface 236. CPU 206 controls via I/O interface 235 a signal input from each sensor of original transport unit 500 and controls via I/O interface 236 the original transport provided by original transport unit 500.

CPU 207 is connected to each sensor of sheet refeeding unit 600 via an I/O interface 237 and to a driver circuit for sheet refeeding unit 600 via an I/O interface 238. CPU 207 controls via 110 interface 237 a signal input from each sensor of sheet refeeding unit 600 and controls via I/O interface 238 sheet-refeeding provided by sheet refeeding unit 600.

Figure 5:
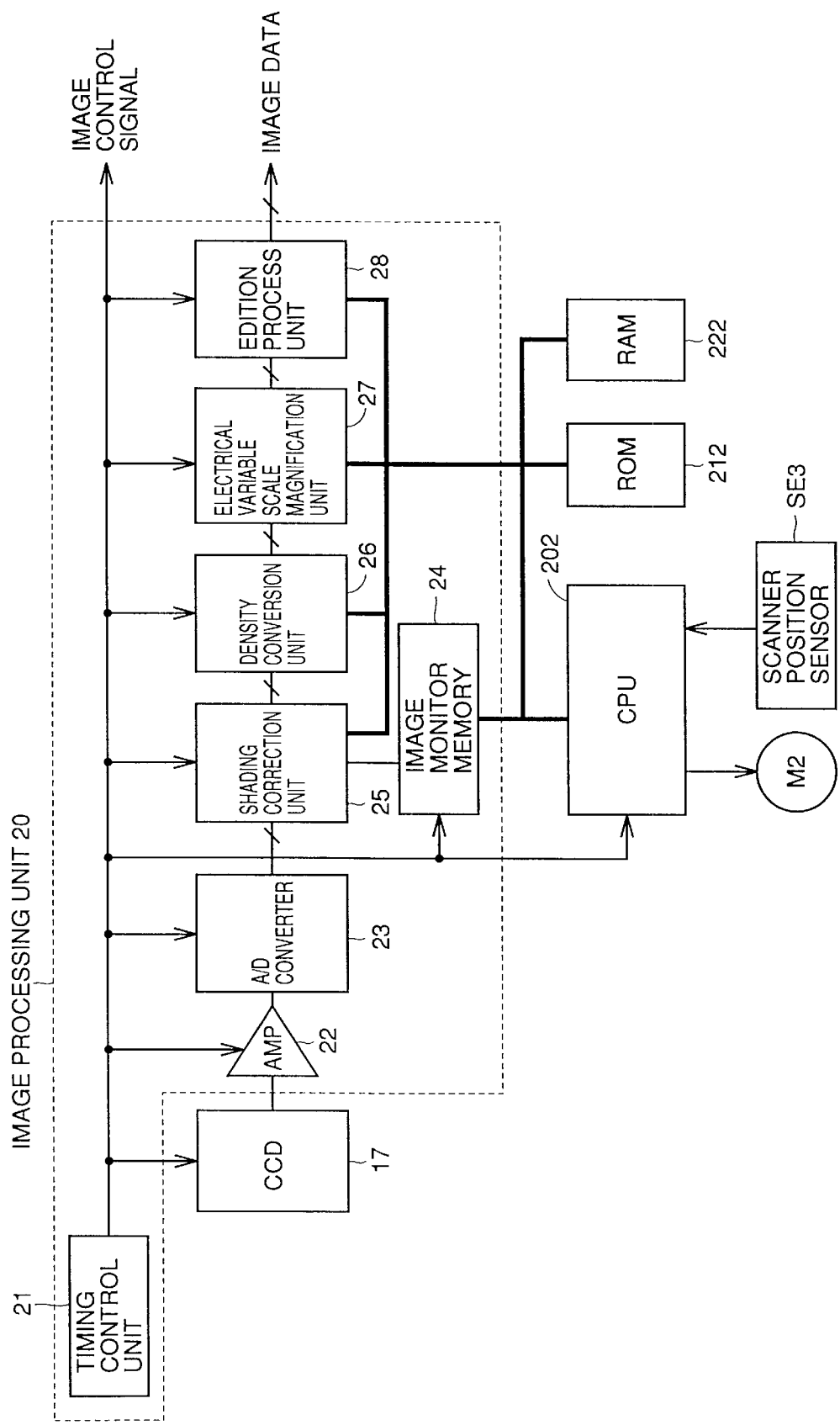
FIG. 5 is a block diagram showing a configuration of the FIG. 1 image processing unit.

FIG. 5 is a block diagram showing a configuration of image processing unit 20 shown in FIG. 1.

In image reader IR, timing control unit 21 provides an image control signal to various blocks. In response to the image control signal from timing control unit 21, line sensor 17 photoelectrically converts the information of an original to generate an electrical signal which is then amplified by an AMP 22 and converted by an AD converter 23 into an 8-bit digital signal. A shading correction unit 25 then removes any distortion caused at scan system 10 from the digital signal, and a density conversion unit 26 applies density conversion, γ correction and the like to the digital signal. Then the digital signal thus processed electrically experiences a variable scale magnification process depending on the information on the scale magnification set at an electrical variable scale magnification unit 27, and experiences an image editing process at an edition process unit 28 to obtain image data provided to memory unit 30.

An indication from CPU 202 causes one line of image data to be stored in an image monitor memory 24. CPU 202 also provides general control of image reader IR, such as setting parameters for shading correction unit 25, density conversion unit 26, electrical variable scale magnification unit 27 and edition process unit 28, driving scan motor M2 to control scanning, communication with master CPU 205.

The size of an original and whether the original is placed lengthwise or widthwise can be detected by scanning the original and detecting light reflected from the original and platen glass 18 with the original placed on platen glass 18 covered by a mirror surface provided under the original cover, since the quantity of light reflected from the original is larger than that of light reflected from the mirror surface.

More specifically, CPU 202 provides preliminary scan when CPU 202 receives an indication of an original-size detection operation from master CPU 205. Depending on the positional information on the scanners from sensor SE3, CPU 202 controls scan motor M2 to cause the first scanner 11 (FIG. 1) and the second scanner 14 to scan in the subscanning direction. At a timing that corresponds to a subscan position, the size of an original and whether the original is placed lengthwise or widthwise are detected depending on the content of image data and on the monitored positional information. The results detected are transmitted to master CPU 205. Depending on the magnification information transmitted from master CPU 205, CPU 202 controls scan motor M2 at a scanning rate corresponding to the magnification information in reading the image.

Figure 6:
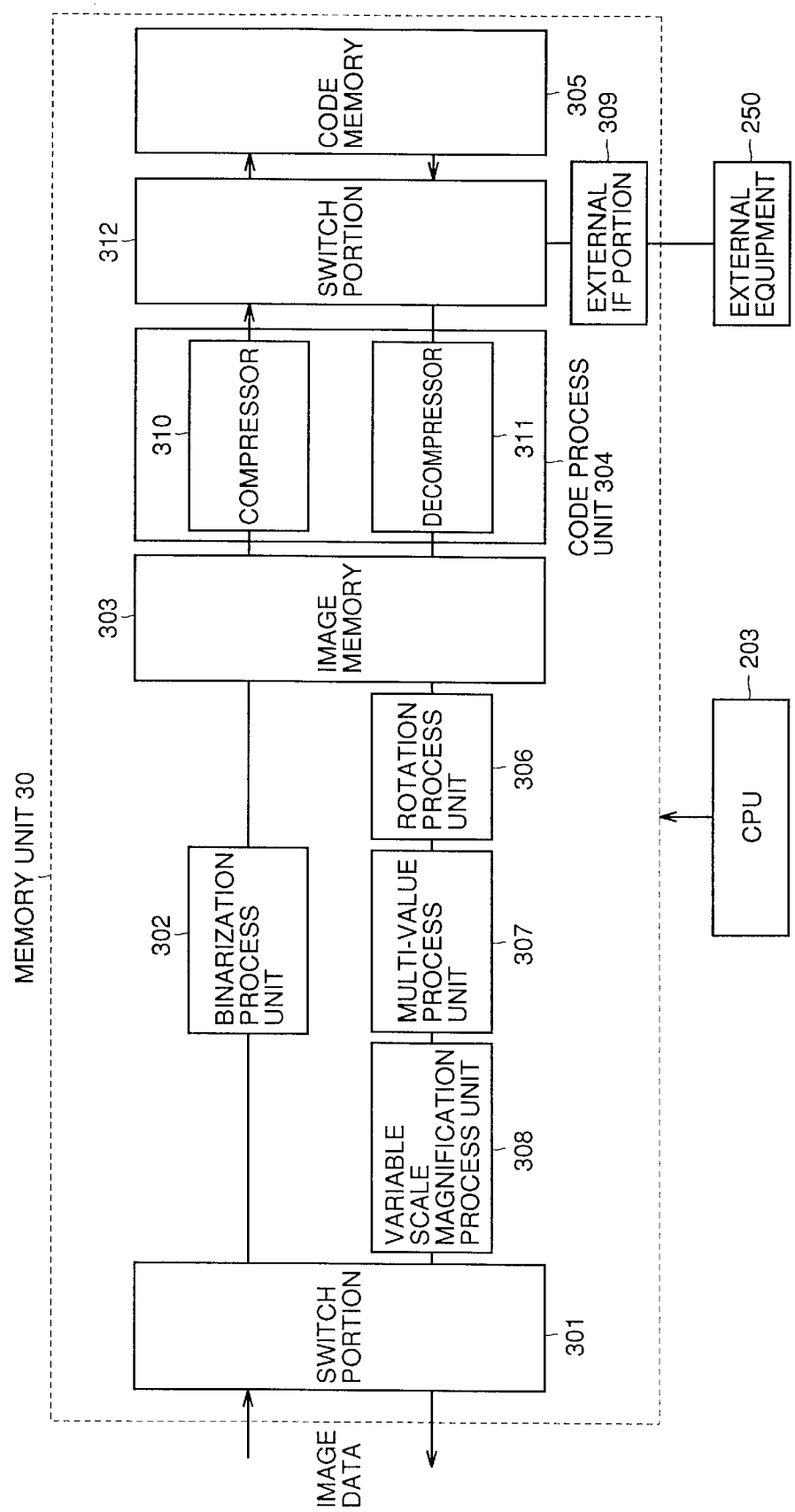
Fig. 6 is a block diagram showing a configuration of the FIG. 1 memory unit.

FIG. 6 is a block diagram showing a configuration of memory unit 30 shown in FIG. 1. In memory unit 30, a switch unit 301 switches tile input and output of image data. Depending on a parameter set by CPU 203, a binarization process unit 302 generate. binary data from image data input. A multi-port image memory 303 having a capacity of two A4-sized pages at 400 dpi stores image data temporarily. The image data are changed into coded data at a code process unit 304 having independently operable compressor 310 and decompressor 311, and are then stored temporarily in code memory 305 via a switch unit 312 which switches the route of the image data between code memory 305 and an external IF portion 309 serving as an interface with external equipment 250.

When image data is written in image memory 303, code process unit 304 accesses and compresses the image data to produce coded data and writes the coded data in code memory 305. According to an indication from CPU 203, code process unit 304 also reads and decompresses coded data written in code memory 305 to produce image data and writes the image data in image memory 303.

The image data compression process at code process unit 304 can be provided if the capacity of coded image data is larger than the current free space of code memory 305 or code memory 305 does not have a free space or the memory is full. In such a case, image data only experiences the compression process and is not written in code memory 305. The compressed data capacity is counted by code process unit 304. The counted data can be read by CPU 203.

When image data of one page is generated through decompression in image memory 303, CPU 203 accesses the image data in image memory 303 and provides the image data to a rotation process unit 306. Rotation process unit 306 applies a rotation process to the image data as required and a multi-value process unit 307 produces multi-value image data which is output via a variable scale magnification process unit 308 which can provide an electrical variable scale magnification process in the main and subscanning directions. It should be noted that the data transfer between compressor 310 and code memory 305 and that between decompressor 311 and code memory 305 are DMA-transfer.

Figures 7A, 7B:
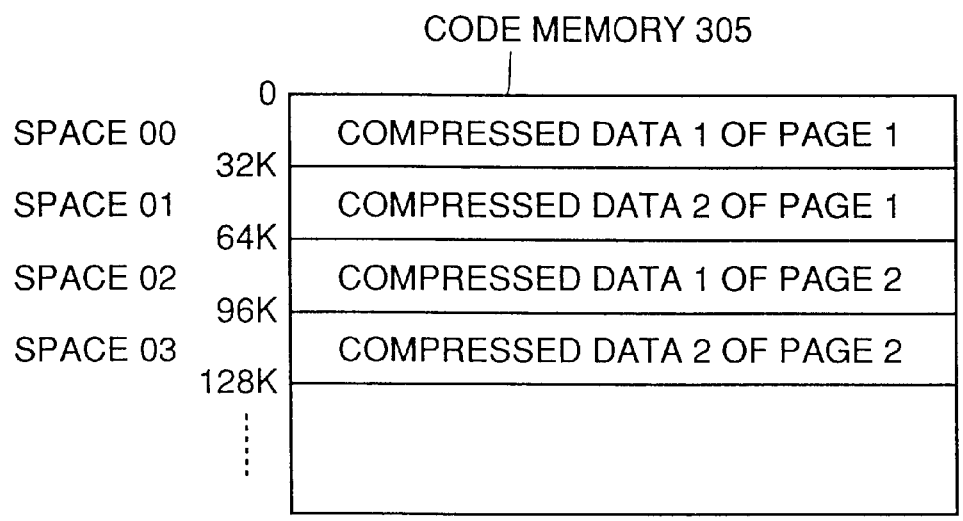
FIGS. 7A and 7B are views for illustrating a management table MT1 for management of a code memory.

FIGS. 7A and 7B are diagrams for illustrating a management table MT1 for management of code memory 305. FIG. 7A shows management table MT1 and FIG. 7B shows compressed data stored in code memory 305.

As shown in FIG. 7B, code memory 305 is divided into memory spaces of 32 Kbytes. In order to simultaneously control writing into code memory 305 (in reading the image of an original) and reading from code memory 305 (in printing an image on a sheet), code memory 305 stores the coded data per page in a respective space.

As shown in FIG. 7A, stored in management table MT1 are space number in code memory 305, page number of image data or original image number PN that is assigned in the order in which the image data is written or the original scanning order, forward-linked space number, backward-linked space number, and various additional information required for compression and decompression processes, such as compression system and data length. Code memory 305 is dynamically controlled depending on the information shown in management table MT1.

The "forward linkage" in management table MT1 indicates the forward linkage of a 32-Kbyte space in each page. A space of code memory 305 with a 00 forward linkage is the first storage space for the data of one page. Similarly, the "backward link" indicates the backward linkage of a 32-Kbyte space in each page. A space of code memory 305 with a FF backward link is the last storage space for the data of one page.

In reading image data from image memory 303 and compressing the image data into coded data, CPU 203 controls compressor 310 while producing information for management table MT1 and writes coded data into code memory 305. In reading coded data from code memory 305 and decompressing the coded data to image data, CPU 203 provides a reversed version of the above operation to read the coded data from code memory 305. The information of the page of interest in management table MT1 is erased when it is normally read and the number M of sheets or copies designated by the operator are completely copied.

Figure 8:
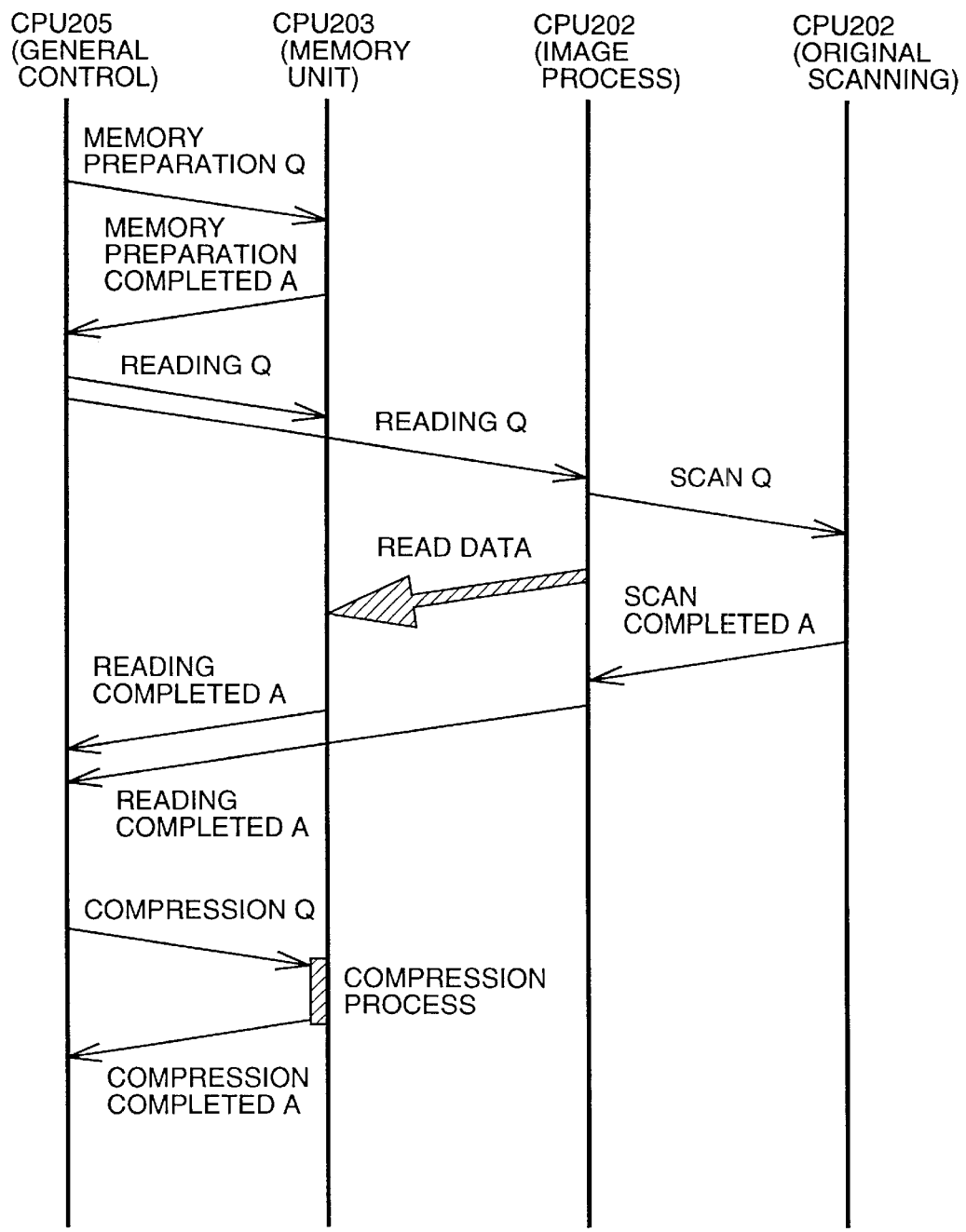
FIG. 8 represents a sequence of communication of commands and image data between CPUs in a memory write operation.
Figure 9:
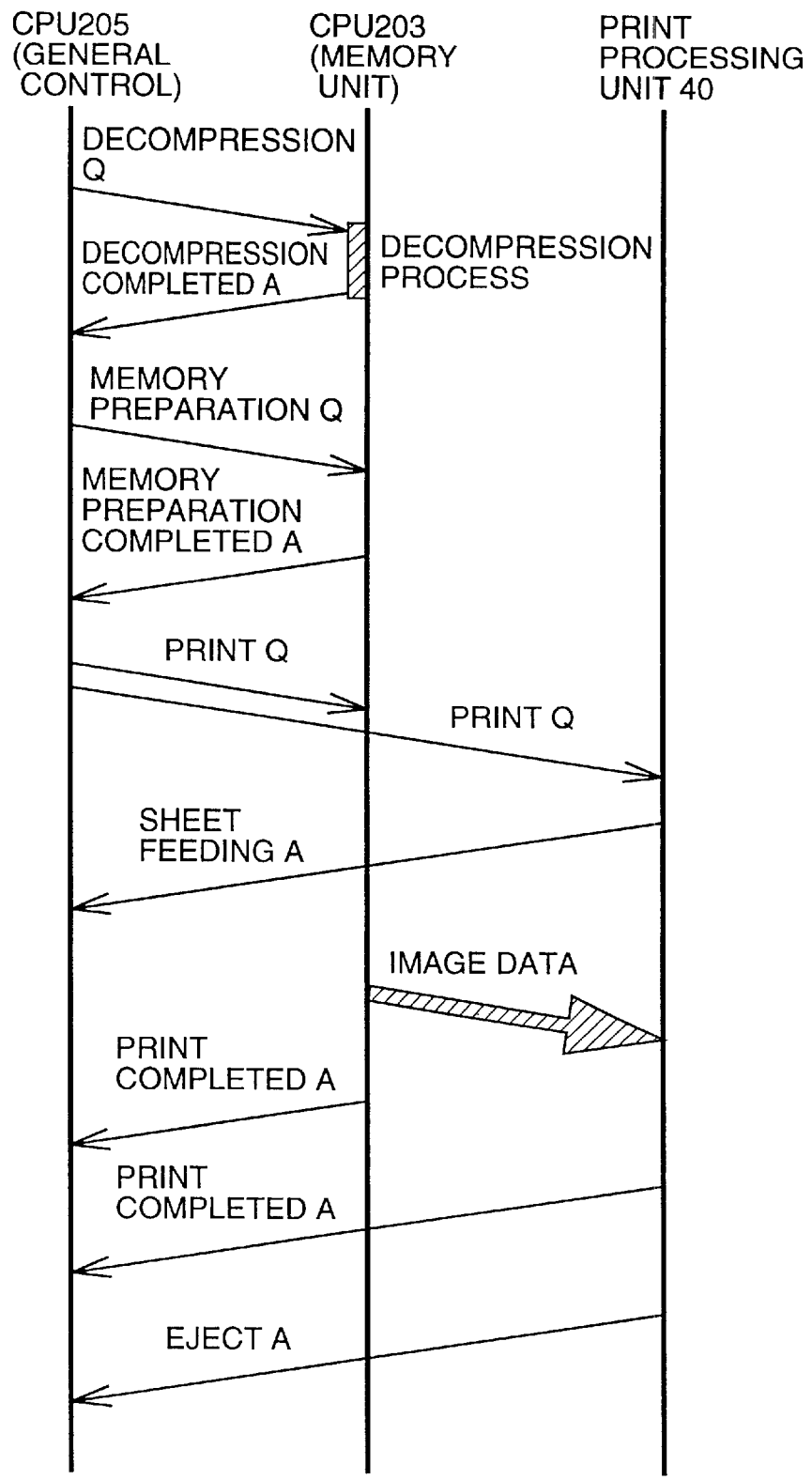
FIG. 9 represents a sequence of communication of commands and image data between CPUs in a memory read operation.

Referring now to FIGS. 8 and 9, a memory write operation and memory read operation of digital copier 1 will now be described mainly with respect to the request commands and reports, respectively indicated by Q and A in FIGS. 8 and 9, and image data stream communicated between the CPUs.

FIG. 8 shows a sequence of communication of the commands and image data between the CPUs in the memory write operation. The memory write operation allows image data to be transferred from image processing unit 20 (FIG. 5) to image memory 303 (FIG. 6).

In the memory write operation, CPU 205, which generally controls the sequence, initially requests CPU 203 to provide memory preparation. Responsively, CPU 203 sets for internal hardware a bus connection state for transferring image data from image processing unit 20 to image memory 303, a mode for a binarization process, an address for writing into image memory 303, XY length information, and the like.

When they are set and the preparation is thus completed, CPU 203 signals to CPU 205 that the memory preparation is completed. When CPU 205 responsively requests CPU 203 and CPU 202 (image process) to read an original, CPU 202 requests its internal, original scanning unit (CPU 202 (original scanning)) to scan the original.

When CPU 203 starts scanning it and the scanner (the first scanner 11 (FIG. 1)) reaches an image region, image data is transferred from image processing unit 20 to memory unit 30 depending on the image processing mode set by CPU 202.

When the original is completely scanned and CPUs 202 and 203 signal that the image data is completely read, CPU 205 requests CPU 203 to compress the image data. Responsively, CPU 203 sets an address for to reading from image memory 303, XY length information, an address for writing into code memory 305, an mode of compressor 310 (e.g. the MH system), and the like to initiate the associated portions. Thus a compression process is effected and coded data is written into code memory 305.

When the compression process is completed, CPU 203 signals to CPU 205 that the compression process is completed. If the entire code memory 305 is used during a compression process, CPU 205 receives a COMPRESSION COMPLETED report with a parameter indicating that compression cannot be provided. Thus CPU 205 is notified that code memory 305 is full.

FIG. 9 shows a sequence of communication of the commands and image data between the CPUs in the memory read operation. In the memory read operation, print processing unit 40 (FIG. 3) prints on a sheet an image depending on the image data read from image memory 303 (FIG. 6).

In the memory read operation, CPU 205, which generally controls the sequence, requests CPU 203 to decompress coded data. CPU 203 sets an address for reading from code memory 305, the amount of data, an address for writing into memory 303, XY length information, a mode for decompressor 311 (e.g. the MH system) and the like to initiate the associated portions. Thus a decompression process is provided and image data is written into image memory 303.

When the decompression process is completed, CPU 205 requests CPU 203 to prepare the image memory for reading the image data from image memory 303. Responsively, CPU 203 sets for internal hardware a bus connection state for transferring the image data from image memory 303 to print processing unit 40, a rotation process, an address for reading from image memory 303, XY length information, and the like.

When they are set and the preparation is thus completed, CPU 203 signals to CPU 205 that the memory preparation is completed. When CPU 205 responsively requests CPU 203 and print processing unit 40 to print the image, print processing unit 40 sends to CPU 205 a SHEET FEEDING report indicative of the current sheet transportation state and then the image data read from image memory 303 is output to printing process unit 40 to print the image.

When the image is completely printed, CPU 205 receives a PRINT COMPLETED report from CPU 203 and a PRINT COMPLETED report and an EJECT COMPLETED report from print processing unit 40. When CPU 205 receives these reports, CPU 205 requests CPU 203 to clear the memory as required.

Schematic procedures of the controls provided by the main CPUs, and the procedure of a control provided by CPU 203 that is particularly related to the present invention will now be described with reference to FIGS. 10 to 20. In the processes in the CPUs, communications between the CPUs are appropriately provided as interruption processes.

Figure 10:
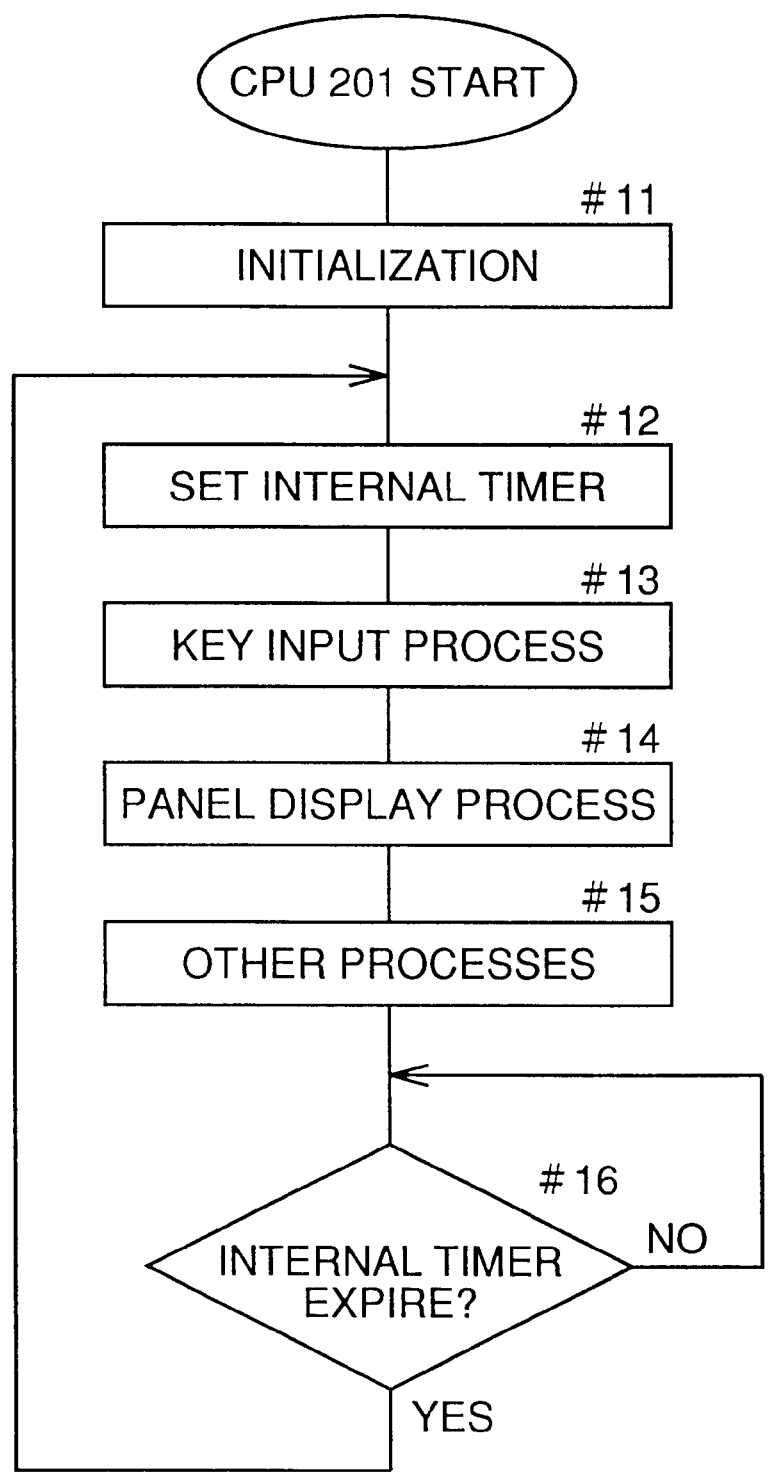
FIG. 10 is a flow chart of a main routine representing a procedure through which a CPU 201 controls operation panel OP.

FIG. 10 is a flow chart of a main routine representing a procedure through which CPU 201 controls operation panel OP.

When the copier is powered on, CPU 201 initially initializes RAM 221, a register and the like at step #11 and sets at #12 an internal timer which defines the length of one routine. Then, a key input process which accepts key operation is provided at #13, a panel display process which provides display depending on operation is provided at #14, and other processes are provided at #15.

After these processes, CPU 201 determines at #16 whether the internal time set at #12 has expired. If the internal timer has expired (YES at #16), one routine is terminated and the processes after #12 are repeated. If the internal timer has not yet expired (NO at #16), the process stays at #16 to wait until the internal timer expires.

Figure 11:
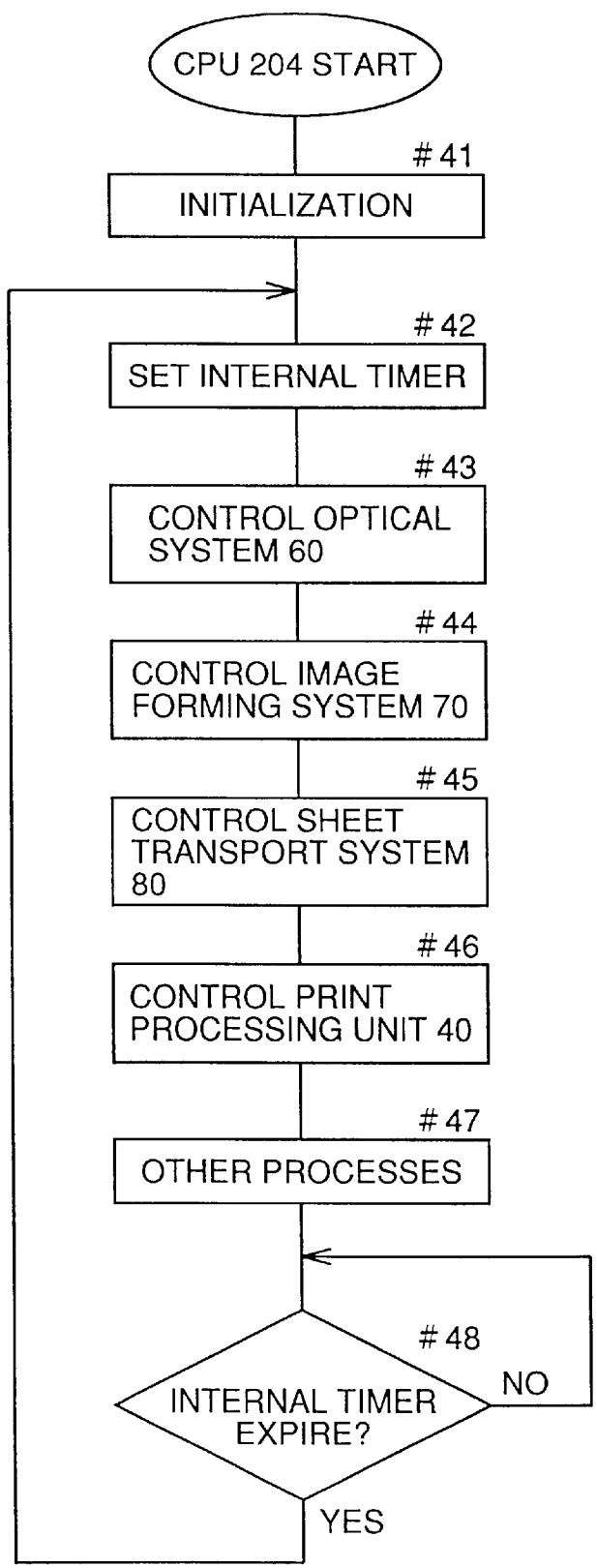
FIG. 11 is a flow chart of a main routine representing a procedure through which a CPU 204 controls a page printer PRT.

FIG. 11 is a flow chart of a main routine representing a procedure through which CPU 204 controls page printer PRT.

When the copier is powered on, CPU 204 initially initializes RAM 224, a register and the like at #41 and sets at #42 an internal timer which defines the length of one routine. Then, optical system 60, image forming system 70, sheet transport system 80, and print processing unit 40 are controlled at #43, #44, #45 and #46, respectively.

CPU 204 provides other processes at #47 and determines at #48 whether the internal timer has expired. If the internal timer has expired (YES at #48), one routine is terminated and the processes after #42 are repeated. If the internal timer has not yet expired NO at #48), the process stays at #48 and waits until the internal timer expires.

Figure 12:
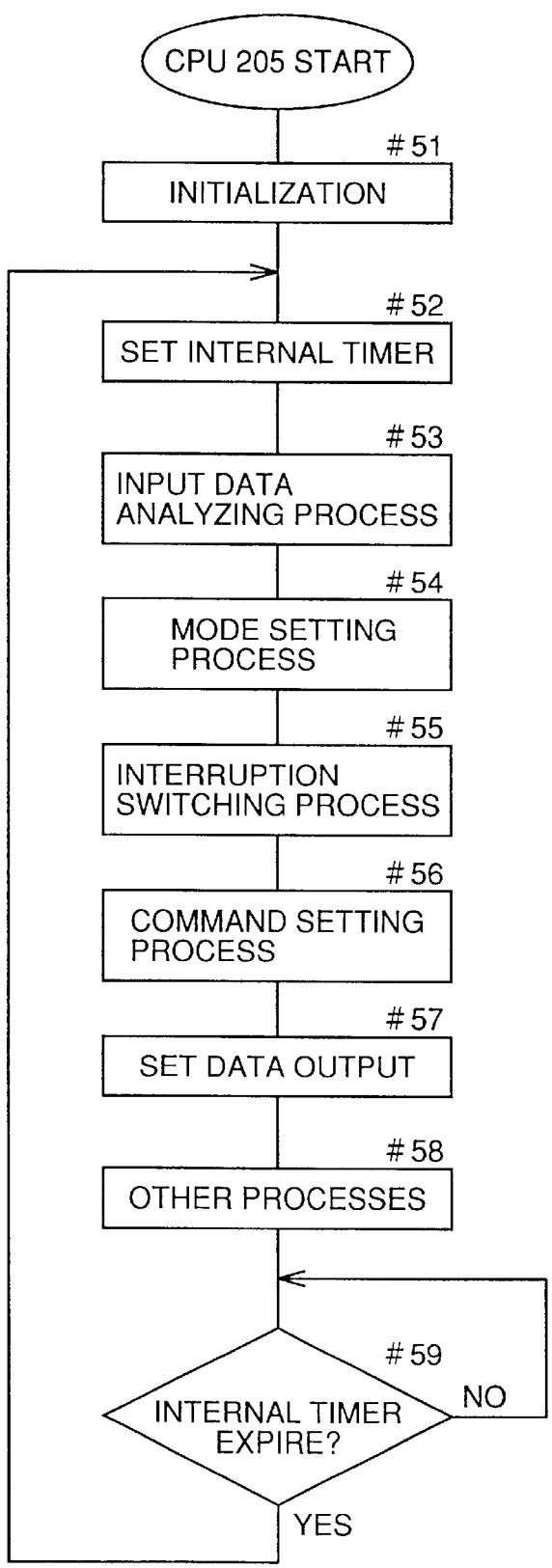
FIG. 12 is a flow chart of a main routine representing a procedure through which a CPU 205 generally controls the digital copier.

FIG. 12 is a flow chart of a main routine representing a procedure of a control provided by CPU 205 which generally controls digital copier 1.

When the copier is powered on, CPU 205 initially initializes RAM 225, a register and the like at #51 and sets at #52 an internal timer which defines the length of one routine. Then, the data input from the other CPUs are checked and analyzed at #53 and an operation mode depending on the content of operation is determined at #54. An interruption into another CPU is switched at #55, a command depending on the operation mode is set at #56, and a command which stands by at a communication port is set at #57.

After these processes, CPU 205 provides other processes at #58 and determines at #59 whether the internal timer has expired. If the internal time has expired (YES at #59), one routine is terminated and the processes after #52 are repeated. If the internal timer has not yet expired (NO at #59), the process stays at #59 and waits until the internal timer expires.

Figure 13:
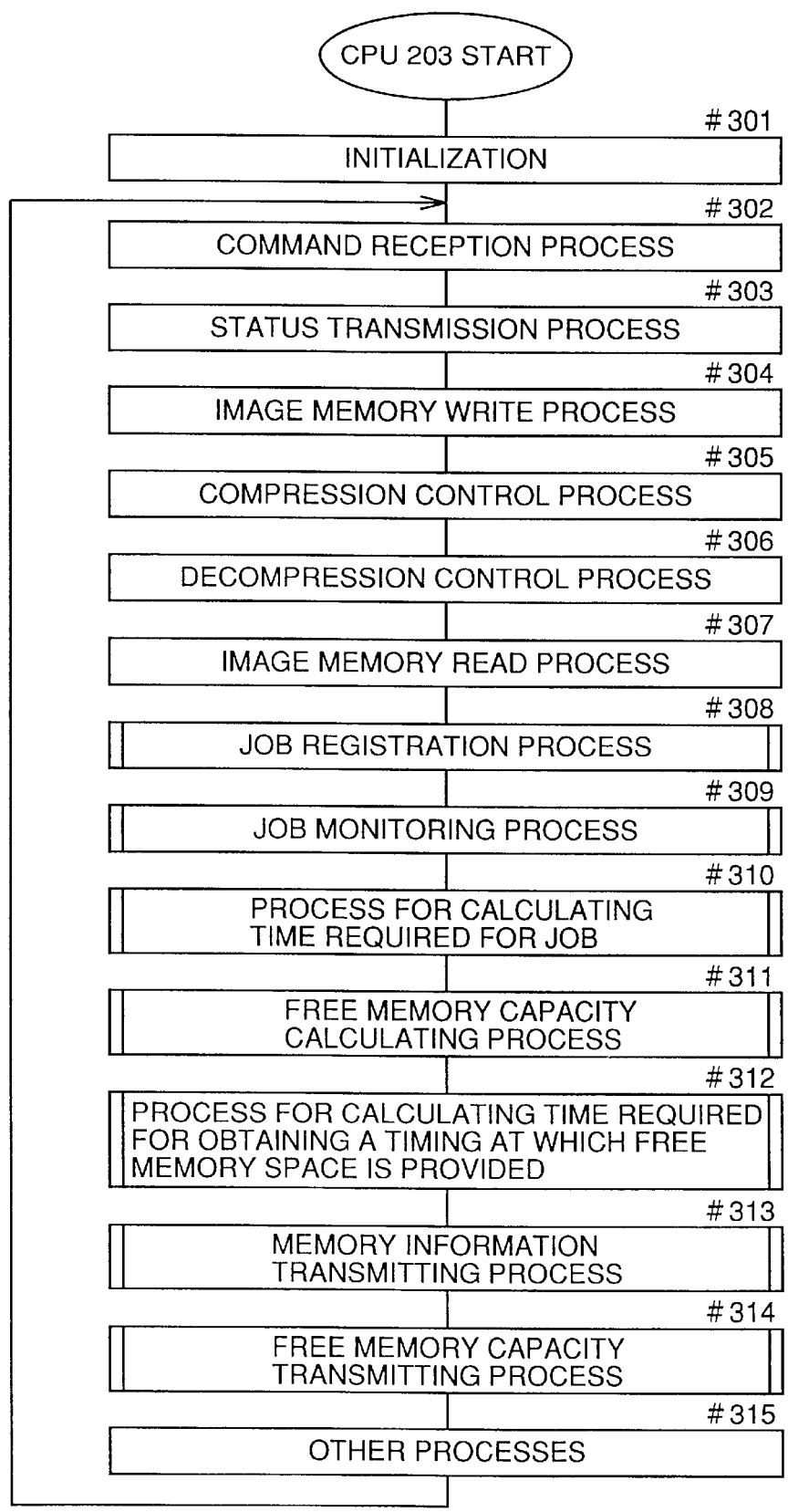
FIG. 13 is a flow chart of a main routine representing a procedure through which a CPU 203 controls a memory unit.

FIG. 13 is a flow chart of a main routine of a procedure through which CPU 203 controls memory unit 30.

When the copier is powered on, CPU 203 initially initializes RAM 223, a register and the like at #301. Then CPU 203 receives a command from CPU 205 at #302 and transmits a status to CPU 205 at #303. Then, writing into the image memory, compression of image data, decompression of coded data, and reading from the image memory are controlled at #304 to #307, respectively.

After these processes, a job registering process is provided at #308, a job monitoring process at #309, a process of calculating the time required for a job at #310, a free memory capacity calculating process at #311, a process of calculating the time required to obtain a timing at which a free memory space is provided at #312, a memory information transmitting process at #313, and a free memory capacity transmitting process at #314. The processes at #308 to #314 are provided in the respective subroutines, which will be described hereinafter with reference to FIGS. 14–20. Then, other processes are provided at #315 and the processes after #302 are then repeated.

The memory information, flee memory capacity information and the like obtained by the processes at #308 to #314 are transmitted at the #303 status transmitting process to CPU 201 via CPU 205 and displayed on liquid crystal touch panel 91 (FIG. 2).

Figure 14:
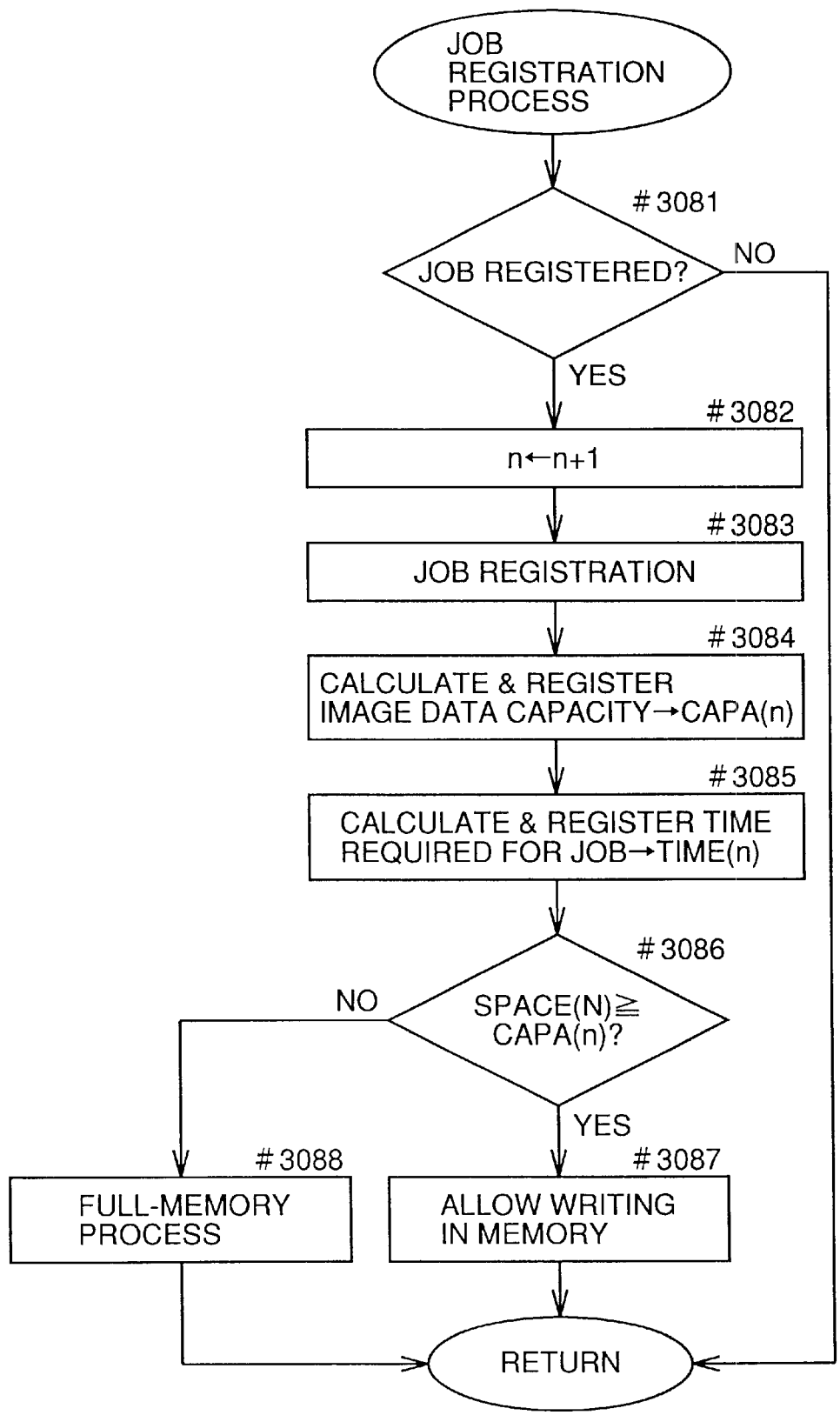
FIG. 14 is a flow chart representing a procedure of a process effected in the job registration processing routine at #308 shown in FIG. 13.

The #308 to #314 processes shown in FIG. 13 will now be described with reference to FIGS. 14–20. FIG. 14 is a flow chart of the procedure of the process provided in the #308 job registering process routine shown in FIG. 13.

In the job registering process routine, decision is initially made at #3081 whether a new job has been registered. If a new job is not registered (NO at #3081), the present routine is terminated. If a new job has been registered (YES at #3081), the process goes to #3082 at which n plus one is assigned as the job number of the latest registered job. It should be noted that 0 is substituted for n as an initial value.

Then at #3083, the image data of an original is read and registered as a new job. At #3084, the capacity of the image data of the job with a job-no. n that is compressed is calculated and substituted for CAPA(n) indicative of capacity of compressed image data. At #3085 the time required for executing the job with job-no. n is calculated and substituted for TIME (n) indicating the time required for job execution.

Then, decision is made at #3086 whether SPACE(N) indicative of the amount of free memory capacity up to the currently executed job with job-no. N is not less than CAPA(n). If SPACE(N) is less than CAPA(n) (NO at #3086), a full-memory process (depending on which the indication shown in FIG. 23 or 24 hereinafter is displayed on liquid crystal touch panel 91) is effected at #3088. If SPACE(N) is not less than CAPA(n) (YES at #3086), image data is allowed to be written into the memory at #3087 (the image data is practically written in the #304 image memory write process shown in FIG. 13) and the present routine ends. Thus a new job is completely registered.

Figure 15:
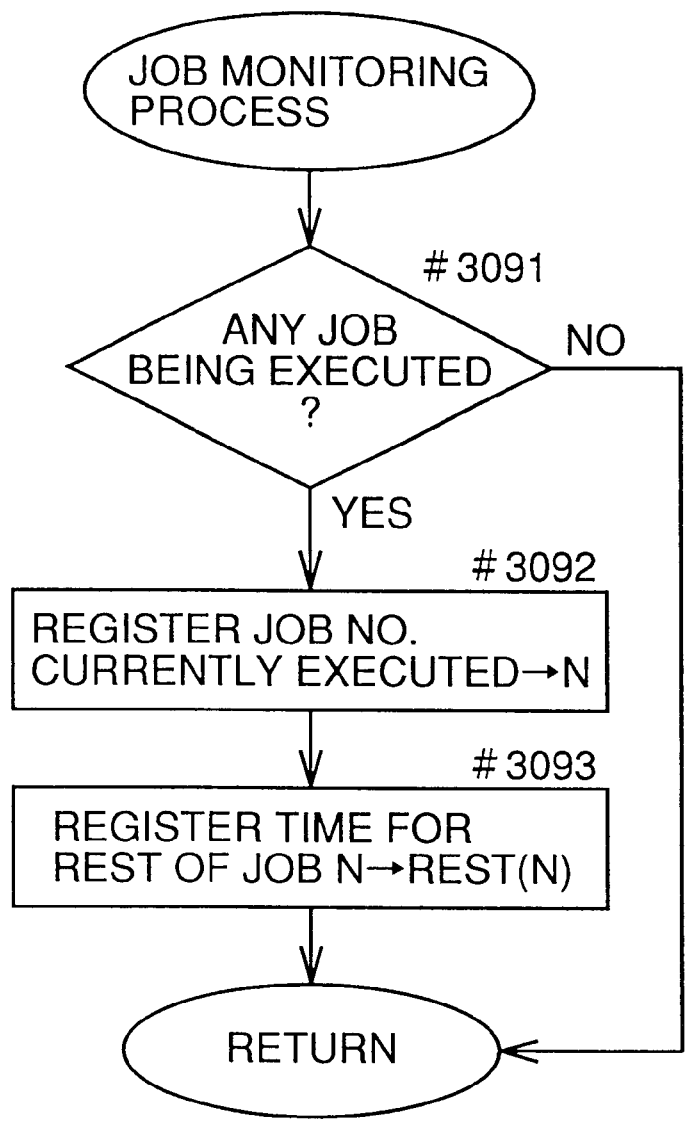
FIG. 15 is a flow chart representing a procedure of a process effected in the job-monitoring processing routine at #309 shown in FIG. 13.

FIG. 15 shows a flow chart representing a procedure of the process effected in the #309 job monitoring process routine shown in FIG. 13.

In the job monitoring process routine, decision is initially made at #3091 whether any job is currently executed. If any job is not currently executed (NO at #3091), the present routine is terminated. If any job is currently executed (YES at #3091), the process goes to #3092. At #3092 the job number of the currently executed job is registered as N and at #3093 the time required for executing the rest of job N is registered as REST(N) and the present routine ends. Thus the currently executed job is monitored.

Figure 16:
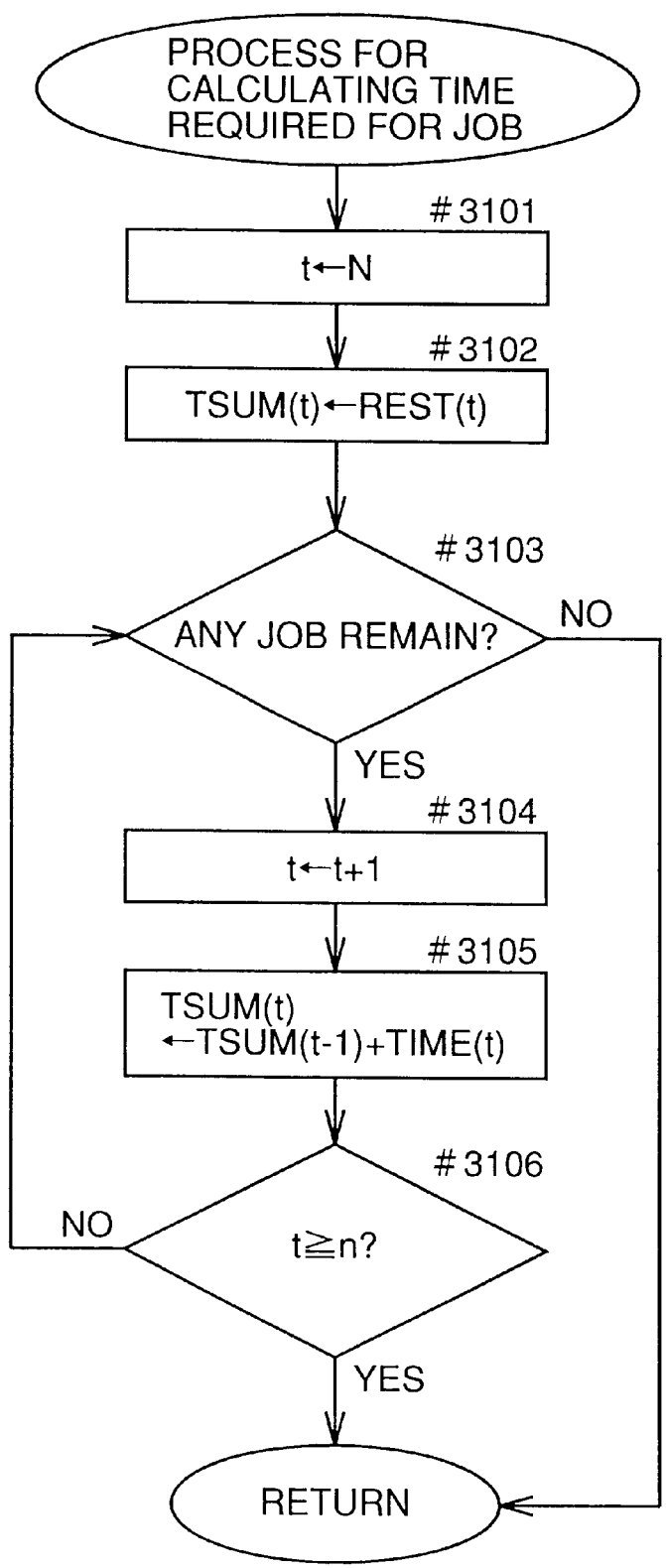
FIG. 16 is a flow chart representing a procedure of a process effected in the process routine for calculation of the time required for a job at #310 shown in FIG. 13.

FIG. 16 is a flow chart representing a procedure provided in the routine of the process of calculating the time required for job execution at #310 shown in FIG. 13.

In the routine of the process of calculating the time required for job execution, initially at #3101 the job number of the currently executed job, i.e. N, is substituted for a variable t, and at #3102 a time REST(t) remaining for executing the job with job-no. t is substituted for a time TSUM(t) taken to complete the job with job-no. t. Then, decision is made at #3103 whether there is any remaining job that has been registered but has not been executed. If there is not any such remaining job (NO at #3103), the present routine is completed. If there is any such remaining job (YES at #3103) the process goes to #3104.

At #3104, 1 is added tot. At #3105, TSUM(t) is substituted by TSUM(t-1) indicative of the time taken until the job with job-no. (t-1) is completed plus TIME(t) indicative of the time required for executing the job with job no. t. At #310, decision is made whether t is not less than n. If t is less than n (NO at #3106), the process goes to #3103. If t is not less than n (YES at #3106), the present routine ends. Thus, times TSUM(N) to TSUM(n) required until the job with job-no. N to the job with job-no. n are completed are calculated.

Figure 17:
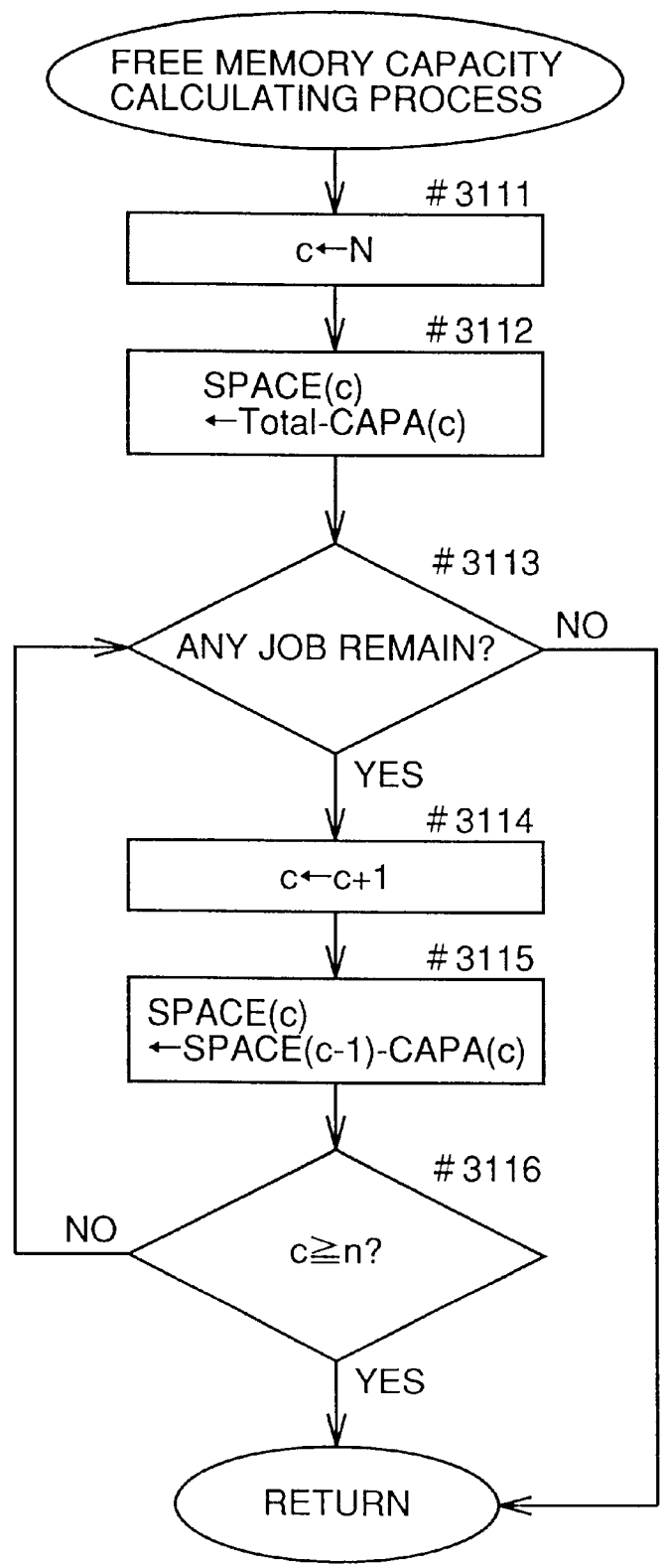
FIG. 17 is a flow chart representing a procedure of a process effected in the flee memory capacity calculation processing routine at #311 shown in FIG. 13.

FIG. 17 is a flow chart representing a procedure of the process effected in the routine of the #311 free memory capacity calculation process shown in FIG. 13.

In the free memory capacity calculating process routine, initially at #3111 a variable c is substituted by the job number of the currently executed job, i.e. N. At #3112, SPACE(c) indicating the free memory capacity in executing up to the job with job-no. c is substituted by a total memory capacity Total minus CAPA(c) indicating the compressed image data capacity used for executing the job with job-no. c. Then, decision is made at #3113 whether there is any remaining job that has been registered but not yet executed. If there is not any such remaining job (NO at #3113), the routine completes. If there is any such remaining job (YES at #3113), the process goes to #3114.

At #3114, 1 is added to c. At #3115, SPACE(c) is substituted by SPACE(c-1) minus CAPA(c), wherein SPACE(c-1) represents the free memory capacity in executing the job with job-no. (c-1). At #3116, decision is made whether cis at least n. If c is no at least n (NO at #3116), the process goes to #3113. If c is at least n (YES at #3116), the present routine completes. Thus, free memory capacities SPACE(N) to SPACE(n) in executing the jobs with job-nos. N to n are calculated.

Figure 18:
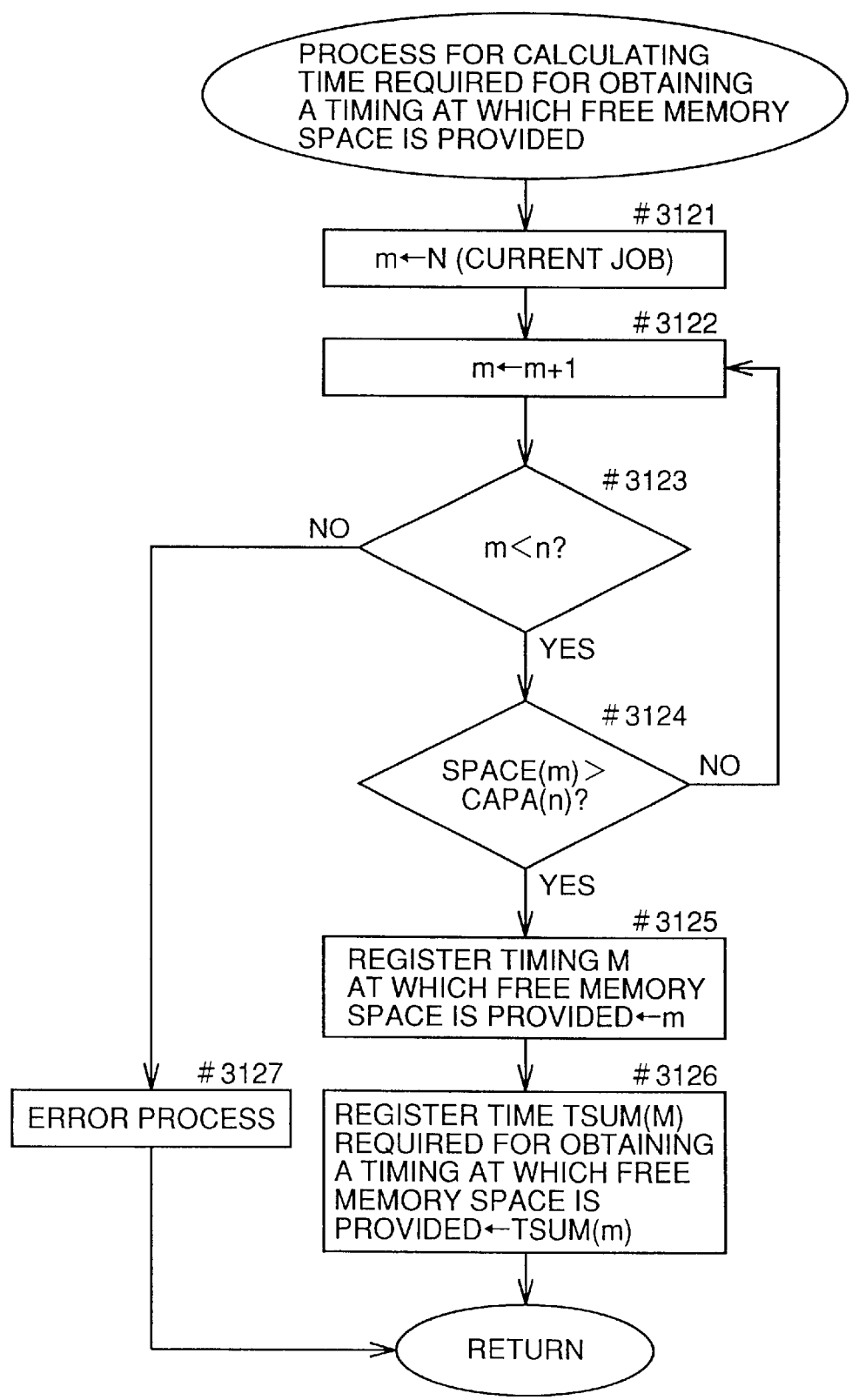
FIG. 18 is a flow chart representing a procedure of a process effected in the routine for processing of calculation of the time required to obtain a timing at which a free memory space is available at #312 shown in FIG. 13.

FIG. 18 is a flow chart representing a procedure of the process provided in the routine of the #312 process for calculating the time required for obtaining the timing at which a free memory space is provided shown in FIG. 13.

In this routine, initially at #3121 a variable m is substituted by the job number of the currently executed job, i.e. N.

At #3122, 1 is added to m. Then, at #3123, decision is made whether m is smaller than n indicative of the job number of the latest registered job. If m is not smaller than n (NO at #3123), an error process is provided at #3127. If m is smaller than (YES at #3123), the process goes to #3124.

At #3124, decision is made whether SPACE(m) indicating the free memory capacity in executing the job with job-no. m is larger than CAPA(n) indicating the compressed image data capacity used for executing the job with job-no. n. If SPACE(m) is not larger than CAPA(n) (NO at #3124), the process goes to #3122. If space(m) is larger than CAPA(n) (YES at #3124), the process goes to #3125.

At #3125, a value M indicative of a timing at which a free memory space is provided is substituted by a value m as a timing at which a memory required for registering the job with job-no. n is secured (or the timing at which job m completes is substituted for timing M). At #3126, a value TSUM(M) indicative of the time required for obtaining a timing at which a free memory space is provided is substituted by TSUM(m) as the time required until the job with job no. n is registered (or the time taken until the timing at which job m completes is substituted as TSUM(M)) and the present routine thus completes.

Thus, timing M is obtained and TSUM(M) is calculated.

Figure 19:
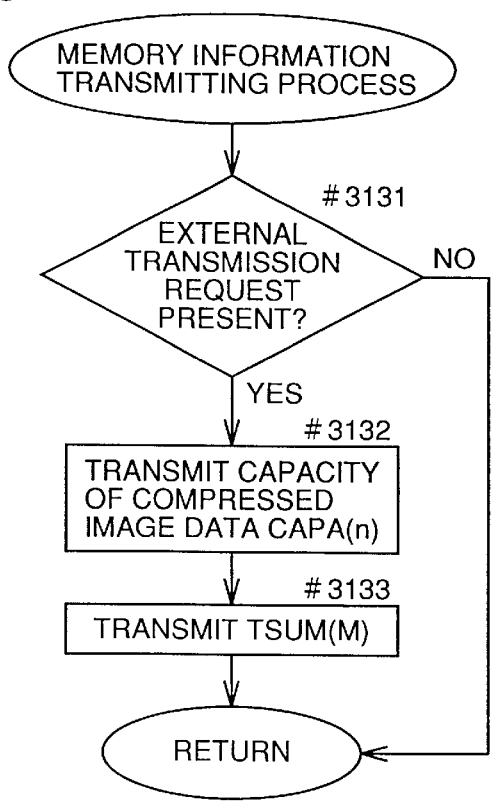
FIG. 19 is a flow chart representing a procedure of a process effected in the memory information transmission processing routine at #313 shown in FIG. 13.

FIG. 19 is a flow chart representing a procedure of the process provided at the #3113 memory information transmitting process routine shown in FIG. 13.

In the memory information transmitting process routine, determination is initially made at #3131 whether any external transmission request is present. If any such transmission request is not present (NO at #3131), the present routine completes. If any such transmission request is present (YES at #3131), the process goes to #3132. At #3132, CAPA(n) is transmitted. At #3131, TSUM(M) is transmitted and the present routine completes.

Thus, CAPA(n) and TSUM(M) for the job with job-no. n which was about to be registered most lately, are transmitted.

Figure 20:
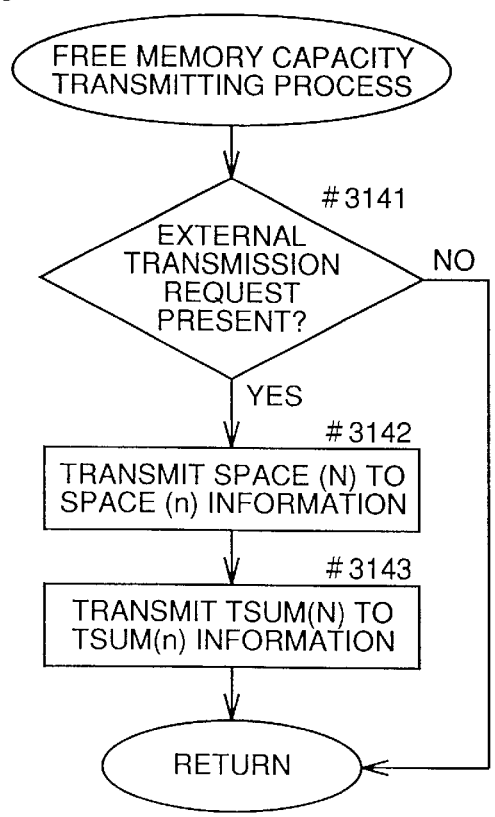
FIG. 20 is a flow chart representing a procedure of a process effected in the flee memory capacity transmission processing routine at #314 shown in FIG. 13.

FIG. 20 is a flow chart representing a procedure of the process provided in the #314 free memory capacity transmitting process routine shown in FIG. 13.

In the free memory capacity transmitting process routine, decision is initially made at #3141 whether any external transmission request is present. If any such transmission request is not present (NO at #3141), the present routine ends. If any such transmission request is present (YES at #3141), the process goes to #3142. At #3142 SPACE(N) to SPACE(n) are transmitted and at #3143 TSUM(N) to TSUM (n) are transmitted and the present routine completes.

Thus, SPACE(N) to SPACE(n) and TSUM(N) to TSUIM (n) are externally transmitted.

An indication on liquid crystal touch panel 91 (FIG. 2) in normal job registration will now be described with reference to FIGS. 21 and 22A and 22B.

Digital copier 1 is capable of storage of a plurality of jobs. Any job that is stored and waiting to be printed is displayed as shown in FIG. 21. In FIG. 21, the liquid crystal touch panel displays that there are three jobs waiting to be printed.

Figure 21:
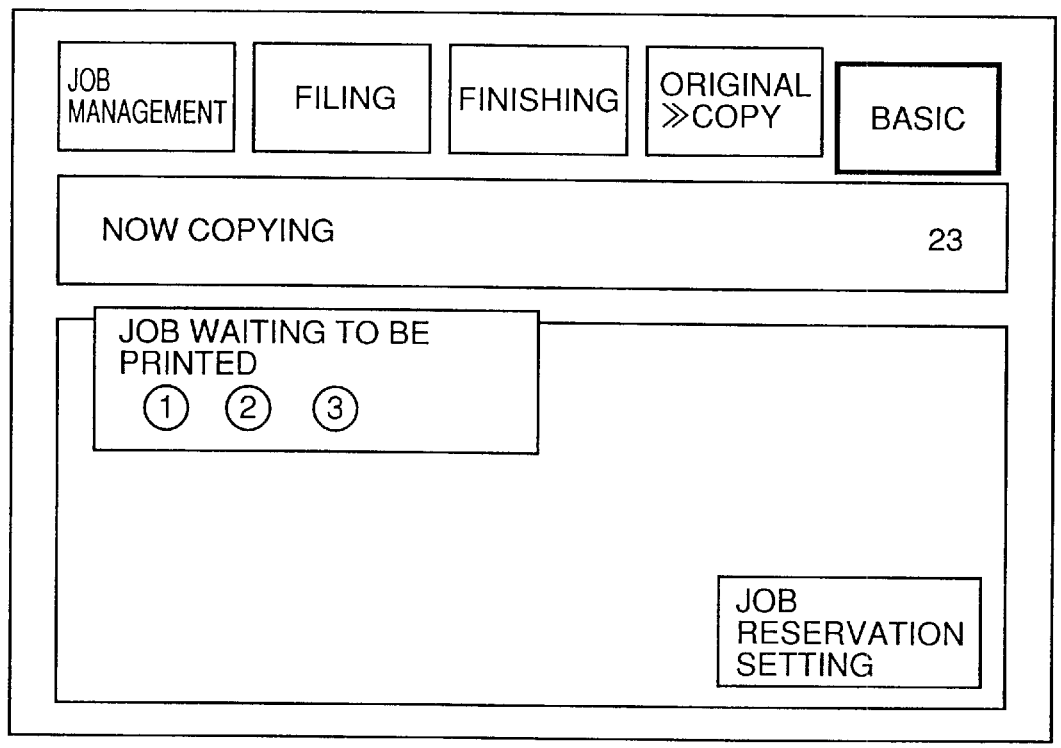
FIG. 21 is a first view illustrating an indication on a liquid crystal touch panel in registering a job.
Figure 22A:
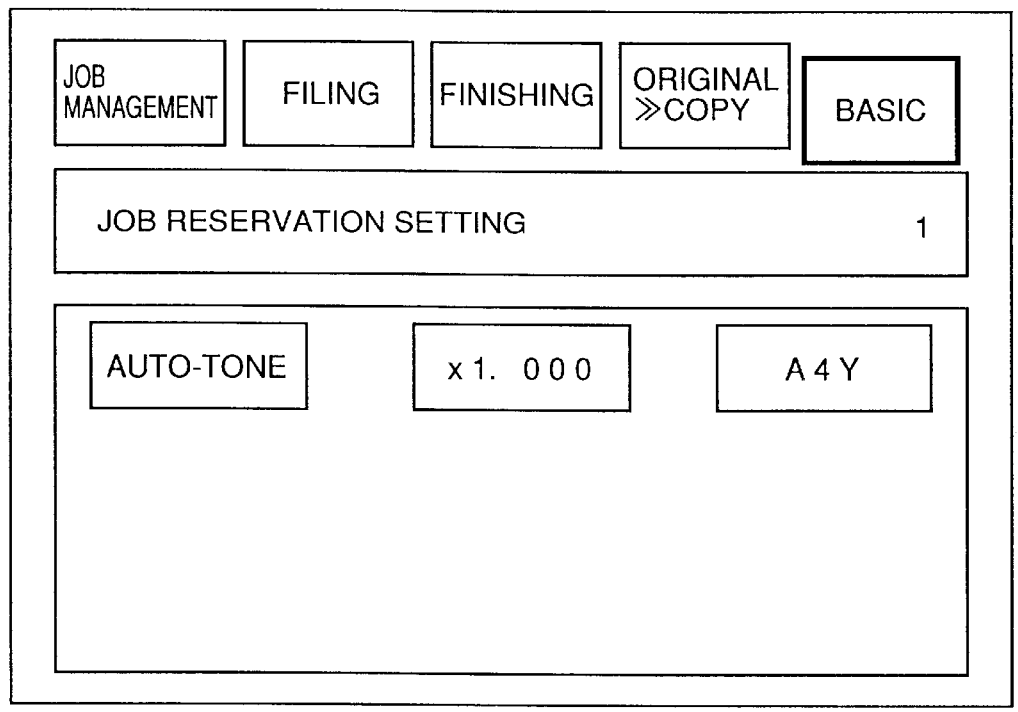
FIGS. 22A and 22B are second and third views illustrating indications on the liquid crystal touch panel in registering a job.

If job registration is allowed, a JOB RESERVATION SETTING key on the FIG. 21 liquid crystal touch panel 91 that is pressed by the user allows the indication shown in FIG. 22A to be displayed on liquid crystal touch panel 91 and the user can thus select a copy mode for an original. When the user presses registration key 112 (FIG. 2) after setting the copy mode, a job is registered and an indication similar to FIG. 21 is displayed with four job waiting to be printed.

Figure 22B:
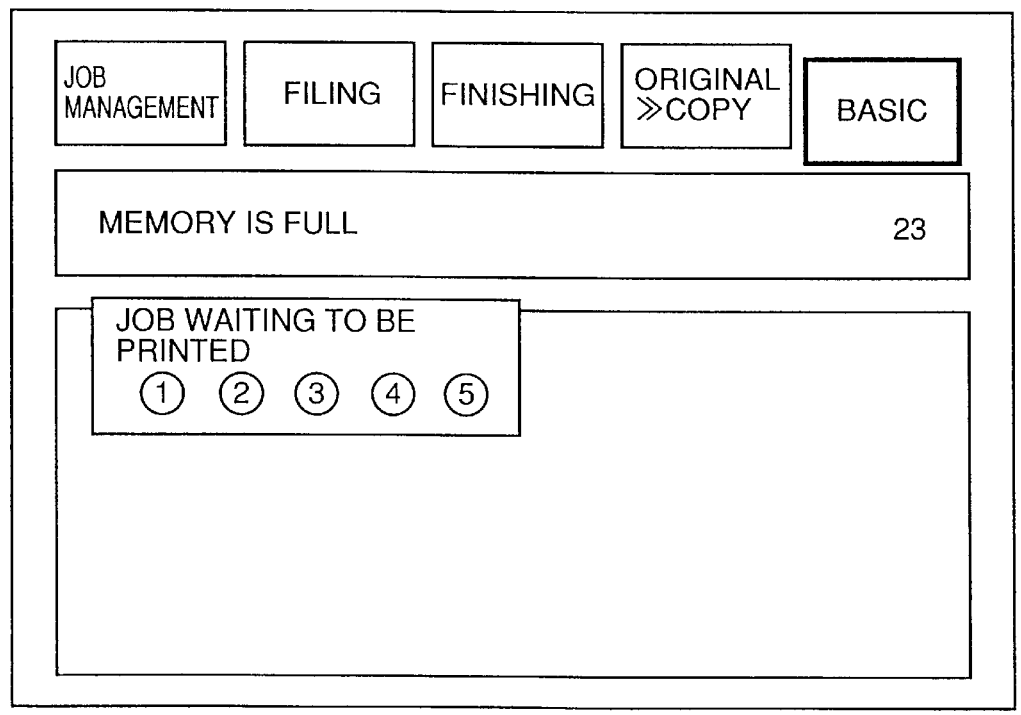

When job registration is not allowed or the memory is full, an indication that the memory is full as shown in FIG. 22B, is displayed corresponding to the #3088 full-memory process shown in FIG. 14 and any new job is not registered.

Indications provided by digital copier 1 that can be provided by the control described above will now be described with reference to FIGS. 23 and 24. The indications are displayed depending on the transmission of TSUM(M), TSUM(N) to TSUM(n), CAPA(n), SPACE(N) to SPACE(n) and the like to CPU 201.

Figure 23:
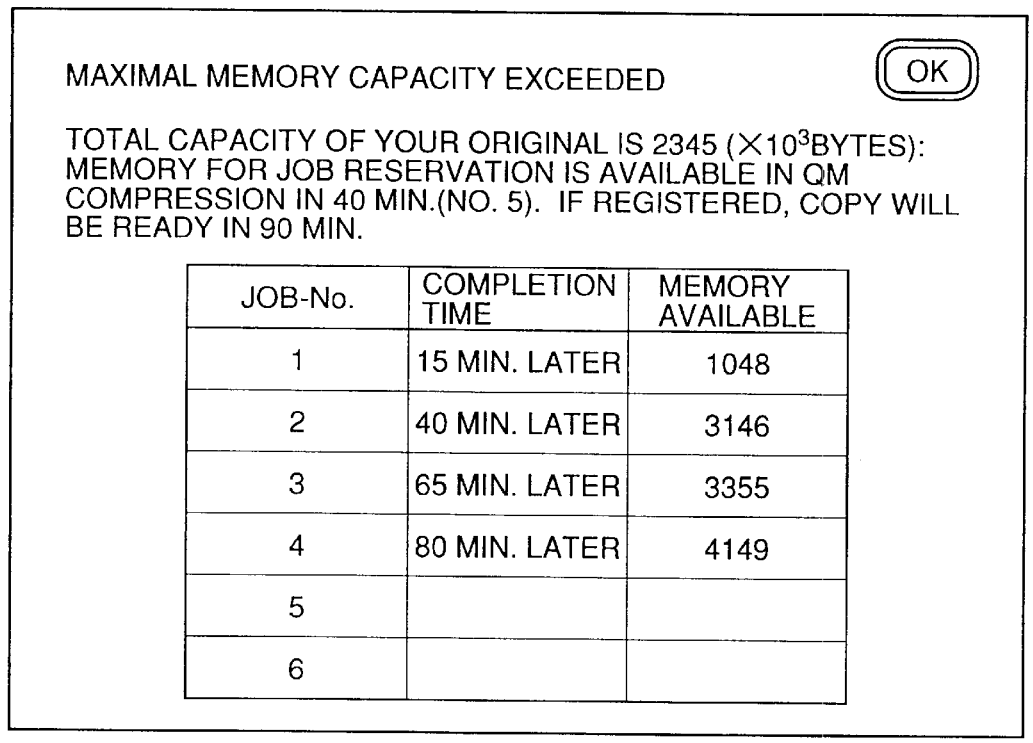
FIG. 23 is a first view showing an indication on the liquid crystal touch panel when the image data of a job is over the full capacity of the memory.

FIG. 23 is a first view showing an indication on liquid crystal touch panel 91 (FIG. 2) when the image data of a job is over the memory's capacity or causes the full-memory state.

The indication shown in FIG. 23 displays that the image data of an original which the user tries to register cannot be registered since the memory is full, that the image data of the original which the user tries to register has a total capacity of 2345 Kbytes if it is compressed in the QM compression system, that the image data can be registered as the job with job-no. 5 in a flee memory space available 40 minutes later, and that the registration 40 minutes later allows the original to be copied in 90 minutes.

Also displayed in this indication are the time at which each job completes and the amount of memory available when each job completes. For example, the job with job-no. 2 will complete 40 minutes later and the amount of memory available when the job completes is 3146 Kbytes.

Figure 24:
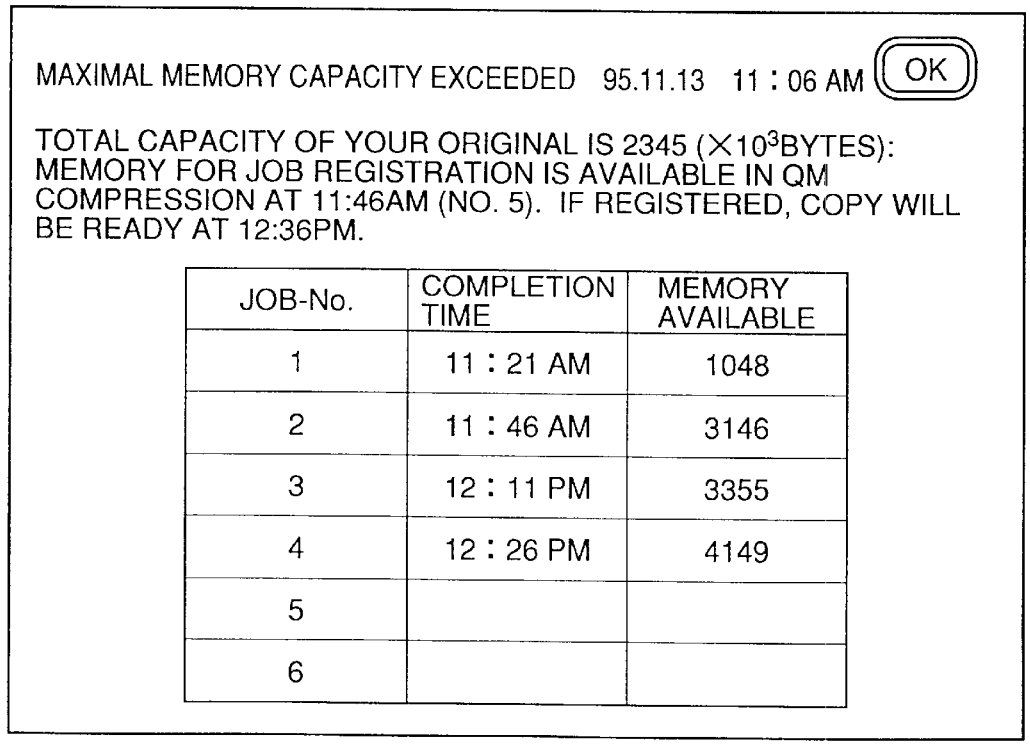
FIG. 24 is a second view showing an indication on the liquid crystal touch panel when the image data of a job is over the full capacity of the memory.

FIG. 24 is a second view showing an indication on liquid crystal touch panel 91 (FIG. 2) when the image data of a job is over the memory's capacity or causes the full-memory state.

The indication shown in FIG. 24 indicates that the image data of an original which the user tries to register cannot be registered since the memory is full, that the image data of the original which the user tries to register has a total capacity of 2345 Kbytes if it is compressed in the QM compression system, that the image data can be registered as the job with job-no. 5 in a free memory space available at 11:46 AM, and that the registration at 11:46 AM allows the original to be copied at 12:36 PM.

Also displayed in this indication are the time at which each job completes and the amount of memory available when each job completes. For example, the job with job-no. 3 is completed at 12:11 PM and the amount of memory available when the job is completed is 3355 Kbytes.

When digital copier 1 cannot register an original as a job, digital copier 1 allows the image data capacity of the original and the time at which the job can be registered to be displayed as described above. Thus, the user can print the image on another image formation apparatus that can print the image, based on an original, sooner. This allows the image to be printed efficiently.

An image formation system including the digital copier 1 described above and a computer which controls image printing by digital copier 1 will now be described with reference to FIGS. 25–27.

Figure 25:
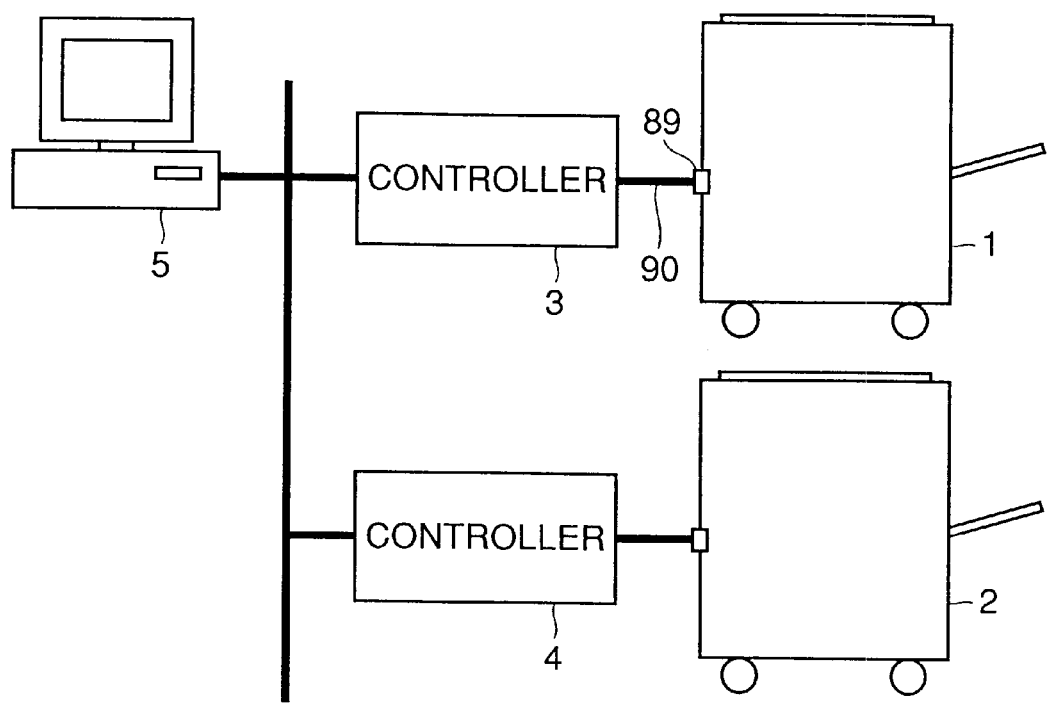
FIG. 25 is a view for illustrating the entirety of a configuration of an image formation system including a digital copier and a computer.

FIG. 25 illustrates the entirety of an configuration of an image formation system including digital copier 1 and computer 5. FIG. 26 schematically shows a configuration of a controller 3 shown in FIG. 25.

As shown in FIG. 25, the image formation system includes digital copiers 1 and 2, controllers 3 and 4 as a general-purpose interface such as Ethernet and also as one example of the external equipment mentioned above, and computer 5 which controls the image printing operation provided at digital copiers 1 and 2. Digital copier 1 and controller 3 are connected together via a connector 89 for connection to external equipment and an external cable 90. Digital copier 2 is similar in configuration, operation and the like to digital copier 1, and controller 4 is similar in configuration, operation and the like to controller 3.

Figure 26:
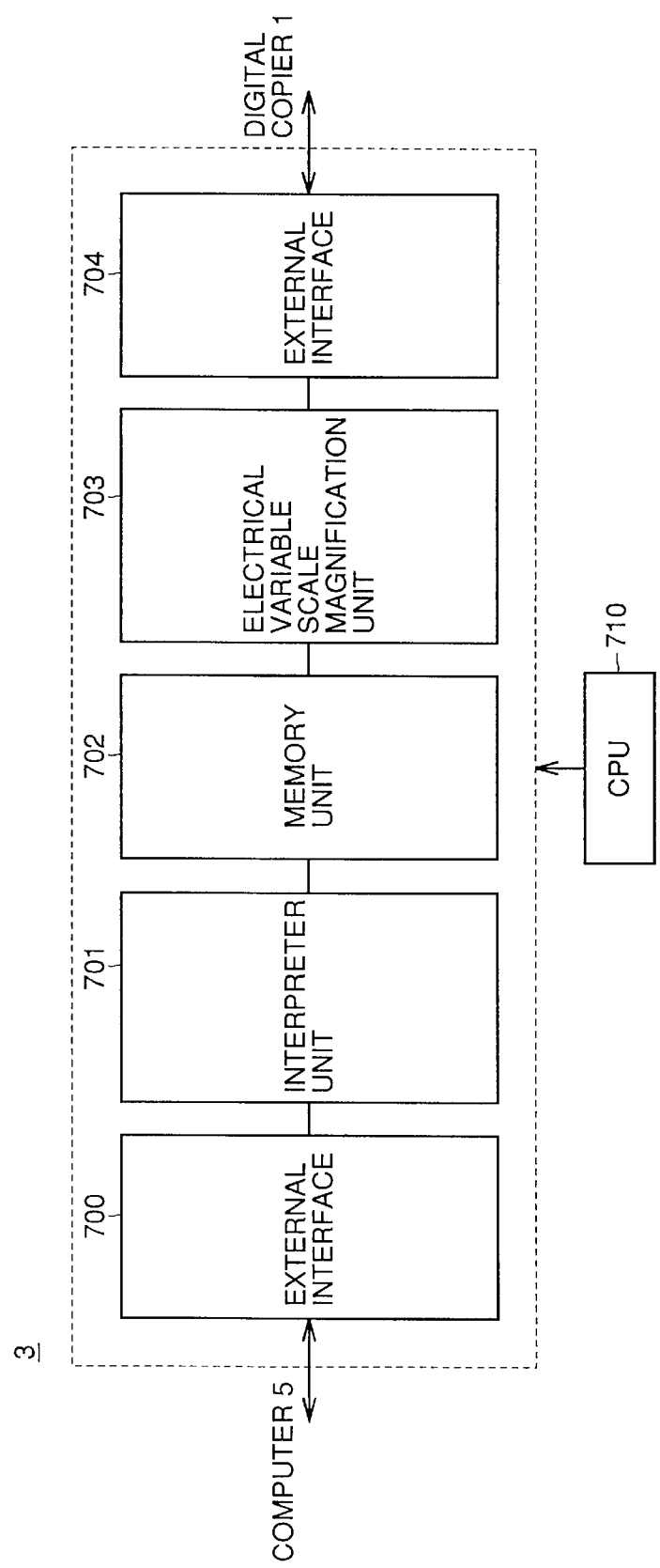
FIG. 26 represents a schematic configuration of the FIG. 25 controller.

As shown in FIG. 26, controller 3 is generally controlled by a CPU 710 and includes an external interface 700 for transmitting and receiving data to and from computer 5, an interpreter unit 701 which interprets the data transmitted from computer 5 and develops the interpreted data into raster data, a memory unit 702 for storage of the image data developed into the raster data, an electrical variable scale magnification unit 703 which adjust the magnification of an image depending on the rate adjustment data in the subscanning direction of the image in digital copier 1, and an external interface 704 for transmitting and receiving data to and from digital copier 1.

For the present image formation system, an image is printed depending on a data file formed on computer 5. Accordingly, when sheet size, magnification, the number of sheets printed and the like are set on computer 5 and a printing instruction is input, image data, various setup conditions and the like are transmitted to controller 3 or controller 4. Controller 3 has a memory of at least one screen and converts the image data (e.g. postscript data) transmitted from computer 5 into raster data. The image data converted by controller 3 and the various setup conditions are transmitted to digital copier 1, which forms an image on a sheet and provides a process depending on the various setup conditions. It should be noted that the present invention is not limited to such a form of image formation system and is applicable to any system that provides a similar effect, including modem, facsimile connected via telephone line and the like.

Figure 27:
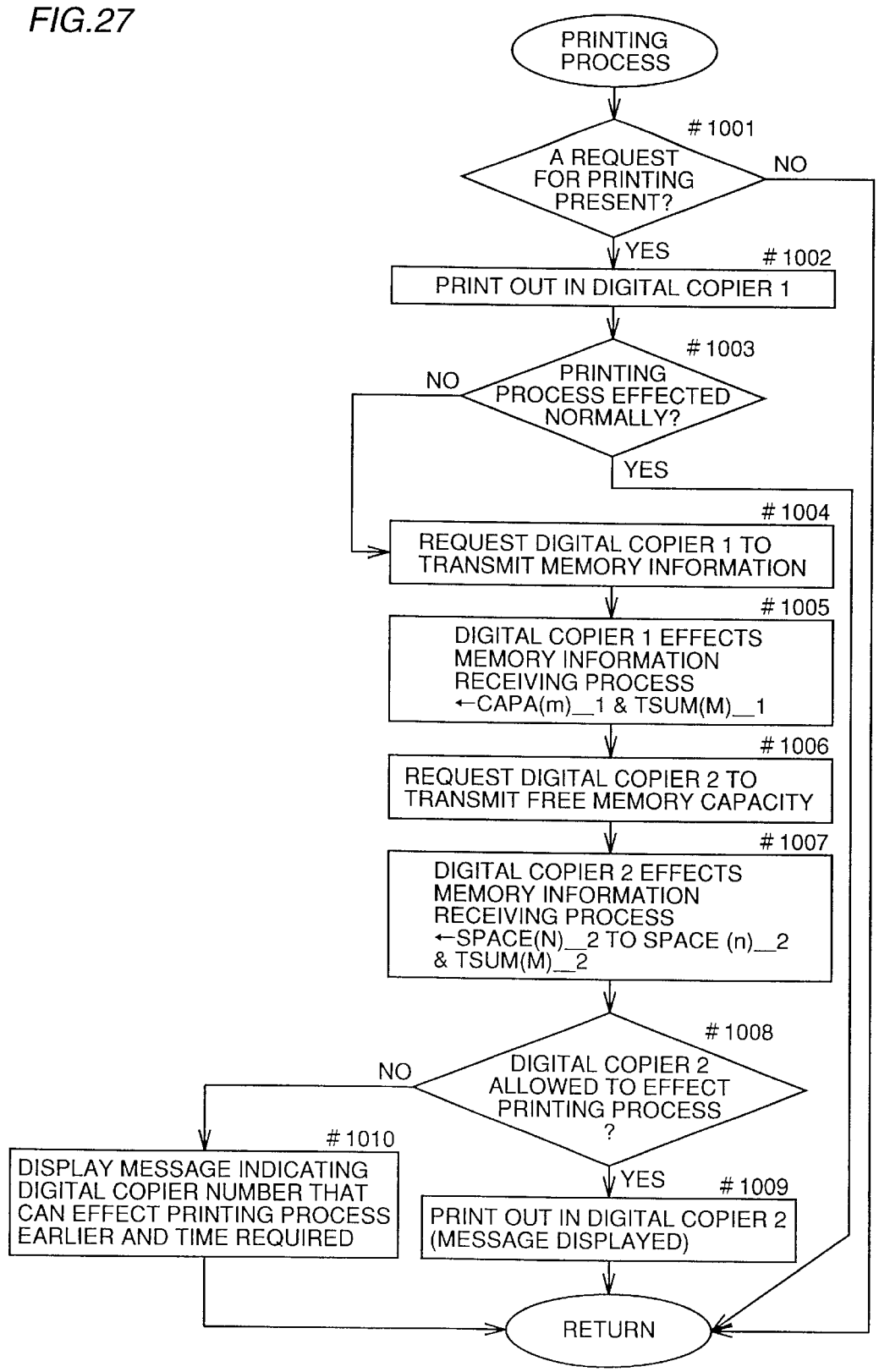
FIG. 27 is a flow chart representing a procedure of a computer-controlled print process with respect to a digital copier.

FIG. 27 is a flow chart representing a procedure of a printing process controlled by computer 5 with respect to digital copiers 1 and 2.

In the printing process, decision is initially made at #1001 whether there is a request for printing in computer 5. If there is not a request for printing therein (NO at #1001), the routine ends. If there is a request for printing therein (YES at #1001), image data, various setup conditions and the like are output to digital copier 1 at #1002 to provide the printing.

Decision is then made at #1003 whether the printing requested has been processed normally. If the printing has been processed normally (YES at #1003), the present routine ends. If the printing has not been processed normally (NO at #1003), digital copier 1 is requested to transmit memory information at #1004. Responsively, digital copier 1 transmits CAPA(n)_1 (hereinafter, _1 and _2 respectively indicate the information from digital copier 1 and the information of digital copier 2) and TSUM(M) _1, which are received by computer 5 at #1005.

Then at #1006, digital copier 2 is requested to transmit its information on flee memory capacity. Responsively, digital copier 2 transmits SPACE(N)_2 to SPACE(n)_2 and TSUM(M)_2, which are received by computer 5 at #1007.

Then at #1008, decision is made whether digital copier 2 can effect a printing process. If digital copier 2 can effect the printing process (YES at #1008), image data, various setup conditions and the like are output to digital copier 2 and a message signaling that they are output to digital copier 2 is displayed at #1009. If digital copier cannot effect the printing process (NO at #1008), a message is displayed indicating which of digital copiers 1 and 2 can effect the printing process earlier and the time required for completing the printing process.

Thus, digital copier 1 that cannot register an original as a job transmits to computer 5 controlling the image printing process the image data capacity of the original and the time at which the job can be registered. thus the user allows another image formation apparatus that can print an image depending on the original earlier to print the image earlier and thus print the image efficiently.

(2) Second Embodiment

A second embodiment of the present invention will now be described. A digital copier 1 according to the second embodiment is similar in configuration and basic operation to that according to the first embodiment. Accordingly, the similar portions between the first and second embodiments will not be described here and only the different portions therebetween win now be described.

Figure 28:
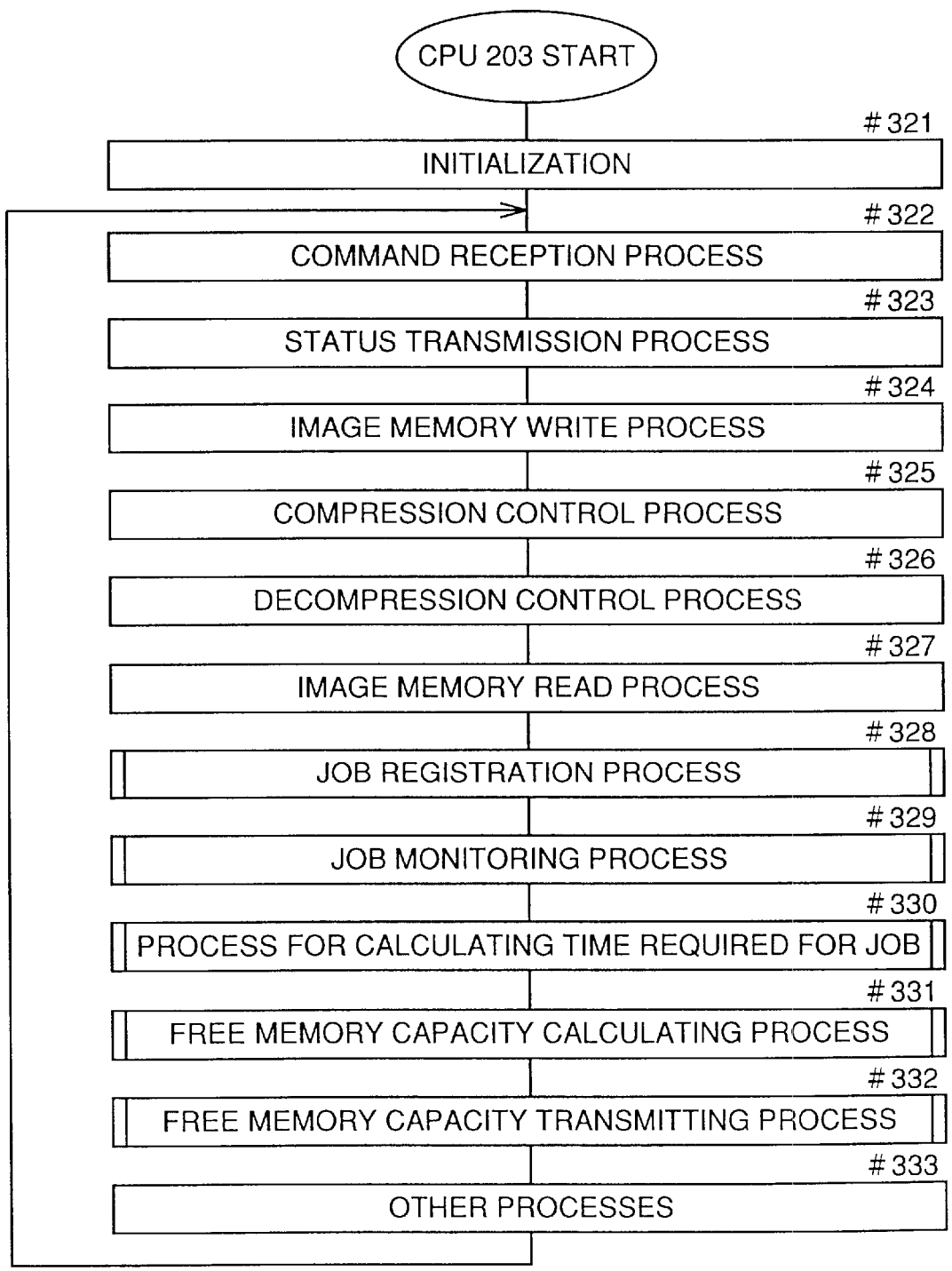
FIG. 28 is a flow chart of a main routine representing a procedure through which CPU 203 controls memory unit 30 in a second embodiment.

FIG. 28 is a flow chart of a main routine representing a procedure through which CPU 203 controls memory unit 30 in the second embodiment.

In the second embodiment, the operation of CPU 203 at #321 to #331 and #332 and #333 is the same as that at #301 to #311 and #314 and #315 according to the first embodiment.

The second embodiment differs from the first embodiment only in that the processes at #312 and #313 are eliminated between a free memory capacity calculating process at #331 and a free memory capacity signaling process at #332. Thus the content of the process according to the second embodiment is basically similar to that of the process according to the first embodiment and a description thereof is not repeated.

The information on free memory capacity and the like that are obtained in the processes at #328 to #332 are transmitted in a status transmission process at #323 to CPU 201 via CPU 205 and displayed on liquid crystal touch panel 91 (FIG. 2) as with the first embodiment.

Indications displayed on liquid crystal touch panel 91 in the second embodiment that can be provided by the control described above will now be described with reference to FIGS. 29 to 32. They are displayed depending on transmission to CPU 201 of TSUM(N) to TSUM(n), SPACE(N) to SPACE(n) and the like calculated through the control described above.

Figure 29:
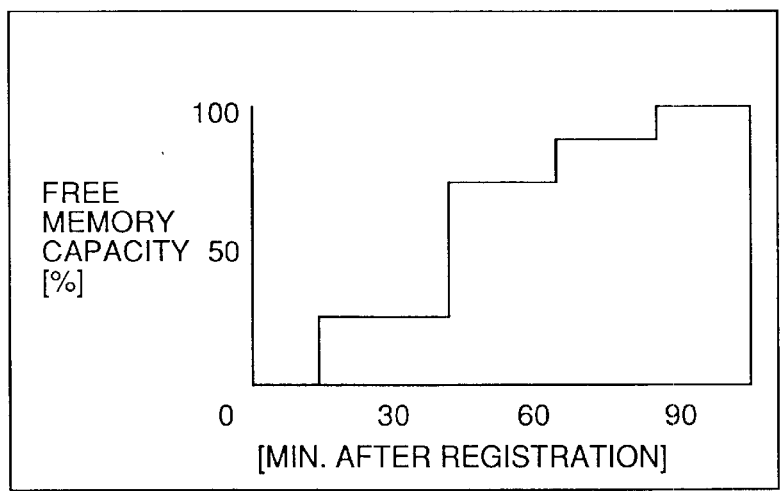
FIGS. 29, 30, 31 and 32 are first, second, third and fourth views, respectively, each showing a free memory capacity displayed on the liquid crystal touch panel as time elapses in the second embodiment.

FIG. 29 is a first view showing an indication of free memory capacity displayed on liquid crystal touch panel 91 as time elapses.

In the FIG. 29 indication displayed on liquid crystal touch panel 91, flee memory capacity as time elapses is represented by the percentage with respect to the full memory capacity. It can be understood from this indication that the current free memory capacity or the free memory capacity after zero minute is 0%, that after 30 minutes is 25%, that after 60 minutes is 75%, and that after 90 minutes is 100%.

Figure 30:
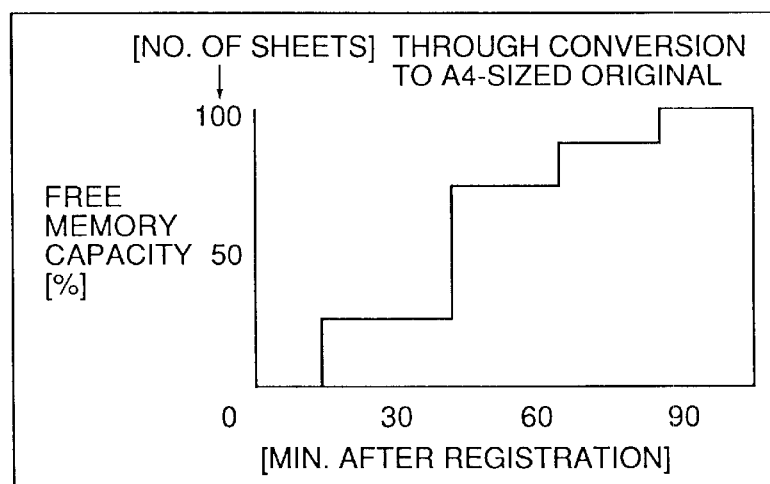

FIG. 30 is a second view showing an indication of free memory capacity displayed on liquid crystal touch panel 91 as time elapses.

In the FIG. 30 indication displayed on liquid crystal touch panel 91, free memory capacity as time elapses is converted into the number of sheets of original of A4 in size. It can be understood from this indication that the current free memory capacity or the memory capacity after 0 minute corresponds to zero sheet, that after 30 minutes corresponds to 25 sheets, that after 60 minutes corresponds to 75 sheets and that after 90 minutes corresponds to 100 sheets.

Figure 31:
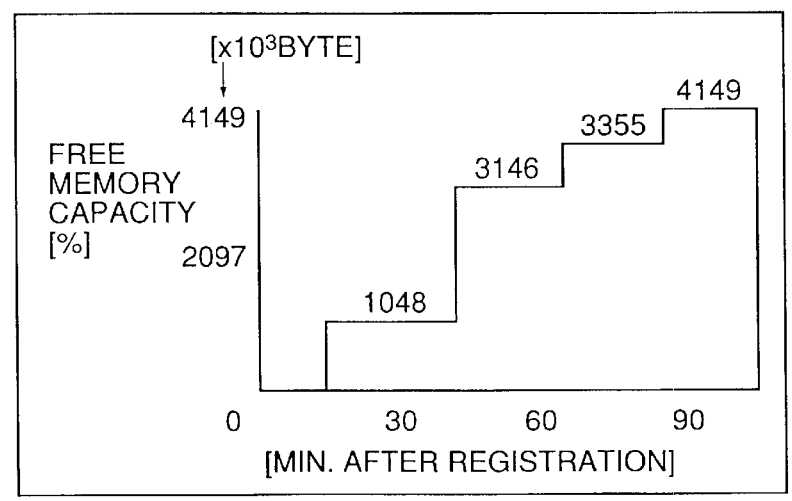

FIG. 31 is a third view showing an indication of free memory capacity displayed on liquid crystal touch panel 91 as time elapses.

In the FIG. 31 indication displayed on liquid crystal touch panel 91, free memory capacity as time elapses is represented in byte. It can be understood from this indication that the current free memory capacity or the free memory capacity after 0 minute is 0 Kbyte, that after 30 minutes is 1048 Kbytes, that after 60 minutes is 3146 Kbytes and that after 90 minutes is 4149 Kbytes.

Figure 32:
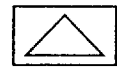
Figure 32:
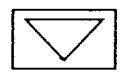

FIG. 32 is a fourth view showing an indication of free memory capacity displayed on liquid crystal touch panel 91 as time elapses.

In the FIG. 32 indication displayed on liquid crystal touch panel 91, free memory capacity as time elapses is displayed in a table. It can be understood from this indication that the job with job-no. 1 completes after 15 minutes and the then free memory capacity is 25%, the job with job-no. 2 completes after 40 minutes and the then free memory capacity is 75%, the job with job-no. 3 completes after 65 minutes and the then free memory capacity is 80%, and that the job with job-no. 4 completes after 80 minutes and the then free memory capacity is 100%.

Thus the user allows an image to be printed depending on the free memory capacity and thus printed efficiently.

Figure 33:
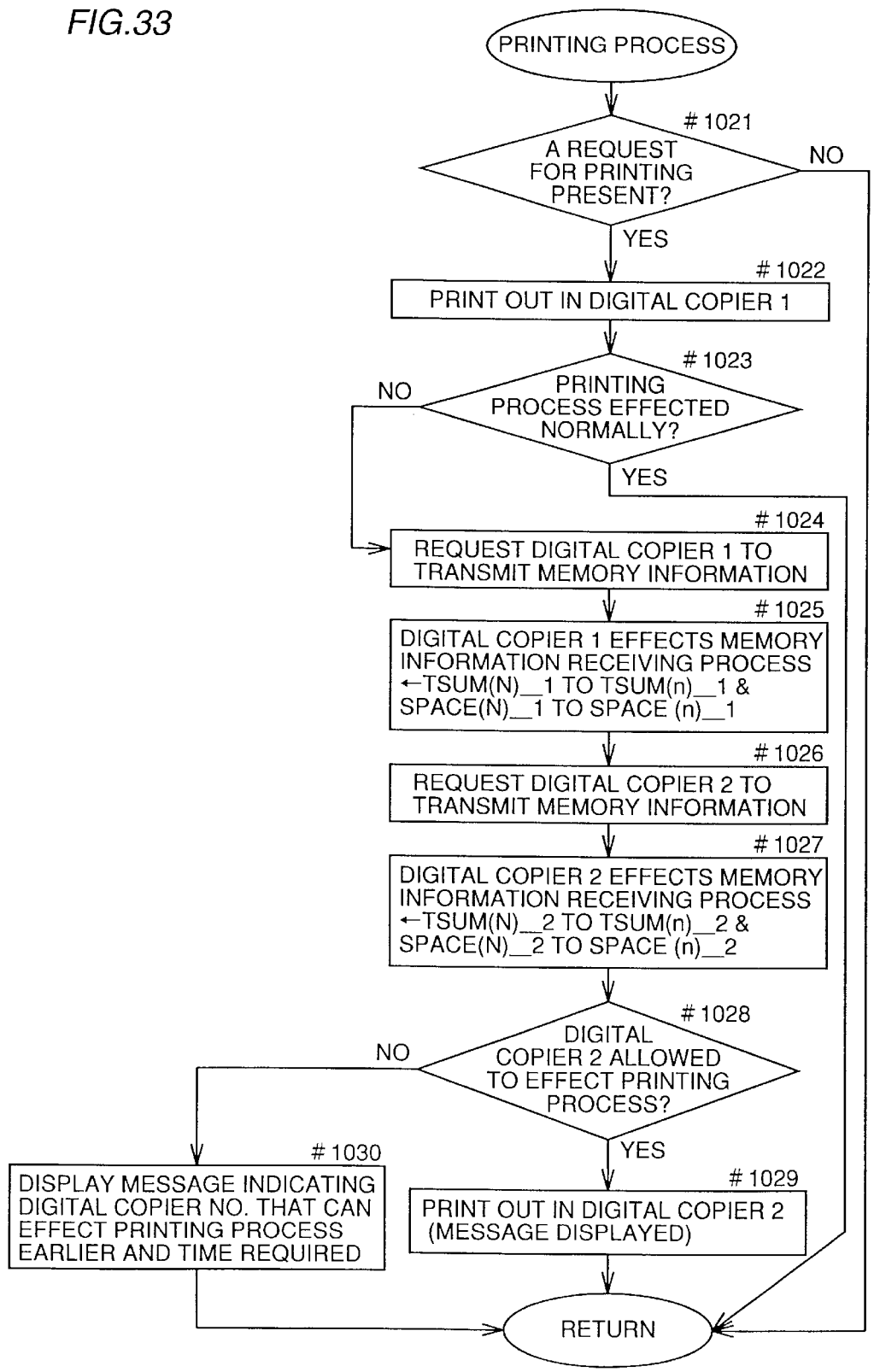
FIG. 33 is a flow chart representing a procedure of a computer-controlled print process with respect to a digital copier.

FIG. 33 is a flow chart representing a procedure of a printing process controlled by computer 5 with respect to digital copiers 1 and 2 in the second embodiment.

The processes from #1021 to #1030 of the second embodiment are basically similar to those according to the first embodiment, except for the processes at #1025 and #1027. More specifically, if a printing process is normally effected (YES at #1023), the present routine ends. If the printing process is not normally effected (NO at #1023), digital copier 1 is requested to transmit memory information at #1024. Responsively, digital copier transmits TSUM (N)__1 to TSUM(n)__1 and SPACE(N)__1 to SPACE(n)__1, which are received by computer 5 at #1025.

Then at #1026, digital copier 2 is requested to transmit its information on free memory capacity. Responsively, digital copier 2 transmits TSUM(N)__2 to TSUM(n)__2 and SPACE (N)__2 to SPACE(n)__2, which are received by computer 5 at #1027.

The subsequent processes are similar to those according to the first embodiment and a description thereof will not be repeated.

Thus an image based on an original can be printed by an image formation apparatus that can pint the image earlier. Thus the image can be pointed effectively.

(3) Third Embodiment

A third embodiment of the present invention will now be described. A digital copier 1 according to the third embodiment is similar in configuration and basic operation to that according to the first embodiment. Thus the similar portions between the first and third embodiments will not be described and the different portions between the first and third embodiment will now be described.

Figure 34:
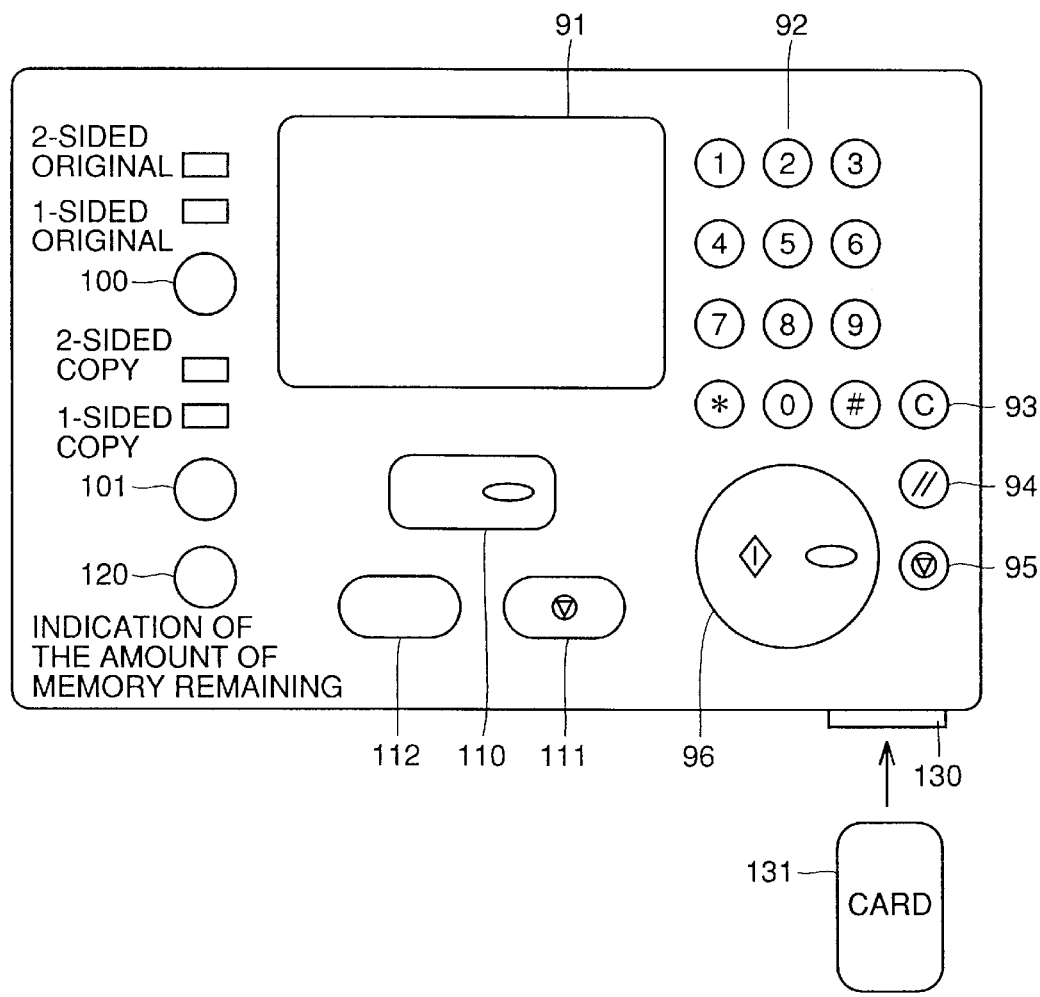
FIG. 34 is a plan view showing a configuration of an operation panel OPA of a digital copier in a third embodiment.

FIG. 34 is a plan view showing a configuration of an operation panel OPA of digital copier 1 according to the third embodiment.

Referring to FIG. 34, operation panel OPA is provided with an ID card insertion portion 130. The information on printing images in digital copier 2 can be previously set and the number of sheets copied can be limited depending on the magnetic information indicative of the ID recorded in an ID card 131.

The procedures of the controls provided by CPUs 201 and 203 particularly related in the third embodiment will now be described with reference to FIGS. 35 to 43. The processes provided by these CPUs it appropriately provide communication with the other CPUs as an interruption process.

Figure 35:
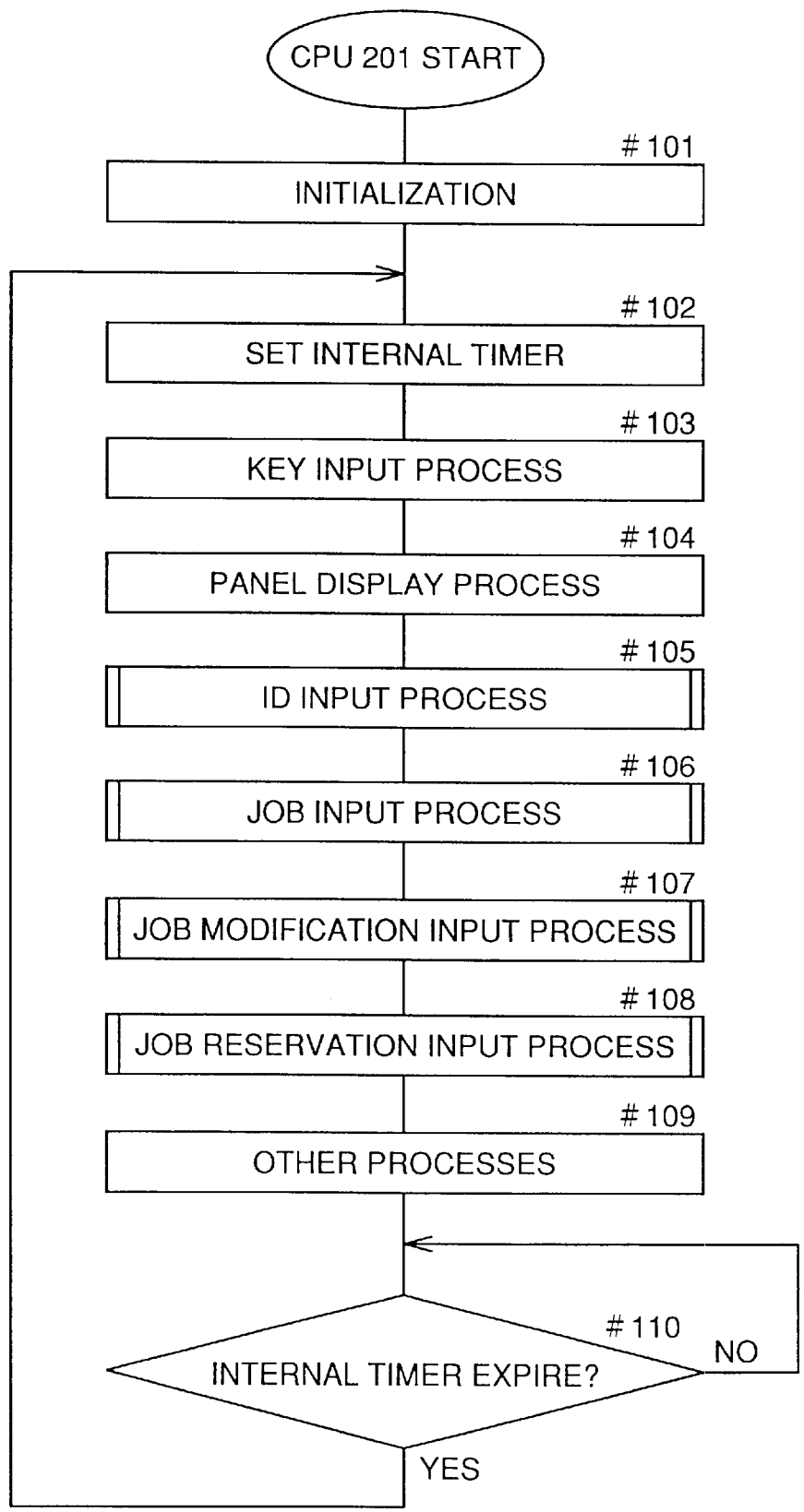
FIG. 35 is a flow chart of a main routine representing a procedure through which CPU 201 controls operation panel OPA in the third embodiment.

FIG. 35 is a flow chart of a main routine representing a procedure of a control through which CPU 201 (FIG. 3) controls operation panel OPA.

When the copier is powered on, CPU 201 first initializes RAM 221, a register and the like at #101 and sets the internal timer defining the length of one routine at #102. Then, a key input process for accepting a key operation is provided at #103, and a panel display process for displaying an indication depending on an operation is provided at #104.

Then, an ID input process for an input to identify the user is provided at #105, a job input process for an input to register a new job is provided at #106, a job modification inputting process for an input to modify the information on a job registered or reserved is provided at #107, and a job reservation inputting process for an input to reserve a job is provided at #108. The processes at #105 to #108 are provided in their respective subroutines described with reference to FIGS. 37 to 40.

After these processes, the other processes are effected at #109 and decision is made at #110 whether the internal time set at #102 has expired. If the internal timer has expired (YES at #110), one routine is terminated and the processes after #102 are repeated. If the internal timer has not yet expired (No at #110) the process stays at #110 to wait for expiry of the internal timer.

Figure 36:
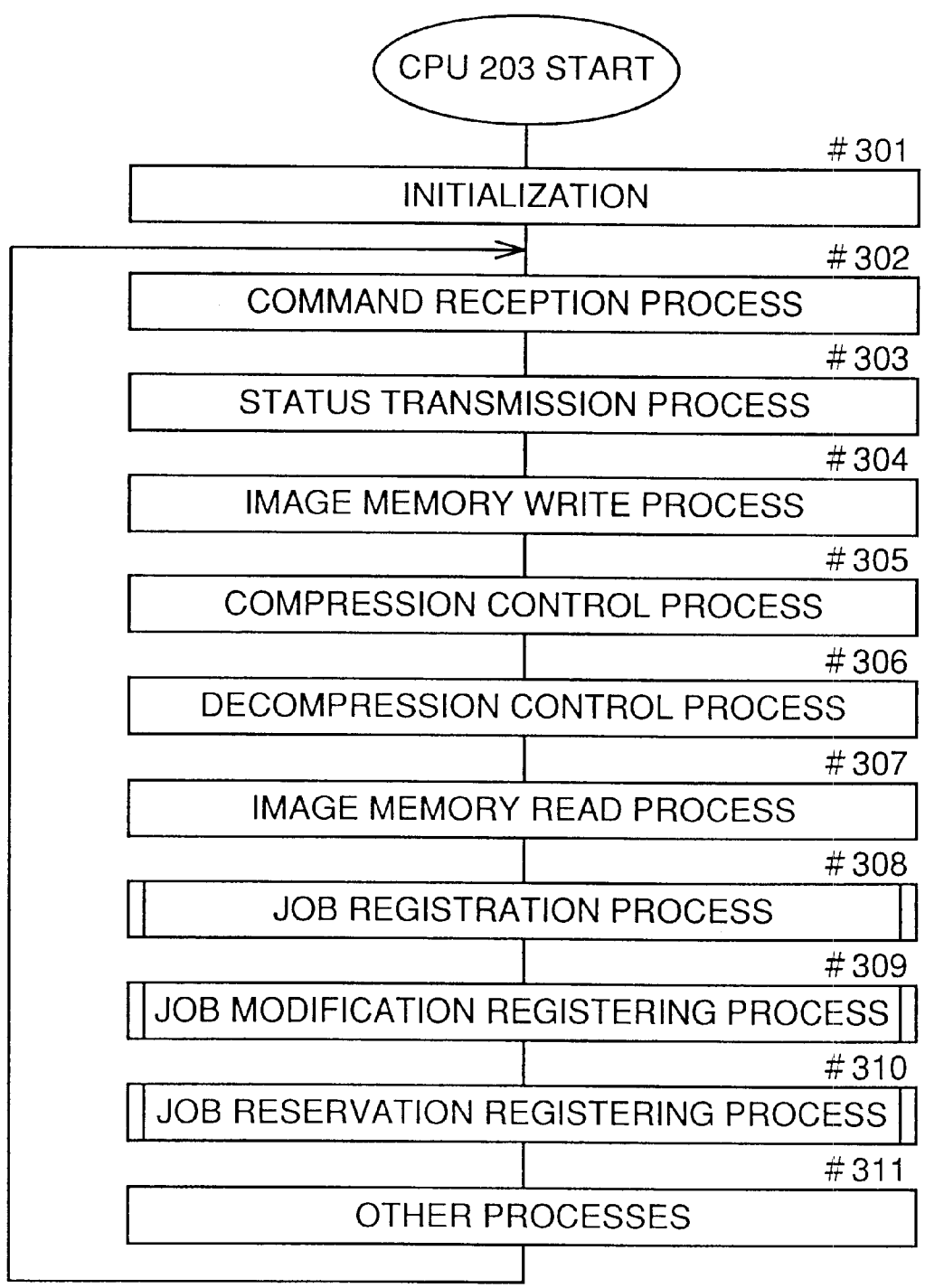
FIG. 36 is a flow chart of a main routine representing a procedure through which CPU 203 controls a memory unit in the third embodiment.

FIG. 36 is a flow chart of a main routine representing a procedure through which CPU 203 (FIG. 3) controls memory unit 30.

When the copier is powered on, CPU 203 first initializes RAM 223, a register and the like at #301. Then at #302 a command is received from CPU 205 and at #303 a status is transmitted to CPU 205. Then, writing into the image memory, image data compression, coded data decompression, and reading from the image memory are controlled respectively at #304 to #307.

After these processes, a job registration process for registering a new God job is provided at #308, a job modification registering process for modifying the information on a job registered or reserved is provided at #309, and a job reservation registering process for reserving a job is provided at #310. The processes at #308 to #310 are provided in their respective subroutines described with reference to FIGS. 41 to 43. The other processes are then effected at #311 and the processes after #302 are then repeated.

The processes at #105 to #108 shown in FIG. 35 which are controlled by CPU 201 will now be described ,with reference to FIGS. 37–40 and the processes at #308 to #310 shown in FIG. 36 that are controlled by CPU 203 will then described with reference to FIGS. 41–43.

Figure 37:
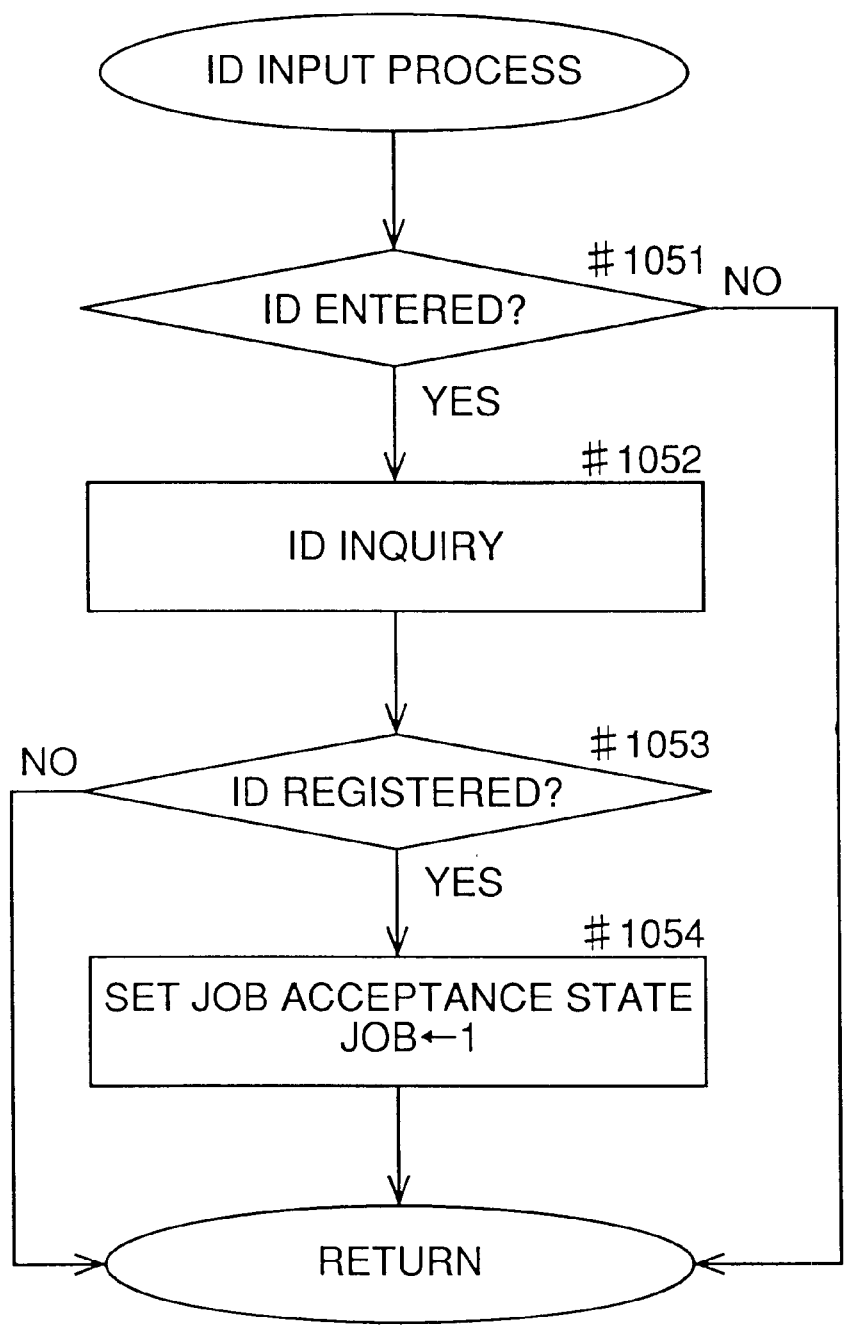
FIG. 37 is a flow chart representing a procedure of a process effected in the ID input processing routine at #105 shown in FIG. 35.

FIG. 37 is a flow chart representing a procedure of the process provided in the ID input process routine at #105 shown in FIG. 35.

In the ID input process, decision is first made at #1051 whether an ID code has been input via ID card 131 or numeric keys 92 (FIG. 2). If any ID code has not been input(NO at #1051), the present routine ends. If any ID code has been input (YES at #1051), the process goes to #1052 at which reference is made to the information held in the apparatus to make an inquiry with respect to the ID code input at #1051.

Then at #1053, decision is made depending on the ID code inquiry whether the input ID code has a heady been registered. If the ID code has not been registered (NO at #1053), the present routine ends. If the ID code has been registered (YES at #1053), the process goes to #1054 at which a variable JOB indicative of job acceptability is set at 1. When the forgoing processes complete, the present routine ends. The ID input process thus allows an ID code to be input and a job acceptance state to be attained if the ID code has already been registered.

Figure 38:
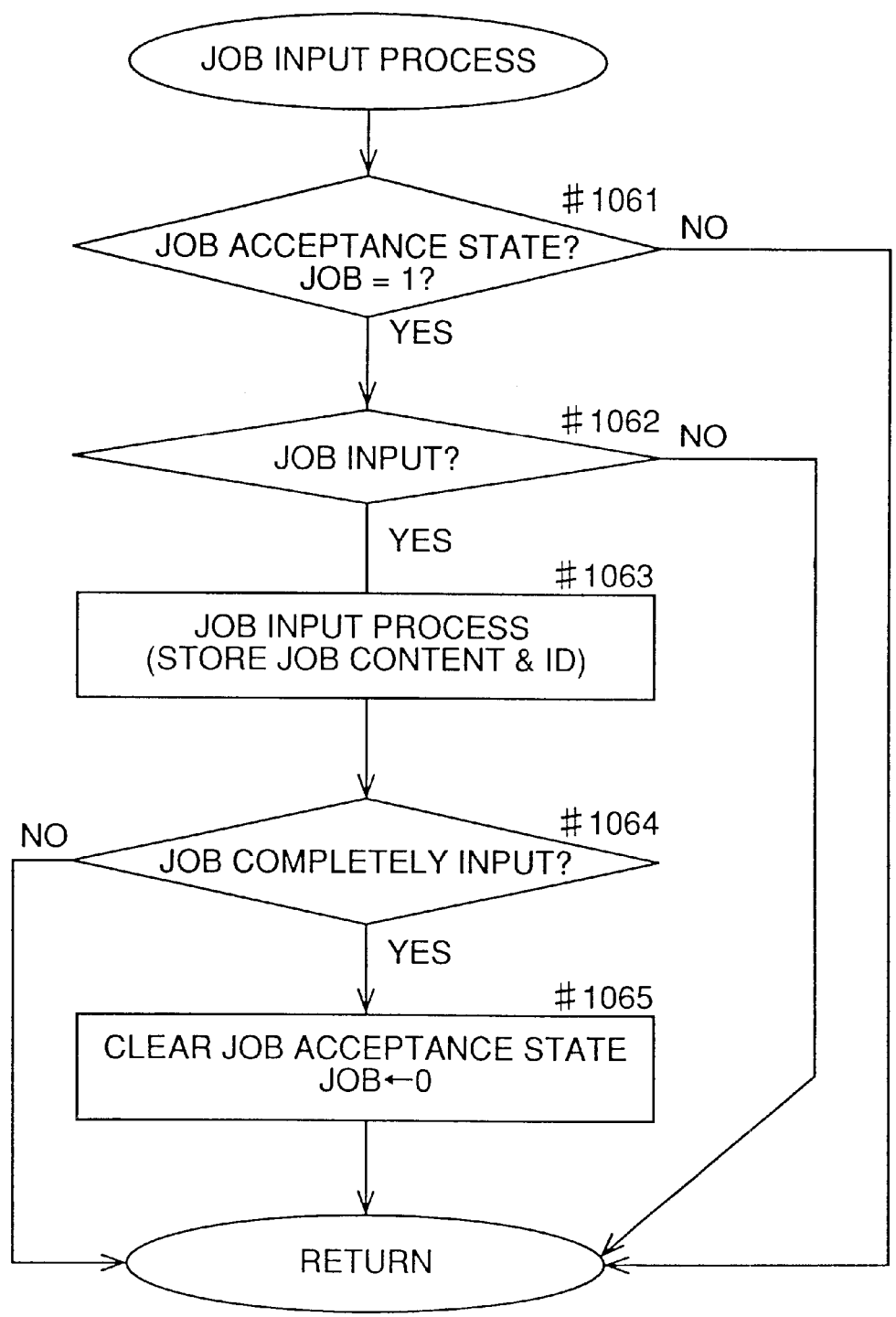
FIG. 38 is a flow chart representing a procedure of a process effected in the job input processing routine at #106 shown in FIG. 35.

FIG. 38 is a flow chart representing a procedure of the process effected in the job input process routine at #106 shown in FIG. 35.

In the job input process, decision is first made at #1061 whether a job acceptance state has been attained (JOB=1). If a job acceptance state has not been attained (JOB=0) (NO at #1061), the present routine ends. If a job acceptance state has been attained (JOB=1) (YES at #1061), the process goes to #1062 at which decision is made whether a job has been input. If a job has not been input (NO at #1062), the present routine ends. If a job has been input (YES at #1062), at #1063 a job input process is effected in a which a content of the job indicative of a copying condition, and the ID code are stored.

Then at #1064, decision is made whether the job has been completely input. If the job has not been completely input (NO at #1064), the routine ends. If the job has been completely input (YES at #1064), at #1065 the job acceptance state is cleared (JOB=0) and the present routine ends. The job input process thus allows a content of a job and an ID code to be stored when the job is input.

Figure 39:
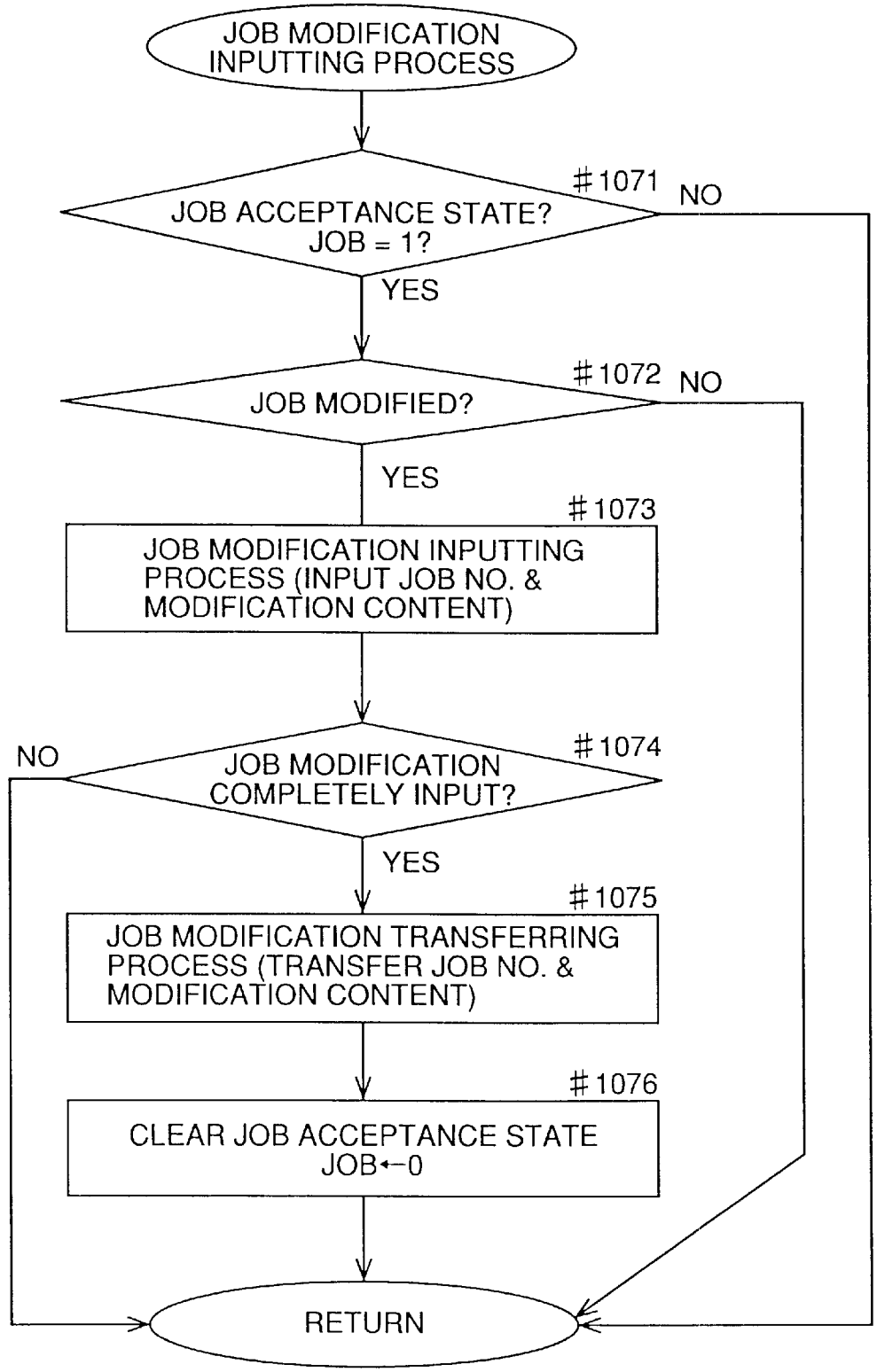
FIG. 39 is a flow chart representing a procedure of a process effected in the job modification input processing routine at #107 shown in FIG. 35.

FIG. 39 is a flow chart representing a procedure of a process effected in the job modification inputting process routine at #107 shown in FIG. 35.

In the job modification inputting process, decision is first made at #1071 whether a job acceptance state has been attained (JOB=1). If a job acceptance state has not been attained (JOB=0), (NO at #1071), the present routine ends. If a job acceptance state has been attained (JOB=1) (YES at #1071), the process goes to #1072.

At #1072, decision is made whether a job has been modified. If a job has not been modified (NO at #1072), the present routine ends. If a job has been modified (YES at #1072), at #1073 an input is made to modify a job number indicative of an order in which the job is processed in the apparatus, the content of the job indicative of a copying condition and the like.

Then at #1074, decision is made whether the input made to modify the job has been complete. If not (NO at #1074), the present routine ends. If so (YES at #1074), at #1075 the job number and content of the job and the like that are modified at #1073 are transferred to a predetermined storage device and at #1076 the job acceptance state is cleared (JOB=0) to end the present routine. The job modification inputting process thus allows modification to be input for a registered or reserved job.

Figure 40:
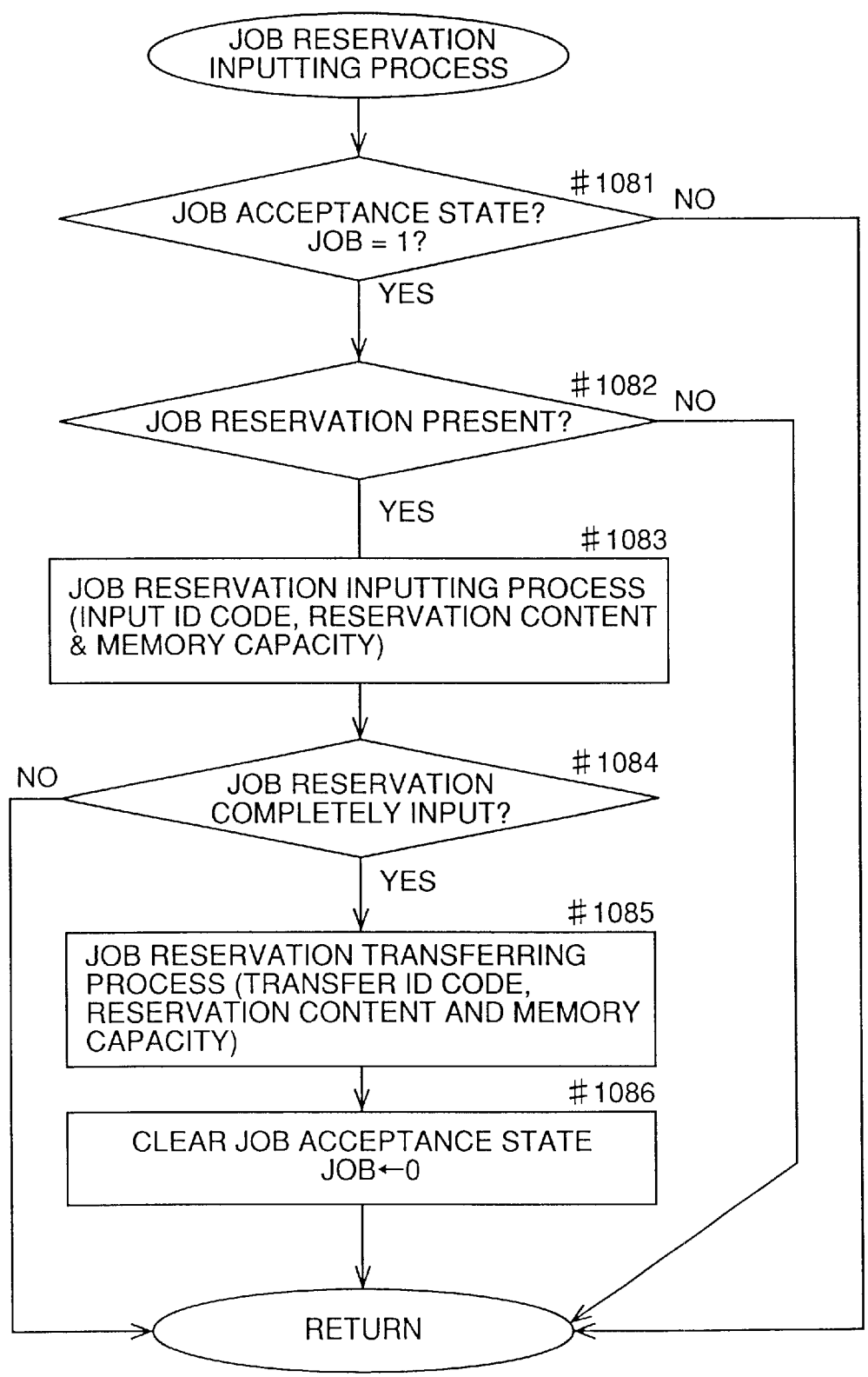
FIG. 40 is a flow chart representing a procedure of a process effected in the job reservation input processing routine at #108 shown in FIG. 35.

FIG. 40 is a flow chart representing a procedure of the process effected in the job reservation inputting process routine at #108 shown in FIG. 35.

In the job reservation inputting process, decision is first made at #1081 whether a job acceptance state has been attained (JOB=1). If a job acceptance state has not been attained (JOB=0), HO at #1081), the present routine ends. If a job acceptance state has been attained (JOB=1) (YES at #1081), the process goes to #1082 at which decision is made whether there is a job received. If there is not a job reserved (NO at #1082), the present routine ends. If there is a job received (YES at #1082), at #1083 a job reservation inputting process is effected to input an ID code, a content of the job indicative of a copying condition, and the memory capacity required for printing an image.

Then at #1084, decision is made whether the reservation of the job has been completely input. If the reservation of the job has not been completely input (NO at #1084), the present routine ends. If the reservation of the job has been completely input (YES at #1084), at #1085 the ID code, the content of the job, the memory capacity and the like that are input at #1083 are transferred to a predetermined storage device and at #1086 the job acceptance state is cleared (JOB=0) to end the present routine. The job reservation inputting process thus allows an input to be made for job reservation.

Figure 41:
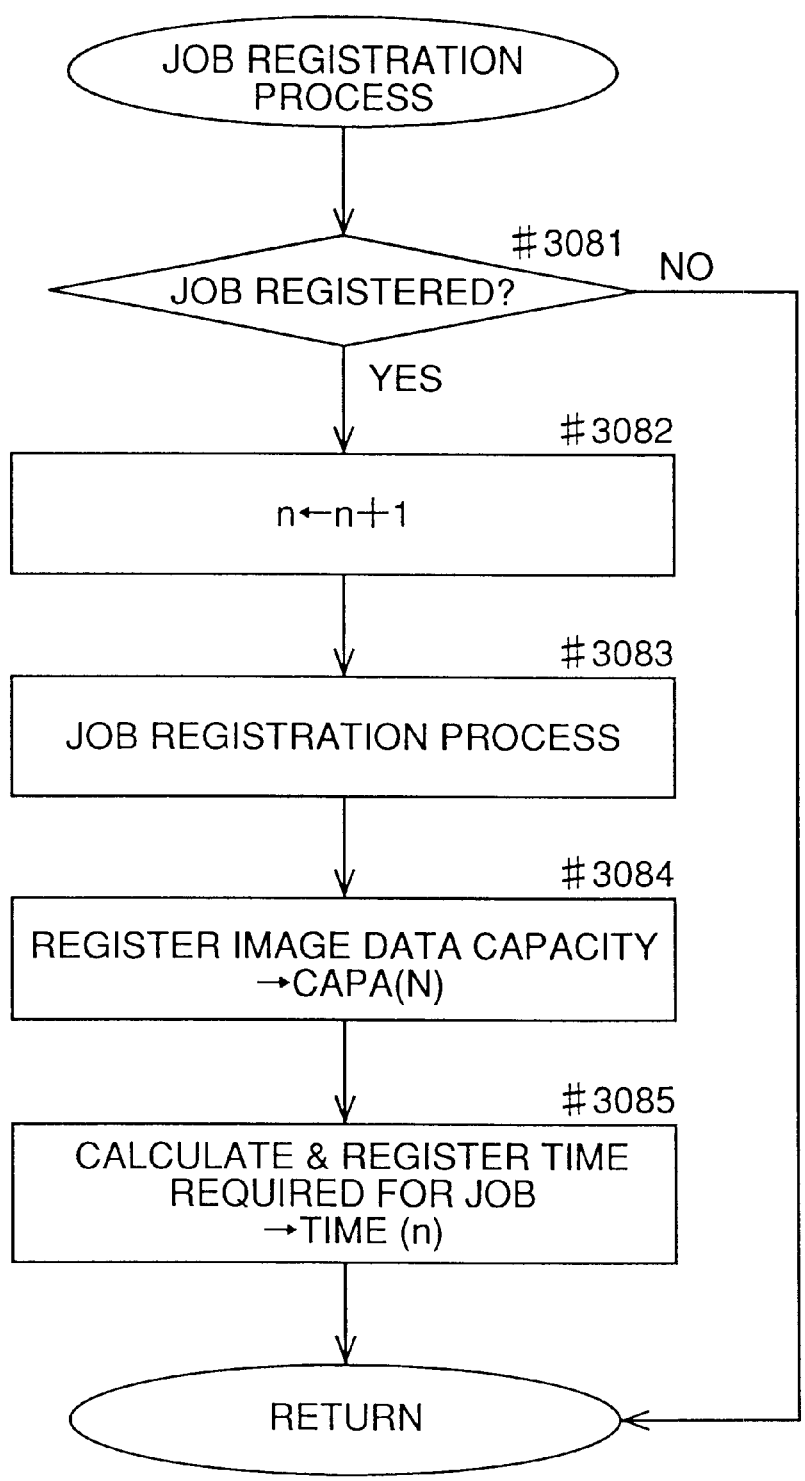
FIG. 41 is a flow chart representing a procedure of a process effected in the job registration processing routine at #308 shown in FIG. 36.

FIG. 41 is a flow chart representing a procedure of the process effected in the job registration process routine at #308 shown in FIG. 36.

In the job registration process, decision is first made at #3081 whether a job has been registered. If a job has not been registered (NO at #3081), the present routine ends. If a job has been registered (YES at #3081), the process goes to #3082 at which n is incremented by one and thus assigned as the job number of the latest registered job (0 is substituted for n as an initial value).

Then at #3083, the image data of an original is read and registered as a new job. At #3084 the image data capacity for the job with job-no. n is calculated and substituted for CAPA(n) and at #3085 the time required for executing the job with job-no. n is calculated and substituted for TIME(n) to end the present routine. The job registration process thus allows job registration.

Figure 42:
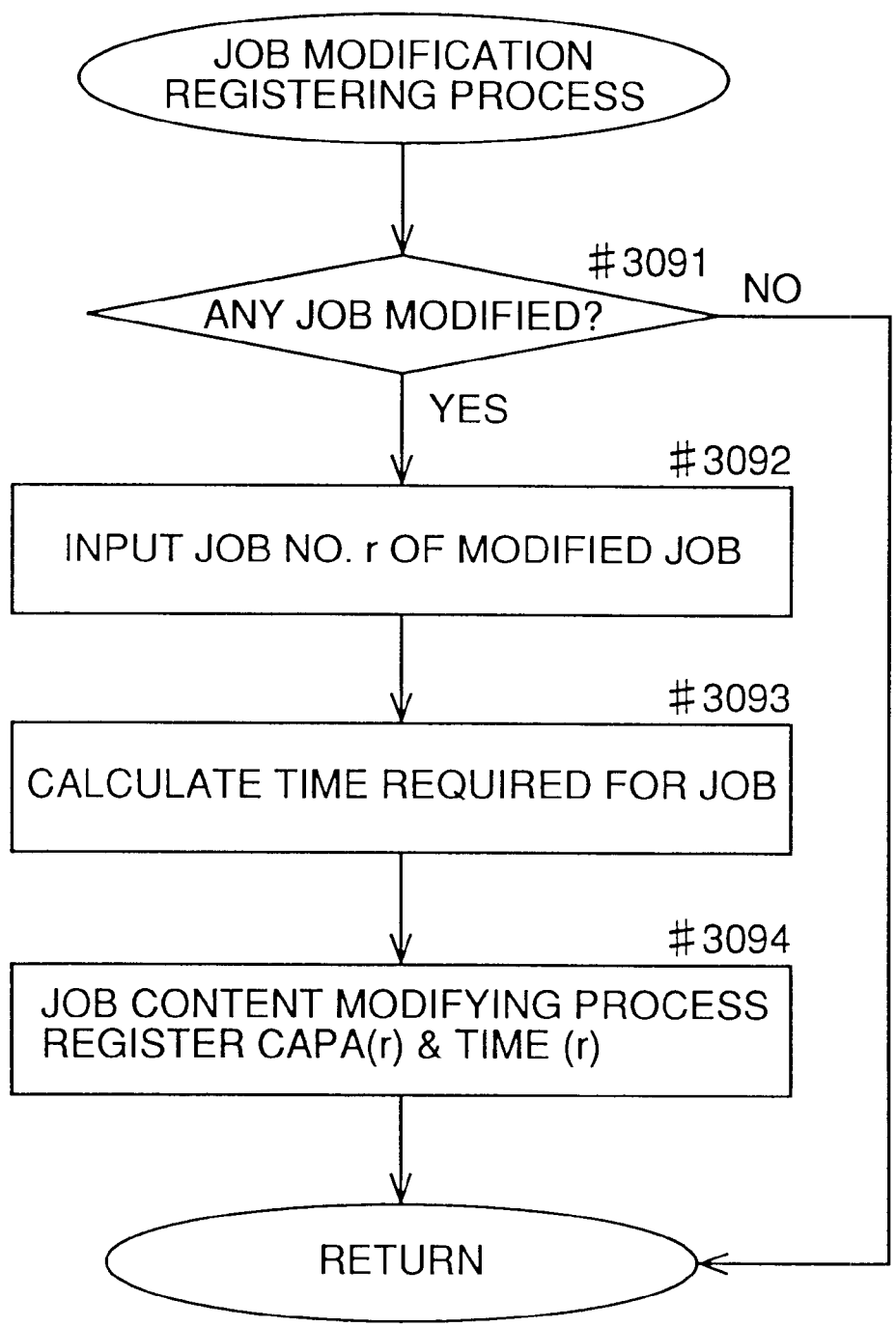
FIG. 42 is a flow chart representing a procedure of a process effected in the job modification registration processing routine at #309 shown in FIG. 36.

FIG. 42 is a flow chart representing a procedure of the process effected in the job modification registering process routine at #309 shown in FIG. 36.

In the job modification registering process, decision is first made at #3091 whether any job has been modified. If any job has not been modified (NO at #3091), the present routine ends. If any job has been modified (YES at #3091), the process goes to #3092. At #3092 the job number r of the job modified is input, at #3093 TIME(r) required for execution of job r is again calculated, and at #3094 CAPA(r) and TIME(r) registered respectively at #3084 and #3085 in FIG. 41 are registered to end the present routine. The job modification registering process thus allows modification of a registered or reserved job.

Figure 43:
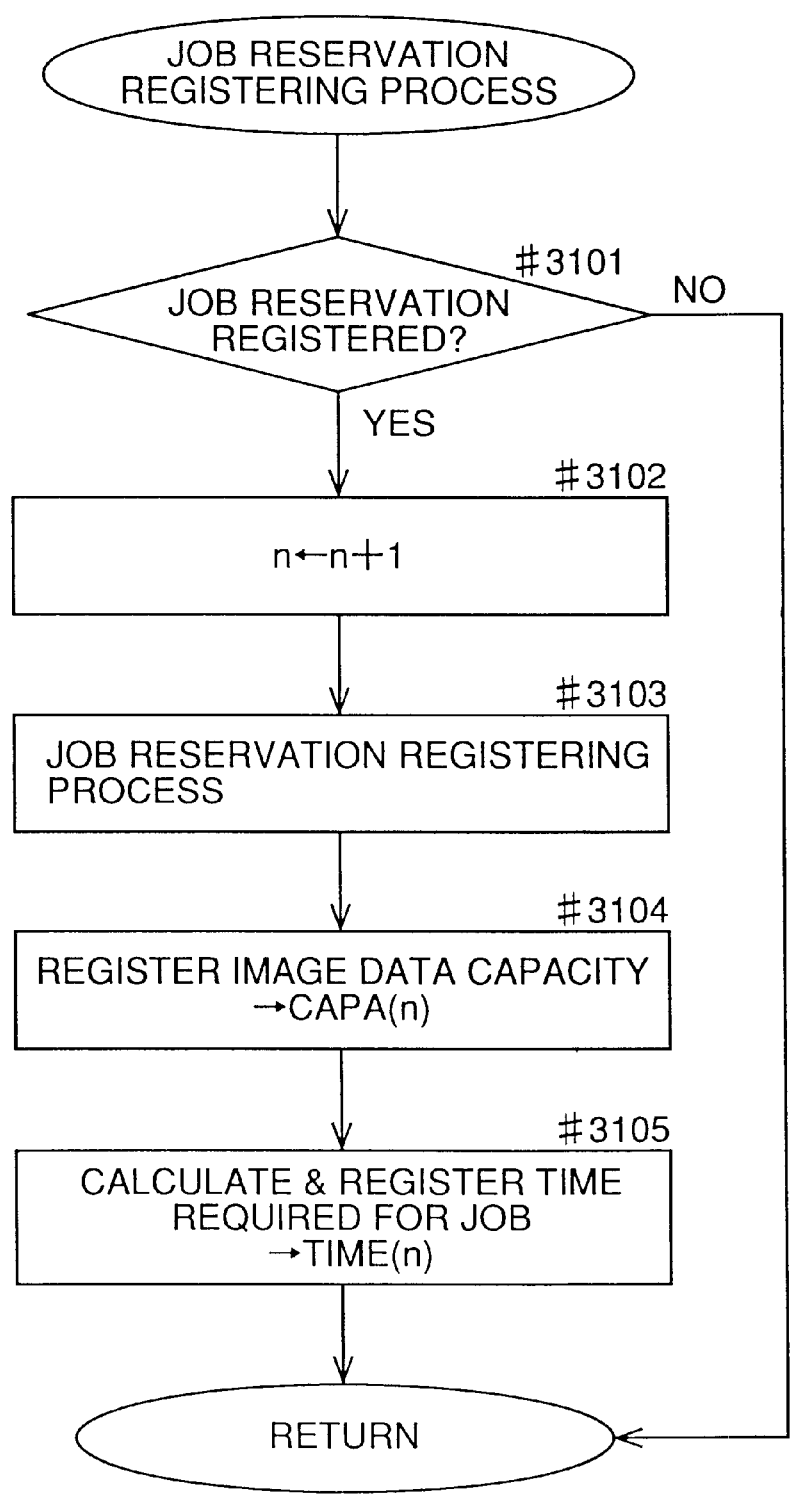
FIG. 43 is a flow chart representing a procedure of a process effected in the job reservation registration processing routine at #310 shown in FIG. 36.

FIG. 43 is a flow chart representing a procedure of the process effected in the job reservation registering process routine at #310 shown in FIG. 36.

In the job reservation registering routine, decision is first made at #3101 whether any job reservation has been registered. If any job has not been reserved NO at #3101), the present routine ends. If any job has been reserved (YES at #3101), the process goes to #3102 at which n is incremented by one and assigned as the job number of the latest job reserved and thus registered (0 is substituted for n as an initial value).

Then at #3103, the image data of an original is read and registered to be reserved as a new job. At #3104 the image data capacity of the job with job-no. n is calculated and substituted for CAPA(n) and at #3105 the time required for executing the job with job-no. n is calculated and substituted for TIME(n) to end the present routine. The job reservation registering process thus allows job reservation to be registered.

Such control allows the user to reserve and modify the order of a job without waiting for completion of the processes of digital copier 1 when image reader IR being used or a decision that the memory is full prevents the job from being registered. Thus the user can print images more conveniently.

Indications displayed on liquid crystal touch panel 91 (FIG. 34) associated with the control described above will now be described with reference to FIGS. 44–50.

Figure 44:
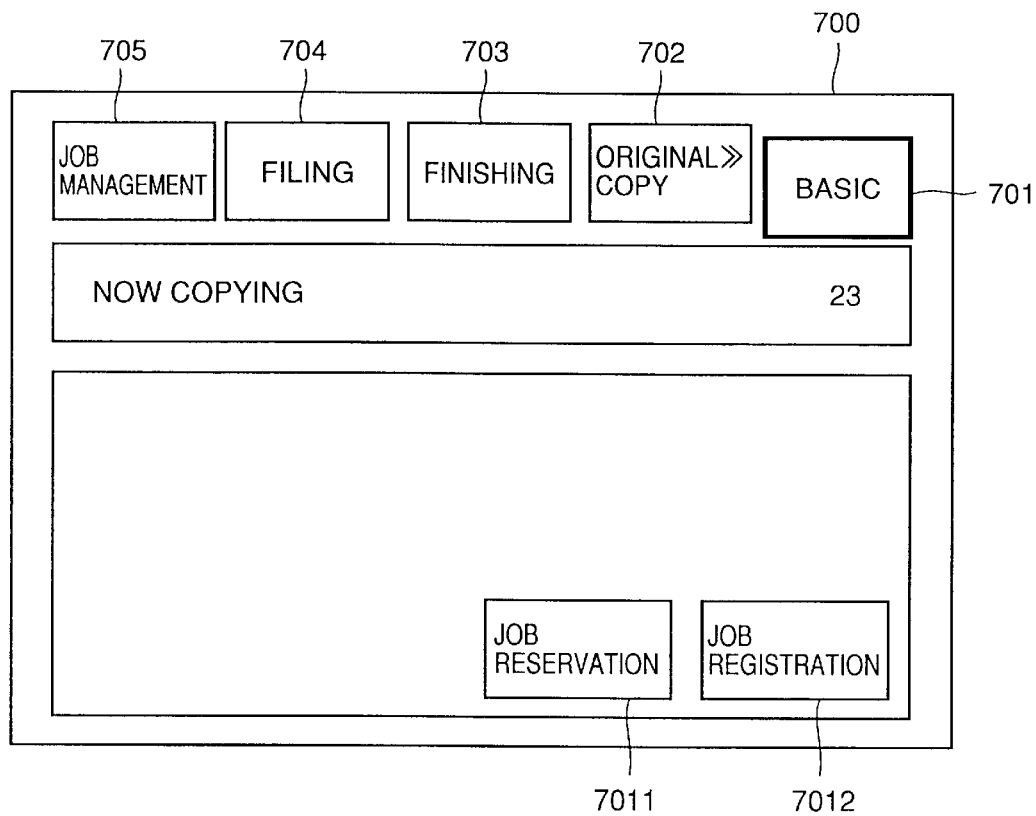
FIG. 44 shows a basic screen displayed on the liquid crystal touch panel for the basic operation of the digital copier.

FIG. 44 shows a basic screen 700 as an indication on liquid crystal touch panel 91 that is provided for a basic operation of digital copier 1.

Basic screen 700 shows a BASIC tab 701 has been selected. The user can also select and press an ORIGINAL>COPY tab 702, a FINISHING tab 703, a FILING tab 704 and a JOB MANAGEMENT tab 705 to set the functions indicated in the capital letters on their respective tabs to effect a copy operation in digital copier 1. Basic screen 700 also includes a JOB RESERVATION key 7011 and a JOB REGISTRATION key 7012. When the user presses JOB RESERVATION key 7011, an indication 751 shown in FIG. 45 is displayed on liquid crystal touch panel 91.

Figure 45:
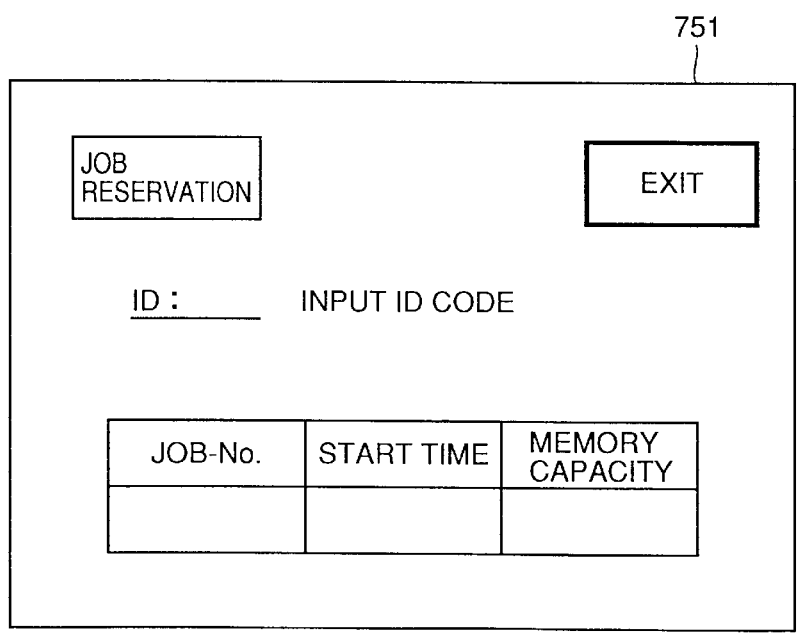
FIG. 45 shows an indication displayed on the liquid crystal touch panel when a JOB RESERVATION key is pressed on the FIG. 44 basic screen.

FIG. 45 shows indication 751 displayed on liquid crystal touch panel 91 when JOB RESERVATION key 7011 is pressed on the basic screen 700 indication shown in FIG. 44.

Figure 46:
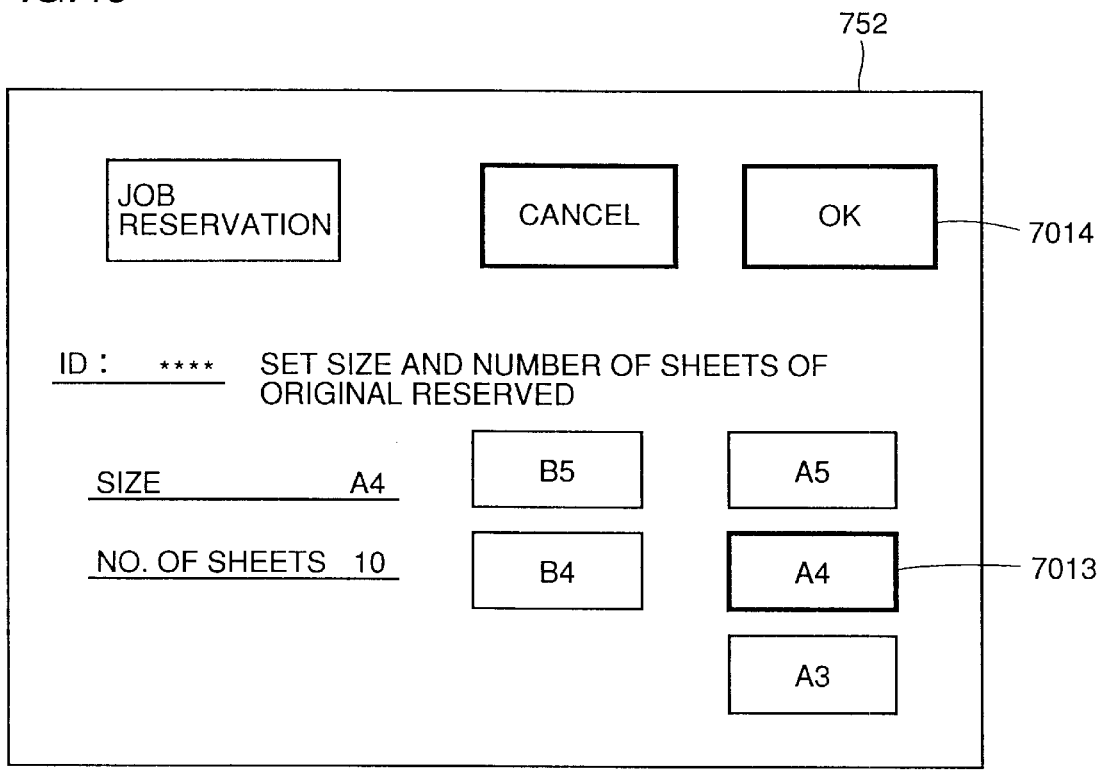
FIG. 46 shows an indication displayed on the liquid crystal touch panel when an ID code is input on the FIG. 45 indication.

Indication 751 urges the user to input an ID code. When the user uses ID card 131 or numeric keys 92 (FIG. 34) to input the ID code, an indication 752 shown in FIG. 46 is displayed on liquid crystal touch panel 91. The ID code input is required to determine whether the user who desires that an original be read when job registration is allowed is identical to the user who has made a reservation.

FIG. 46 shows indication 752 displayed on liquid crystal touch panel 91 when an ID code is input on the FIG. 45 indication.

Indication 752 urges the user to set the size and number of the original sheets. Responsively the user selects and presses an A4 key 7013 to set the size of the original and presses numeric keys 92 to set the number of the original sheets at ten. Then an OIC key 7014 in indication 752 is pressed to completely set the information on the original and an indication 753 shown in FIG. 47 is displayed on liquid crystal touch panel 91.

Figure 47:
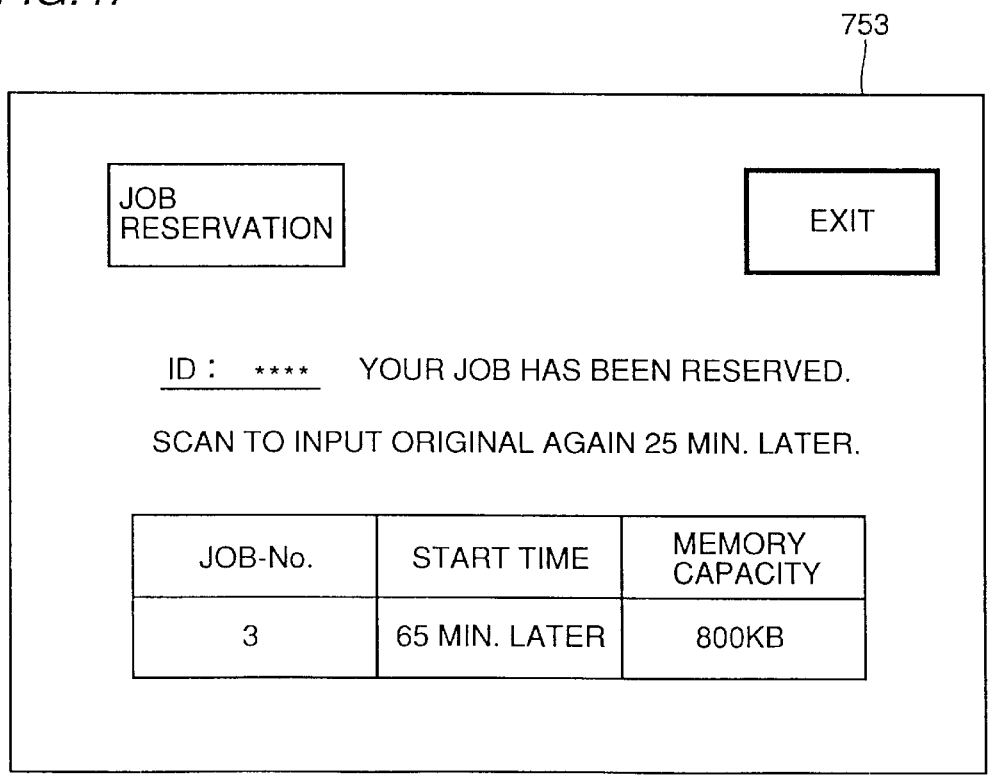
FIG. 47 shows an indication on the liquid crystal touch panel when a size of originals and the number of the originals are set on the FIG. 46 indication.

FIG. 47 shows indication 753 displayed on liquid crystal touch panel 91 when the size and number of original sheets are set on the FIG. 46 indication.

By urging the user to input as described above, the job for the original desired by the user is completely reserved and indication 753 is displayed on liquid crystal touch panel 91. Indication 753 indicates that a job has been reserved and that the user is required to have the original scanned by image reader IR (FIG.1) when 25 minutes elapse after the reservation of the job. Indication 753 also indicates that the job for the original desired by the user is numbered job-no. 3, that the job will be started in 65 minutes, and that the memory capacity required for the original is 800 KB.

Thus the user can reserve an order for the user's job for an original without waiting completion of the processes provided by digital copier 1 when image reader IR is being used and the job for the original cannot be registered in the memory. Thus the user can pint images more conveniently.

While the user reserves memory according to the liquid crystal touch panel 91 indications, as described above, the user can be urged to reserve memory or reserve a job when a decision that the memory is full is made in causing image reader IR to read an original, as will now be described with reference to FIGS. 48–50.

Figure 48:
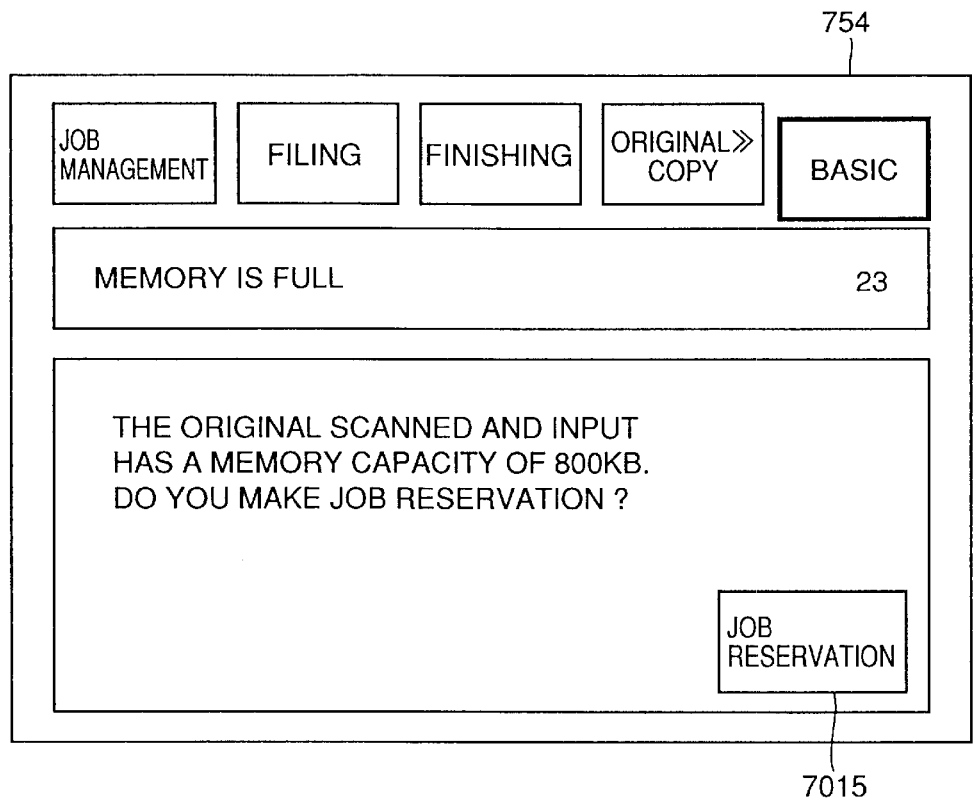
FIG. 48 shows an indication on the liquid crystal touch panel when the memory is full.
Figure 49:
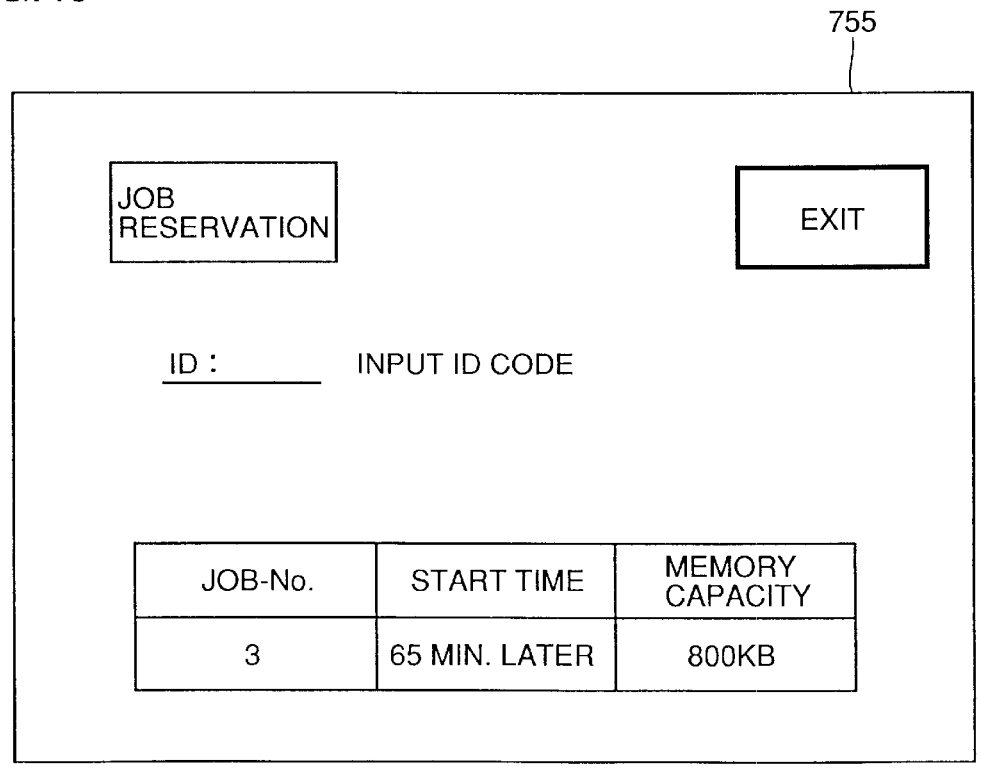
FIG. 49 shows a screen displayed on the liquid crystal touch panel that urges the user to input an ID code in reserving a job in FIG. 48.
Figure 50:
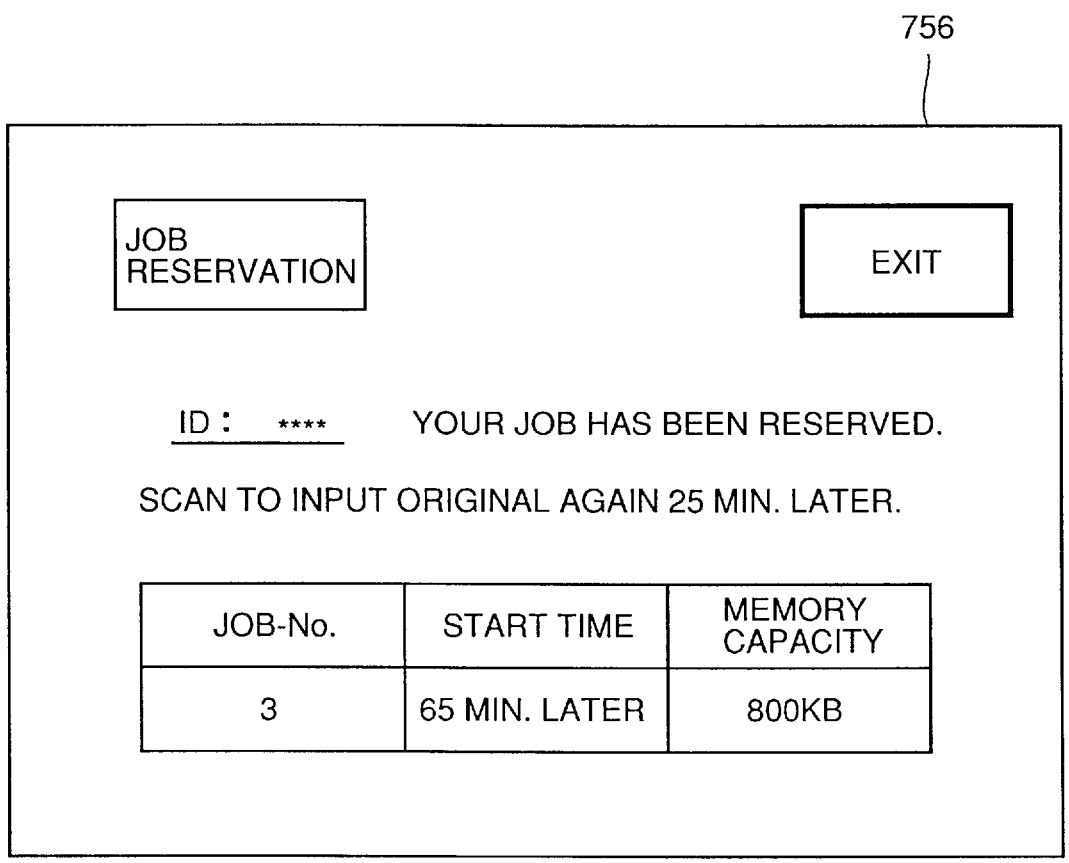
FIG. 50 shows an indication displayed on the liquid crystal touch panel when an ID code is input in FIG. 49.

FIGS. 48–50 are views illustrating a memory reservation when the memory is full.

FIG. 48 shows an indication 754 displayed on liquid crystal touch panel 91 when the memory is full.

Indication 754 indicates that the user's original read by image reader IR (FIG. 1) requires a memory capacity of 800 KB calculated based on the size and number of the original sheets so that decision is automatically made that the memory is full and the user is thus urged to make memory reservation. When the user presses a JOB RESERVATION key 7015, an indication 755 shown in FIG. 26 is displayed on liquid crystal touch panel 91.

FIG. 49 shows indication 755 displayed on liquid crystal touch panel 91 urging the user to input an ID code when a job is reserved in FIG. 48.

Indication 755 urges the user to input an ID code and also indicates that the job for the original desired by the user is numbered job-no. 3, that the job will be started in 65 minutes and that the original requires a memory capacity of 800 KB. When the user inputs an ID code via ID card 131 or numeric keys 92 (FIG. 2), an indication 756 shown in FIG. 50 is displayed on liquid crystal touch panel 91. As has been described hereinbefore, the ID code input is required to determine whether the user who desires that an original be read when job reservation is allowed is identical to the user who has reserved memory.

FIG. 50 shows indication 756 displayed on liquid crystal touch panel 91 when an ID code is input in FIG. 49.

By urging the user to input as described above, the job for the original desired by the user is completely reserved and indication 756 is displayed on liquid crystal touch panel 91. Indication 756 displays that the job is reserved and that the user is required to have the original scanned by image reader IR (FIG. 1) after 25 minutes from the reservation of the job. As is similar to the FIG. 49 indication 755, indication 756 displays that the job for the original desired by the user is numbered job-no. 3, that the job will be started in 65 minutes, and that the original requires a memory capacity of 8001 KB.

Thus the user can reserve an order for the user's job without waiting for completion of the processes provided by digital copier 1 if decision is made that the memory is full when the user causes image reader IR (FIG. 1) to read an original. Thus the user can print images more conveniently.

(4) Fourth Embodiment

A fourth embodiment of the present invention will now be described. A digital copier according to the fourth embodiment is similar in configuration and basic operation that according to the first embodiment. Thus, the similar portions between the fourth and first embodiments will not be described and the different portions between the two embodiments will now be described.

It should be noted, however, that the procedure through which CPU 203 controls memory unit 30 in the fourth embodiment is similar to that through which CPU 203 controls memory unit 30 in the second embodiment rather than the first embodiment.

Figure 51:
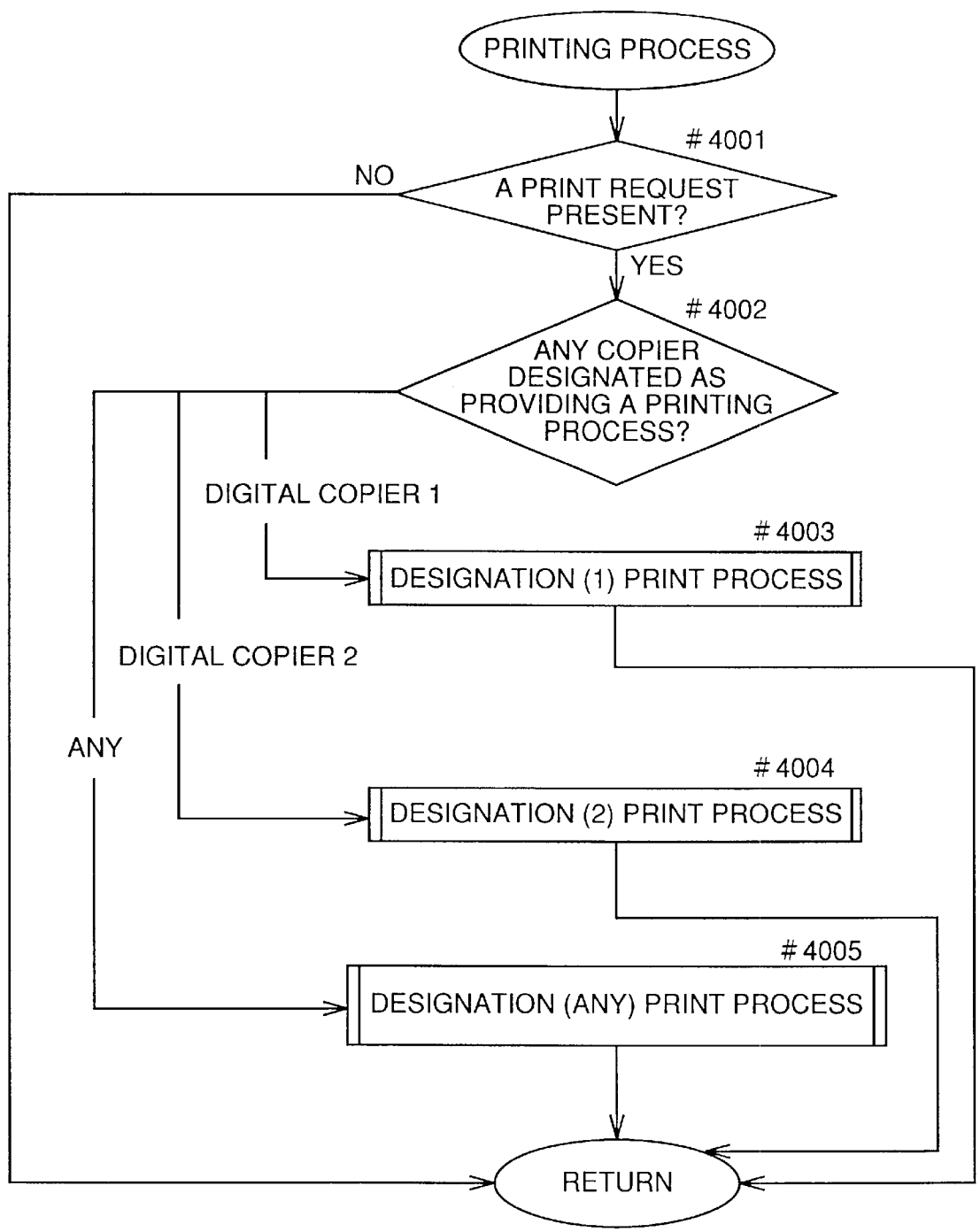
FIG. 51 is a flow chart representing a procedure of a print process which the FIG. 25 image formation control device controls with respect to a digital copier.

FIG. 51 is a flow chart representing a procedure of a printing process controlled by image formation control device 5 with respect to digital copiers 1 and 2 shown in FIG. 25 in the fourth embodiment.

In the printing process, decision is fist made at #4001 whether there is a print request in image formation control device 5. If there is not a print request (NO at #4001), the routine ends. If there is a print request (YES at #4001), the digital copier that effects the printing process is determined at #4002. If digital copier 1 is designated, the process goes to #4003 to effect a designation (1) print process. If digital copier 2 is designated, the process goes to #4004 to provide a designation (2) print process. If either of the digital copiers is not designated, the process goes to #4005 to effect a designation (any) print process. Thereafter the present routine ends.

Figure 52:
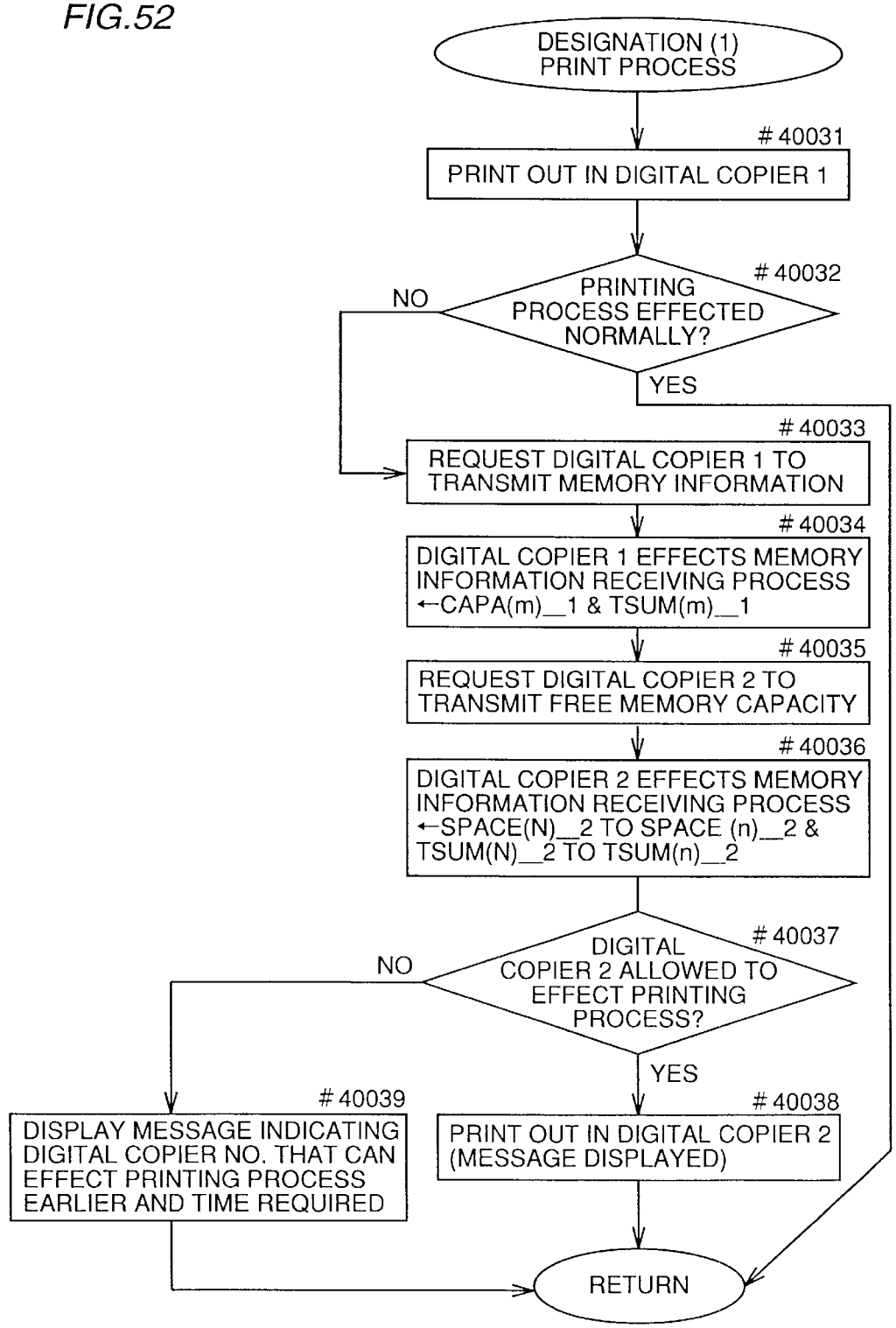
FIG. 52 is a flow chart representing a procedure of a control in the designation (1) print process at #4003 shown in FIG. 51.

FIG. 52 is a flow chart representing a procedure of the control in the designation (1) print process at #4003 shown in FIG. 51.

For the designation (1) print process, initially in order to print an image in digital copier 1 (FIG. 1) designated by the user at #40031, image data, various setup conditions and the like are output to digital copier 1 to try to print out the image in digital copier 1. At #40032, decision is made whether the printing process has been effected normally. If the printing process has been effected normally (YES at #40032), the present routine ends. If the printing process has not been effected normally (NO at #40032), the process goes to #40033.

At #40033, image formation control device 5 requests digital copier 1 to transmit memory information. Responsively, digital copier 1 transmits memory information to image formation control device 5, which receives at #40034 a value CAPA(m)_1 indicating the compressed image data capacity of job m which digital copier 1 tried to print out at #40031 and a value TSUM(m)_1 indicating the time required for completing job m in digital copier 1.

Then, image formation control device 5 requests digital copier 2 to signal its current free memory capacity. Responsively, digital copier 2 effects the free memory capacity transmitting process (FIG. 20), and at #40036 image formation control device 5 receives values TSUM(N) to TSUM(n) indicative of the times respectively required for completing the job currently processed in digital copier 2 and numbered job-no. N to the latest registered job numbered job-no. n.

At #40037, decision is made whether digital copier 2 can effect a printing process. If digital copier 2 can effect a printing process (YES at #40037), the process goes to #40038 to output image data, various setup conditions and the like to digital copier 2 to print an image in digital copier 2 and display a message accordingly. If digital copier 2 cannot effect the printing process (NO at #40037), a message is displayed at #40039 to indicate which of digital copiers 1 and 2 can print the image earlier and the time required for the image to be completely printed.

Figure 53:
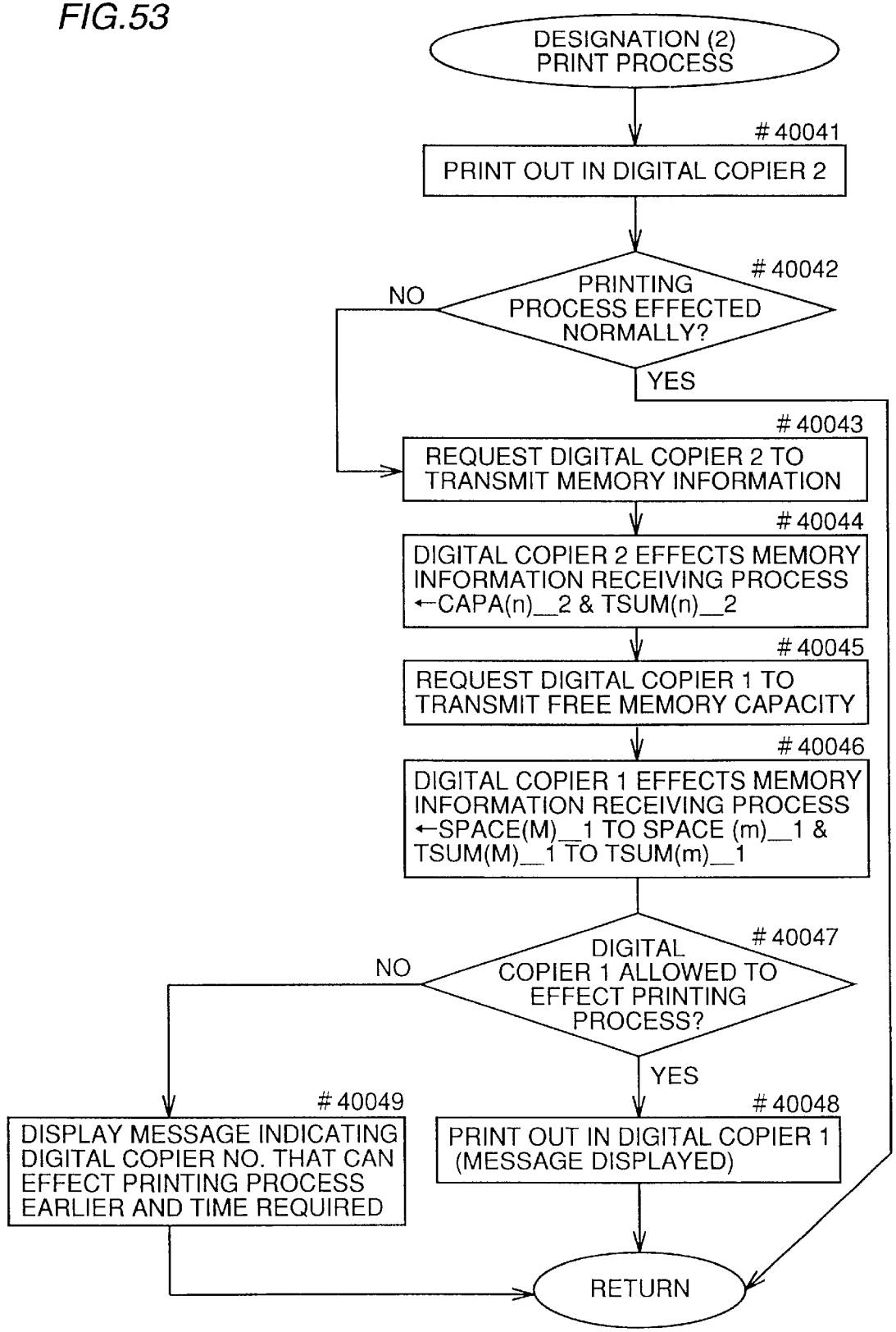
FIG. 53 is a flow chart representing a procedure of a control in the designation (2) print process at #4004 shown in FIG. 51.

FIG. 53 is a flow chart representing a procedure of the control in the designation (2) print process at #4004 shown in FIG. 51.

At #40043, image formation control device 5 requests digital copier 2 to transmit memory information. Responsively, digital copier 2 transmits memory information. At #40044, image formation control device 5 receives at #40044 a value CAPA(n)_2 indicative of the compressed image data capacity of job n which digital copier 2 tried to print out at #4001 and a value TSUM(n)_2 indicative of the time required to complete job n in digital copier 2.

Then at #40045, image formation control device 5 requests digital copier 1 to signal its current flee memory capacity. Responsively, digital copier 1 effects a free memory capacity transmitting process (FIG. 20). At #40046, image formation control device 5 receives values TSUM(M) to TSUM(m) indicative of the times respectively required to complete the job currently processed in digital copier 1 and numbered job-no. M to the latest registered job numbered job-no. m.

At #40047, decision is made whether digital copier 1 can effect the printing process. If digital copier 1 can effect the printing process (YES at #40047), the process goes to #40048 to output image data, various setup conditions and the like to digital copier 1 to print an image in digital copier 1 and display a message accordingly. If digital copier 1 cannot effect the printing process (NO at #40047), a message is displayed at #40049 to indicate which of digital copiers 1 and 2 can print the image earlier and the time required for the image to be completely printed.

Figure 54:
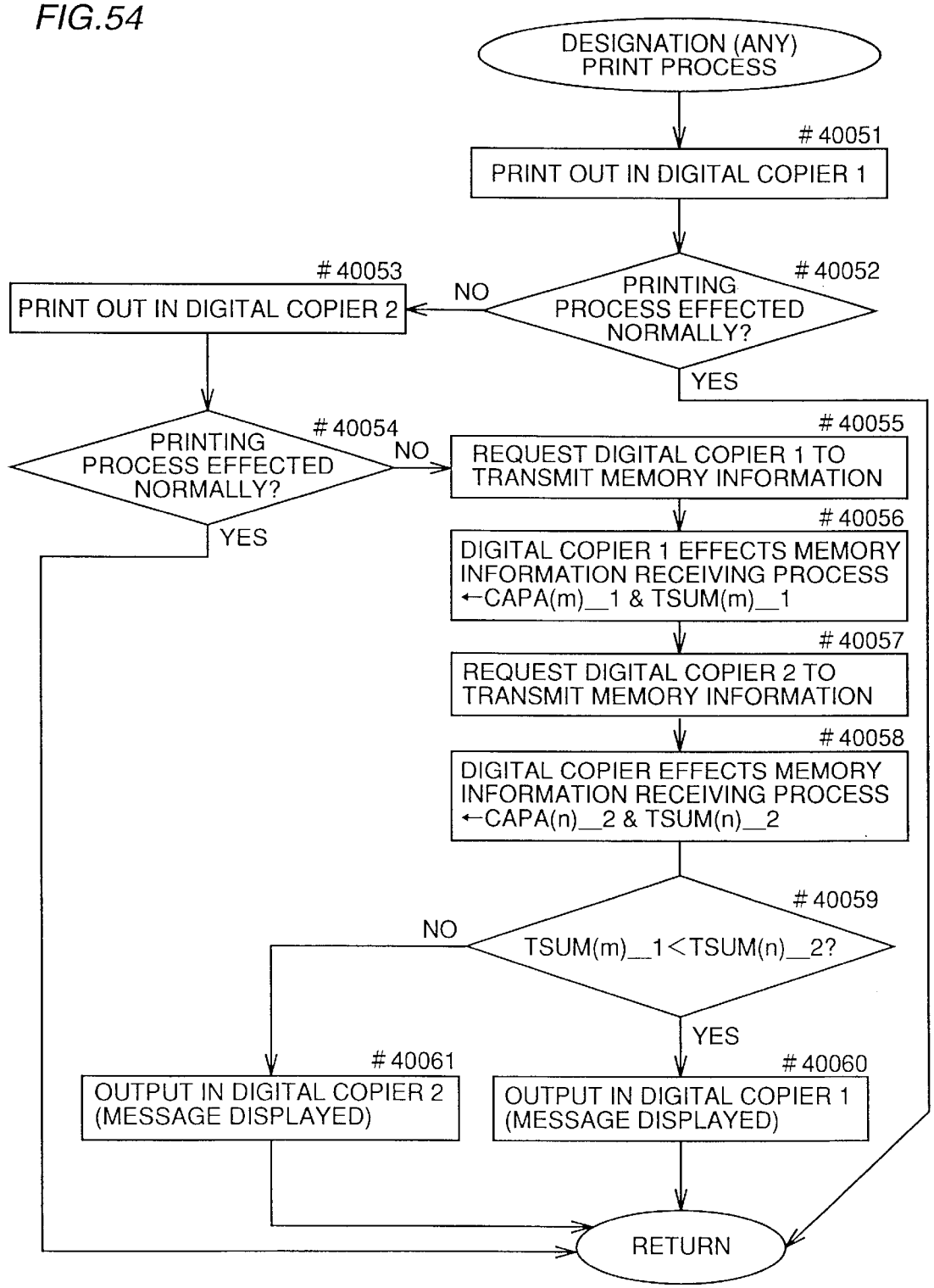
FIG. 54 is a flow chart representing a procedure of a control in the designation (any) pint process at #4005 shown in FIG. 51.

FIG. 54 is a flow chart representing a procedure of the control in the designation (any) print process at #4005 shown in FIG. 51.

In the designation (any) print process, initially in order to print an image in digital copier 1 (FIG. 1) image data, various setup conditions and the like are output to digital copier 1 at #40051 to try to print out the image in digital copier 1. At #40052, decision is made whether the printing process has been effected normally. If the printing process has been effected normally (YES at #40052), the present routine ends. If the printing process has not been effected normally (NO at #40052), the process goes to #40053.

At #40053, in order to print the image in digital copier 2, image data, various setup conditions and the like are output to digital copier 2 to try to print out the image in digital copier 2. At #40054, decision is made whether the printing process has been effected normally. If the printing process has been effected normally (YES at #40054), the present routine ends. If the printing process has not been effected normally (NO at #40054), the process goes to #40055.

At #40055, image formation control device 5 requests digital copier 1 to transmit memory information. Responsively, digital copier 1 transmits a memory information. At #40056, image formation control device 5 receives a value CAPA(m)_1 indicative of the compressed image data capacity of job m which digital copier 1 tried to print out at #40051 and a value TSUM(m) _1 indicative of the time required to complete job m in digital copier 1.

Then at #40057, image formation control device 5 requests digital copier 2 to transmit memory information. Responsively, digital copier 2 transmits memory information. At #40058, image formation control device 5 receives a value CAPA(n)_2 indicative of the compressed image data capacity of job n which digital copier 2 tried to print out at #40053 and a value TSUM(n)_2 indicative of the time required to complete job n in digital copier 2.

After these processes, decision is made at #40059 whether TSUM(m)_1 is smaller than TSUM(n)_2. If TSUM(m)_1 is smaller than TSUM(n)_2 (YES at #40059), the process goes to #40060 to output image data, various setup conditions and the like to digital copier 1 to print the image and display a message accordingly. If TSUM(m)_1 is not smaller than TSUM(n)_2 (NO at #40059), the process goes to 940061 to output image data, various setup conditions and the like to digital copier 2 to print the image and display a message accordingly.

Thus, image formation control device 5 can use the memory information and image-printing information from digital copiers 1 and 2 to allow an image based on an original to be printed by any of digital copiers 1 and 2 that can print the image earlier. Thus the image can be printed efficiently.

It should be noted that the image formation control device according to the fourth embodiment is not limited to such form of image formation system and is applicable to any system that provides a similar effect, including modems, facsimiles connected via a telephone line and the like.

While each embodiment has been described with the present embodiment applied to a digital copier, the present embodiment is not limited thereto and is applicable to general image formation apparatuses, such as printers and facsimiles.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:
   a data receiving section for receiving data for forming an image;
   a memory for storage of data received by the data receiving section;
   an image forming station for forming an image depending on data stored in the memory; and
   a processor for calculating an amount of the data received by the data receiving section and a free capacity of the memory, and for displaying the calculated amount or the data and an indication of an amount of time until the data is to be stored in the memory on a display device.

2. An image formation apparatus according to claim 1, further comprising a data compressor for compressing the data received by the data receiving section, wherein said processor calculates the amount of data after said data is compressed by said data compressor.

3. An image formation apparatus according to claim 1, wherein said processor displays the calculated free capacity of the memory on said display device.

4. An image formation apparatus according to claim 3, wherein said processor calculates the free capacity of said memory at a plurality of lapsed time and respectively displays on said display device each said free capacity corresponding to each of the plurality of lapsed times.

5. An image formation apparatus for connection to an external device, said image formation apparatus comprising:
   an interface for transmitting and receiving data to and from said external device;
   a memory for storage of the data received via the interface;
   an image forming station for forming an image based on data stored in the memory; and
   a processor for calculating an amount of the data received via the interface and a free capacity of tile memory, and for transmitting to said external device via said interface data indicative of the calculated amount of the data and an indication of an amount of time until the data is to be stored in the memory.

6. An image formation apparatus according to claim 5, further comprising a data compressor for compressing the data received via the interface, wherein said processor calculates the amount of data after said compressor compresses said data.

7. An image formation apparatus according to claim 5, wherein said processor transmits data indicative of the free capacity of the memory to said external device via said interface.

8. An image formation apparatus according to claim 7, wherein said processor calculates said free capacity of the memory at a plurality of lapsed times, and respectively transmits data indicative of each said free capacity corresponding to each of the plurality of lapsed times to said external device via said interface.

9. An image formation apparatus according to claim 1, wherein said indication of said amount of time until the data is to be stored in the memory is a time at which the data is to be stored in the memory.

10. An image formation apparatus according to claim 1, wherein said indication of said amount of time until the data is to be stored in the memory is an amount of time until the data wilt be stored in the memory.

11. An image formation apparatus according to claim 5, wherein said indication of said amount of time until the data is to be stored in the memory is a time at which the data is to be stored in the memory.

12. An image formation apparatus according to claim 5, wherein said indication of said amount of time until the data is to be stored in the memory is an amount of time until the data will be stored in the memory.

* * * * *

UNITED STATES PATENT AND TRADEMARK OFFICE
CERTIFICATE OF CORRECTION

PATENT NO.    : 6,449,056 B1
DATED         : September 10, 2002
INVENTOR(S)   : Nobuhiro Mishima et al.

It is certified that error appears in the above-identified patent and that said Letters Patent is hereby corrected as shown below:

Column 1,
Line 6, delete "9221438" and insert -- 9-221438 --.
Line 23, delete "it".

Column 2,
Line 5, after "If", insert -- a --.

Column 4,
Lines 32 and 42, delete "flee", and insert -- free --.

Column 6,
Line 2, delete "pint", and insert -- print --.

Column 7,
Line 11, delete the second instance of "first", and insert -- mirror --.
Line 48, delete "pint", and insert -- print --.

Column 9,
Line 24, delete "(COD)", and insert -- (CCD) --.
Line 25, delete "living", and insert -- driving --.
Line 27, delete "a".
Line 32, delete "pint", and insert -- print --.
Line 32, delete "selves", and insert -- serves --.
Lines 46 through 56, delete the entire paragraph, "CPU 204 is connected to print processing unit 40, which is connected to semiconductor laser(LD)61. CPU 204 is also connect to the sensors of the image forming system, such as sheet size detection sensors SE1, SE2 and the like (Fig. 1), via an I/O interface 233, and to various portions of image forming system 70 and main motor Ml via an I/O interface 234. CPU 204 generally controls page printer PRT, including print processing unit 40, via I/O interfaces 233 and 234. It should be noted that the sheet size obtained from sheet size detection sensors SE1 and SE2 is administered by CPU 204.".

Column 10,
Line 7, delete "110", and insert -- I/O --.
Line 61, delete "tile", and insert -- the --.
Line 63, delete "generate.", and insert -- generates --.

UNITED STATES PATENT AND TRADEMARK OFFICE
CERTIFICATE OF CORRECTION

PATENT NO. : 6,449,056 B1
DATED : September 10, 2002
INVENTOR(S) : Nobuhiro Mishima et al.

It is certified that error appears in the above-identified patent and that said Letters Patent is hereby corrected as shown below:

Column 11,
Line 1, delete "arc", and insert -- are --.

Column 12,
Line 25, delete "arc", and insert -- are --.
Line 39, delete "to".

Column 13,
Line 19, delete "dear", and insert -- clear --.
Line 58, before "NO", insert -- ( --.

Column 14,
Line 32, delete "flee", and insert -- free --.

Column 15,
Line 27, delete "tot", and insert -- to t --.
Line 31, delete "#310", and insert -- #3106 --.
Line 57, delete "cis", and insert -- c is --.

Column 16,
Line 5, after "than", insert -- n --.
Lines 50 and 51, delete "TSUIM (n)", and insert -- TSUM(n) --.

Column 17,
Line 22, delete "flee", and insert -- free --.

Column 18,
Line 58, delete "flee", and insert -- free --.

Column 19,
Line 20, delete "win", and insert -- will --.
Line 52, delete "flee", and insert -- free --.

Column 20,
Line 51, delete "pint", and insert -- print --.
Line 52, delete "pointed", and insert -- printed --.

UNITED STATES PATENT AND TRADEMARK OFFICE
CERTIFICATE OF CORRECTION

PATENT NO. : 6,449,056 B1
DATED : September 10, 2002
INVENTOR(S) : Nobuhiro Mishima et al.

Page 3 of 4

It is certified that error appears in the above-identified patent and that said Letters Patent is hereby corrected as shown below:

Column 21,
Line 8, delete "it".
Line 47, delete "God".
Line 57, after "described", delete ",".

Column 22,
Line 6, delete "a heady", and insert -- already --.

Column 23,
Line 2, delete "HO", and insert -- (NO --.
Lines 5 and 7, delete "received", and insert -- reserved --.
Line 51, delete "registered", and insert -- reregistered --.
Line 58, before "NO", insert -- ( --.

Column 24,
Line 48, delete "OIC" and insert -- OK --.

Column 25,
Line 2, delete "pint", and insert -- print --.
Line 48, delete "8001", and insert -- 800 --.

Column 26,
Line 5, delete "fist", and insert -- first --.
Line 59, insert -- In the designation (2) print process, initially in order to print an image in digital copier 2 (Fig. 1) designated by the user, image data, various setup conditions and the like are output to digital copier 2 at #40041 to try to print out the image in digital copier 2. At #40042, decision is made whether the printing process has been effected normally. If the printing process has been effected normally (YES at #40042), the present routine ends. If the printing process has not been effected normally (NO at #40042), the process goes to #40043. --.

Column 27,
Line 2, delete "flee", and insert -- free --.
Line 23, after "(FIG. 1)", insert -- , --.
Line 63, delete "940061", and insert -- #40061 --.

UNITED STATES PATENT AND TRADEMARK OFFICE
CERTIFICATE OF CORRECTION

PATENT NO. : 6,449,056 B1
DATED : September 10, 2002
INVENTOR(S) : Nobuhiro Mishima et al.

It is certified that error appears in the above-identified patent and that said Letters Patent is hereby corrected as shown below:

Column 28,
Line 29, delete "or", and insert -- of --.
Line 42, delete "time", and insert -- times --.
Line 54, delete "tile", and insert -- the --.
Line 63, after "data", insert -- received via the interface --.

Column 30,
Line 2, delete "wilt", and insert -- will --.

Signed and Sealed this

Twenty-third Day of September, 2003

JAMES E. ROGAN
*Director of the United States Patent and Trademark Office*